(12) United States Patent
Matthews et al.

(10) Patent No.: US 10,868,769 B1
(45) Date of Patent: Dec. 15, 2020

(54) READ INSTRUCTION QUEUES IN A NETWORK DEVICE

(71) Applicant: Innovium, Inc., San Jose, CA (US)

(72) Inventors: William Brad Matthews, San Jose, CA (US); Puneet Agarwal, Cupertino, CA (US); Bruce Hui Kwan, Sunnyvale, CA (US)

(73) Assignee: Innovium, Inc., San Jose, CA (US)

( * ) Notice: Subject to any disclaimer, the term of this patent is extended or adjusted under 35 U.S.C. 154(b) by 93 days.

(21) Appl. No.: 16/057,421

(22) Filed: Aug. 7, 2018

(51) Int. Cl.
*H04L 12/863* (2013.01)
*H04L 12/861* (2013.01)
*H04L 12/879* (2013.01)

(52) U.S. Cl.
CPC ........ *H04L 47/6255* (2013.01); *H04L 49/901* (2013.01); *H04L 49/9084* (2013.01)

(58) Field of Classification Search
CPC ......................... H04L 47/6255; H04L 49/901; H04L 49/9084
USPC .......................................................... 370/235
See application file for complete search history.

(56) References Cited

U.S. PATENT DOCUMENTS

| | | | | |
|---|---|---|---|---|
| 6,647,477 | B2 * | 11/2003 | Janoska | .................. H04L 69/06 370/230.1 |
| 9,658,951 | B1 | 5/2017 | Shumsky et al. | |
| 10,001,971 | B2 | 6/2018 | Jakovljevic et al. | |
| 10,412,018 | B1 * | 9/2019 | Feng | .................. H04L 49/3027 |
| 2003/0165149 | A1 * | 9/2003 | Lin | ........................ H04L 47/24 370/412 |
| 2005/0138276 | A1 | 6/2005 | Navada et al. | |
| 2005/0138278 | A1 | 6/2005 | Aadsen et al. | |
| 2010/0088475 | A1 | 4/2010 | Pinto et al. | |
| 2010/0325187 | A1 | 12/2010 | Juffa et al. | |
| 2012/0131288 | A1 * | 5/2012 | Box | .................... G06F 15/7867 711/154 |
| 2014/0047197 | A1 | 2/2014 | Kokrady et al. | |
| 2014/0173268 | A1 * | 6/2014 | Hashimoto | ........... G06F 3/0653 713/2 |

(Continued)

OTHER PUBLICATIONS

United States Patent and Trademark Office, U.S. Appl. No. 16/057,354, Non-Final Office Action dated Oct. 2, 2019.

(Continued)

*Primary Examiner* — Mark H Rinehart
*Assistant Examiner* — Kokou R Detse
(74) *Attorney, Agent, or Firm* — Wong & Rees LLP; Karl T. Rees

(57) ABSTRACT

To more efficiently utilize buffer resources, schedulers within a traffic manager may generate and queue read instructions for reading buffered portions of data units that are ready to be sent to the egress blocks. The traffic manager may be configured to select a read instruction for a given buffer bank from the read instruction queues based on a scoring mechanism or other selection logic. To avoid sending too much data to an egress block during a given time slot, once a data unit portion has been read from the buffer, it may be temporarily stored in a shallow read data cache. Alternatively, a single, non-bank specific controller may determine all of the read instructions and write operations that should be executed in a given time slot. The read instruction queue architecture may be duplicated for link memories and other memories in addition to the buffer memory.

20 Claims, 28 Drawing Sheets

(56) References Cited

U.S. PATENT DOCUMENTS

| | | |
|---|---|---|
| 2014/0258792 A1 | 9/2014 | Scouller et al. |
| 2014/0286165 A1* | 9/2014 | Chowdhury .......... H04W 4/029 370/235 |
| 2014/0321281 A1 | 10/2014 | Poole et al. |
| 2018/0254079 A1 | 9/2018 | Cox et al. |
| 2018/0322078 A1 | 11/2018 | Qiu et al. |
| 2019/0266096 A1 | 8/2019 | Lee et al. |
| 2019/0295658 A1 | 9/2019 | Amaki et al. |
| 2019/0334828 A1 | 10/2019 | Fairhurst et al. |

OTHER PUBLICATIONS

United States Patent and Trademark Office, U.S Appl. No. 16/057,354, Notice of Allowance dated Apr. 1, 2020.
United States Patent and Trademark Office, U.S. Appl. No. 16/057,460, Non-Final Office Action dated Feb. 24, 2020.
United States Patent and Trademark Office, U.S. Appl. No. 16/057,460, Notice of Allowance dated Jul. 15, 2020.

\* cited by examiner

READ INSTRUCTION QUEUES IN A NETWORK DEVICE

CROSS-REFERENCE TO RELATED APPLICATIONS

This application is related to U.S. patent application Ser. No. 16/057,354, filed Aug. 7, 2018, entitled "Traffic Manager Resource Sharing," by Matthews et al.; and U.S. patent application Ser. No. 16/057,460, filed Aug. 7, 2018, entitled "Buffer Read Optimizations in a Network Device," by Matthews et al., the entire contents of each of which are hereby incorporated by reference for all purposes as if fully set forth herein.

TECHNICAL FIELD

Embodiments relate generally to handling network packets and/or other data units in systems such as, without limitation, data switching networks, and, more specifically, to techniques for improving resource utilization while processing said data units.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

A network device may include any number of internal hardware and/or software components configured to handle the movement of data between processing components within the device and, eventually, out of the device. It is desirable for these components to quickly determine where to send and/or store data for processing, and to expediently send and/or store that data to the appropriate destination once determined.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
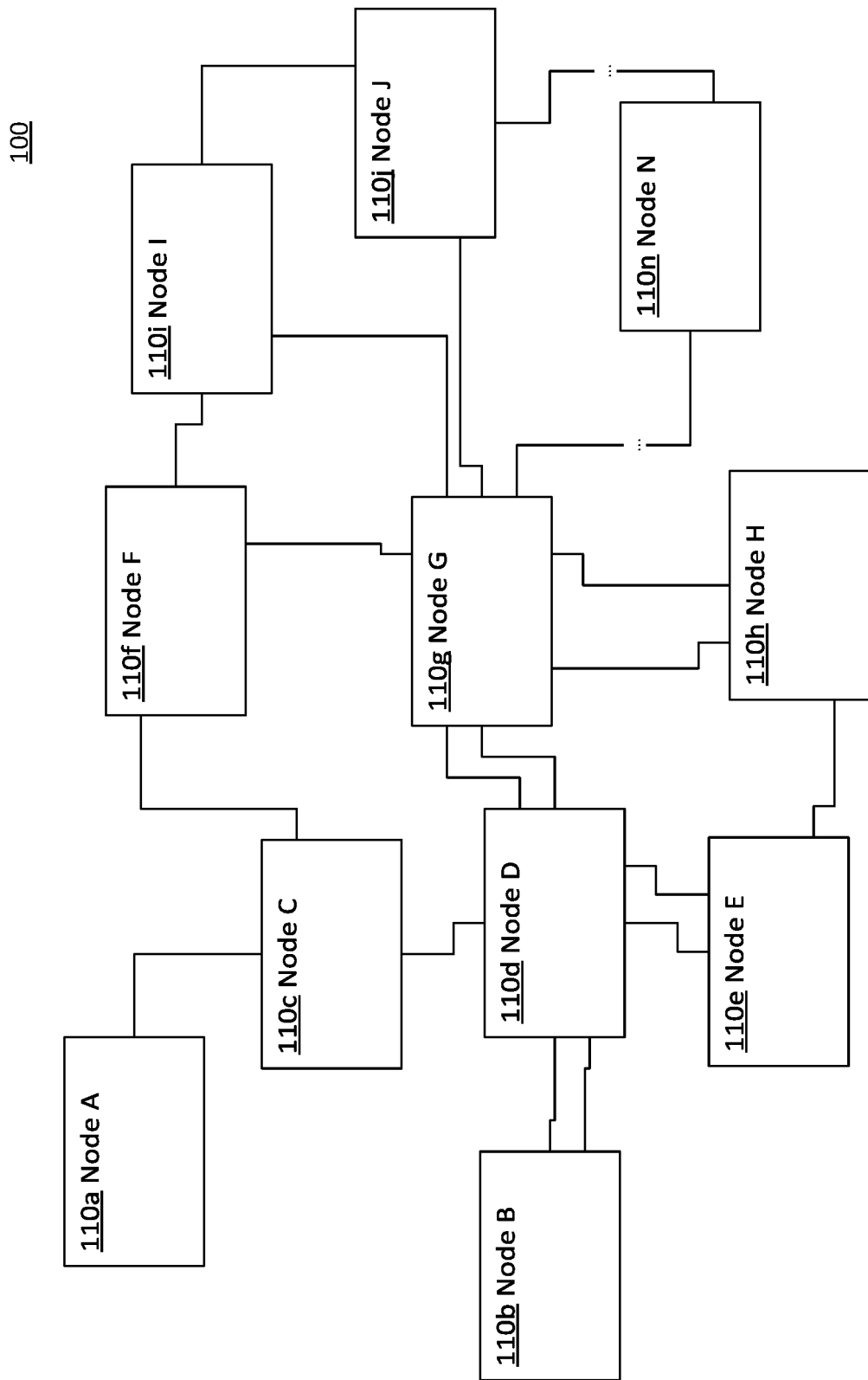
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Packets and Other Data Units
2.2. Network Paths
2.3. Network Device
2.4. Ports
2.5. Egress Processing Block
2.6. Buffers
2.7. Queues
2.8. Traffic Manager
2.9. Example Ingress Processing
2.10. Forwarding Logic
2.11. Example Egress Block with Split Control and Payload
2.12. Example Egress Block with Shared Packet Processor
2.13. Multiple Egress Blocks with Non-Shared Traffic Managers
2.14. Shared Traffic Manager
2.15. Traffic Manager with Statistical Buffer
2.16. Shared Read Instruction Queues
2.17. Ingress Buffer Bypass
2.18. Buffer Read Optimization
2.19. Miscellaneous
3.0. Functional Overview
3.1. Data Unit Intake
3.2. Scheduling Read Instructions
3.3. Read Instruction Queue Arbitration
3.4. Releasing Data Unit Portions from a Read Data Cache
3.5. Processing Data Units with an Egress Block
3.6. Multi-Tiered Arbitration of Read Instruction Queues
3.7. Intelligent Read Selection Assignment
3.8. Bypassing Ingress Buffering for Payload Data
3.9. Writing Data Structures to an Optimized Logical Bank
3.10. Reading Data Structures From an Optimized Logical Bank
4.0. Example Embodiments
5.0. Implementation Mechanism—Hardware Overview
6.0. Extensions and Alternatives 1.0. General Overview Complex, high-bandwidth network devices such as, without limitation, network switches used in data centers, may include large numbers of components that handle data units from different sources in parallel. One such component is known as an "egress block," which may comprise, among other components, a packet processor. Conventionally, each egress block is coupled to a distinct traffic manager that regulates the flow of data units to the egress block by, among other aspects, buffering and queueing data units as the data units await processing.

Each traffic manager may require its own processing and memory resources to implement, among other constructs, buffers and queues. Hence, a device having a certain amount of resources available for traffic management tasks such as buffering needs to divide those resources amongst each of its traffic managers. If the traffic management needs of one egress block surpass the resources of its traffic manager, then the device may need to start dropping data units destined to that egress block, even though the device may still have a large amount of resources available to other traffic managers.

Approaches, techniques, and mechanisms are disclosed for, among other aspects, sharing traffic management resources in a network device. Rather than having a separate traffic manager for each egress block, a traffic manager is shared amongst two or more egress blocks. The traffic management resources of all of the egress blocks that share the traffic manager are thus pooled together, which may offer added capacity to an egress block during periods when the egress block is experiencing peak traffic while other egress blocks are not. Moreover, both independent and shared traffic managers may coexist in the same device, thus allowing for certain egress blocks to have dedicated traffic management resources, while other egress blocks rely on shared traffic management resources.

In an embodiment, to more efficiently utilize buffer resources in a shared traffic manager, the shared traffic manager may generate and queue read instructions for reading buffered portions of data units, such as the cells of network packets, that are ready to be sent to egress blocks. Each bank of memory within the buffer may be capable of a limited number of input/output (I/O) operations in a given time slot (e.g. clock cycle). When, in a time slot, the bank is available for a read operation, a read instruction for the bank may be selected from a read instruction queue and executed.

In an embodiment, there may be multiple scheduler components that schedule data unit portions for departure from the shared traffic manager to its associated egress blocks. When a scheduler determines that a data unit portion is ready to be sent to an egress block, it generates and queues a read instruction for the data unit portion. Each scheduler may generate its own set of one or more read instruction queues. The traffic manager may be configured to select a read instruction for a given bank from these read instruction queues based on various selection mechanisms, such as random, round-robin, or score-based mechanisms.

In an embodiment, there is a separate set of read instruction queues for each bank for which read instructions may be generated. An arbitration unit exists for each bank, and arbitrates between the various read instruction queues of the bank when identifying the next read instruction to execute.

In an embodiment, only a limited amount of data may be consumed by an egress block in a given time slot. To avoid sending too much data to an egress block during a given time slot, once a data unit portion has been read from the buffer, the data unit portion may be temporarily cached in a shallow read data cache. Output logic, such as an egress block interface bank selector, determines which data unit portions to release from the read data cache in a given time slot.

In an embodiment, the use of read data caches may be avoided by utilizing a single, non-bank-specific controller to determine all of the read instructions and write operations that should be executed in a given time slot. This controller, referred to herein as an Intelligent Read Selection Assignment (IRSA") Controller, utilizes information about egress block interfaces targeted by the read instructions to select only read instructions and write operations whose target banks and egress block interfaces do not conflict with those of other read instructions and write operations. Various techniques may be utilized to intelligently optimize the selected read instructions so as to utilize as many egress block interfaces as possible. In such an embodiment, read instruction queues need not be bank-specific.

In an embodiment, various read instructions may be consolidated, so as to optimize read operations on the buffer banks. For instance, read instructions for the same data unit portion, but different target egress block interfaces, may be combined. As another example, read instructions for certain smaller data units may be combined if the buffer banks are logical banks that have been optimized using techniques described herein.

With respect to the latter example, more specifically, a logical bank may comprise logical blocks, such as buffer entries, that are striped across multiple physical banks. That is, a logical block may consist of one physical block from each physical bank. Each physical block in the logical block may have a same address relative to its physical bank. Data structures, such as data unit portions, are stored in the logical blocks, with each logical block storing data for no more than one data structure. When writing a data structure, if the data structure is less than half the size of the logical block, one or more duplicate copies of the data structure may be stored in the otherwise unused physical blocks within the same logical block.

Then, before executing a first read instruction to read a first data structure from a first logical block, if the first data structure can be read without accessing one or more of the physical banks, a second read instruction for a second data structure may be analyzed to determine if there is a copy of the second data structure within the one or more unneeded physical banks. If so, the first read instruction and the second read instruction are consolidated. For example, the first read instruction may be modified to read the first data structure from a first address within a first set of the physical banks and to read the second data structure from a second address within a second set of physical banks. When this modified read instruction is executed, the output will be the first data structure and second data structure (e.g. two cells) concatenated together, thus speeding up the reading and output of these data structures.

This consolidation technique may be extended to three, four, or any number of data structures, should there be sufficient banks, and should the data structures be sufficiently small. In an embodiment, this technique provides particular advantages when utilized for reading packets, cells, or other data units within a buffer of a network device. However, this technique may still provide other advantages in other contexts. Moreover, a shared traffic manager need not necessarily utilize such an optimized logical bank.

According to an embodiment, a shared traffic manager such as described herein may reduce the resources required to handle data units on ingress. Rather than buffer the entire unit in the ingress buffers, an arbiter may be configured to buffer only the control portion—e.g. the SOP—of the data unit. The control portion is queued and processed by the ingress packet processor as it normally would. The payload of the data unit, by contrast, is forwarded directly to the shared traffic manager, where it is placed in the egress buffers. Because the payload is not being buffered in the ingress buffers, the ingress buffer memory of the device may be greatly reduced. Moreover, the device may omit the merger subsystem normally required in the ingress block.

In other aspects, the inventive subject matter encompasses computer apparatuses and computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Packets and Other Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment, IP packet, etc.) to a second node 110 over a path that includes an intermediate node 110. This data unit will be broken into smaller data units at various sublevels before it is transmitted from the first node 110. These smaller data units may be referred to as "subunits" or "portions" of the larger data unit.

For example, the data unit may be broken into packets, then cells, and eventually sent out as a collection of signal-encoded bits to the intermediate node 110. Depending on the network type and/or the device type of the intermediate node 110, the intermediate node 110 may rebuild the entire original data unit before routing the information to the second node 110, or the intermediate node 110 may simply rebuild the subunits (e.g. frames, and/or cells) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the data unit, a label to attach the data unit, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

Data units may be single-destination or multi-destination. Single-destination data units are typically unicast data units, specifying only a single destination address. Multi-destination data units are often multicast data units, specifying multiple destination addresses, or addresses shared by multiple destinations. However, a given node may in some circumstances treat unicast data units as having multiple destinations. For example, the node may be configured to mirror a data unit to another port such as a law enforcement port or debug port, copy the data unit to a central processing unit for diagnostic purposes or suspicious activity, recirculate a data unit, or take other actions that cause a unicast data unit to be sent to multiple destinations. By the same token, a given data unit may in some circumstances treat a multicast data unit as a single-destination data unit, if, for example all destinations targeted by the data unit are reachable by the same egress port.

For convenience, many of the techniques described in this disclosure are described with respect to routing data units that are IP packets in an L3 (level 3) network, or routing the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the "data units" are of any other type of data structure communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
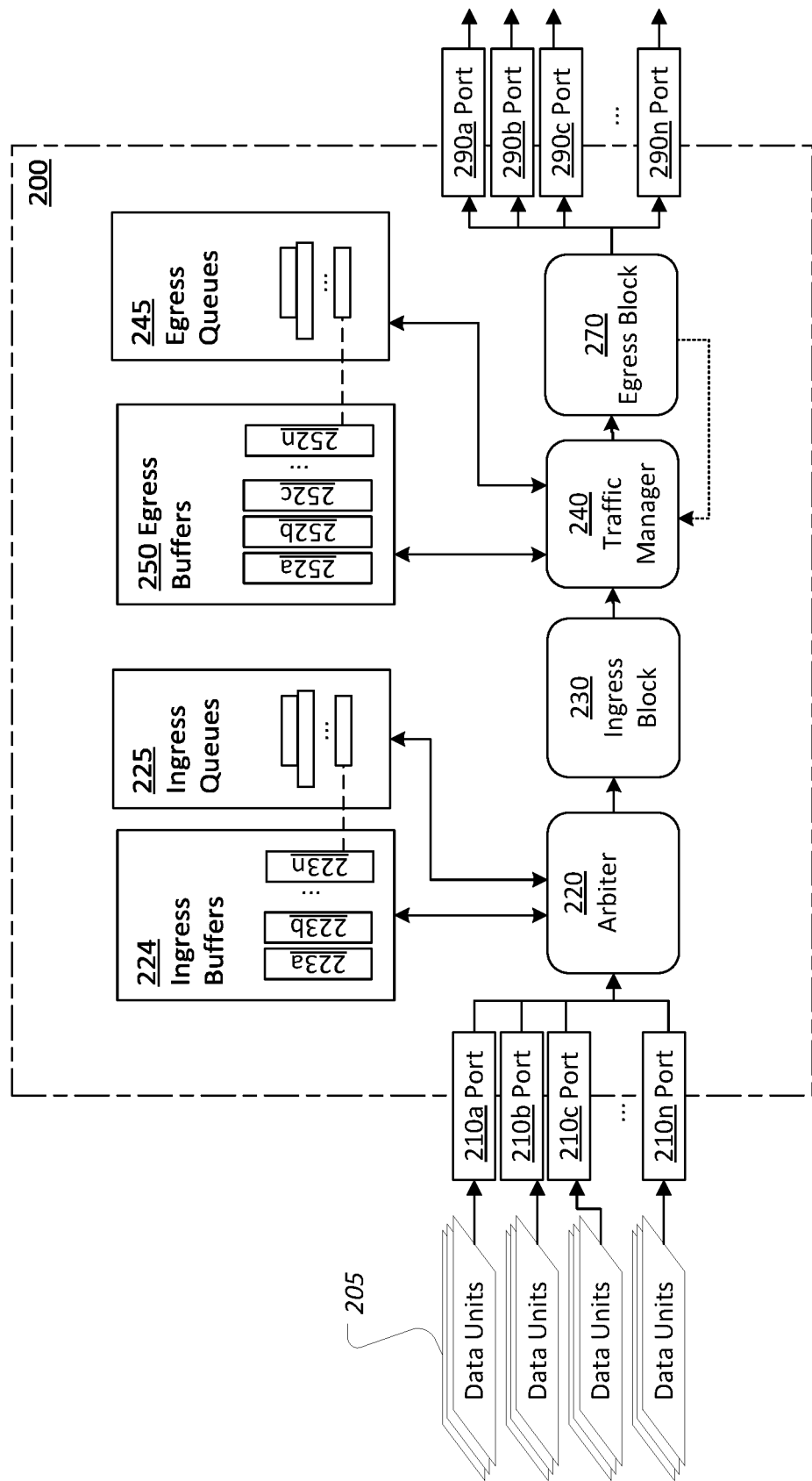
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Note that, in an embodiment, some or all of the nodes 110 in system 100 may each be or include a separate network device 200. In an embodiment, a node 110 may include more than one device 200. In an embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

2.4. Ports

Network device 200 includes ports 210/290. Ports 210, including ports 210*a-n*, are inbound ("ingress") ports by which data units 205 are received over a network, such as network 210. Ports 290, including ports 290*a-n*, are outbound ("egress") ports by which at least some of the data units 205 are sent out to other destinations within the network, after having been processed by the network device 200.

Data units 205 may be of any suitable structure, such as packets, cells, frames, etc. In an embodiment, data units 205 are packets. However, the individual atomic data units upon which the depicted components may operate may be actually be subunits of the data units 205, such as cells or frames. For example, data units 205 may be received, acted upon, and transmitted at a cell or frame level. These cells or frames are logically linked together as the data units 205 (e.g. packets) to which they respectively belong for purposes of determining how to handle the cells or frames. However, the cells or frames may not actually be assembled into data units 205 within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units 205 into a SerDes block, which then outputs the data units 205 serially into an ingress arbiter 220 or other suitable component. On the other end, an egress packet processor may output data units 205 serially into another SerDes block, which the outputs the data units in parallel to ports 290. There may be any number of input and output SerDes blocks, of any suitable size, depending on the specific implementation (e.g. four groups of 4×25 gigabit blocks, eight groups of 4×100 gigabit blocks, etc.).

2.5. Egress Processing Block

A device 200 comprises one or more egress blocks 270 that collectively implement forwarding logic by which the device 200 is configured to determine how to handle data units 205 that the device 200 receives. These egress blocks 270 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

In an embodiment, each egress block 270 is coupled to a different group of egress ports 290 to which they may send data units 205 processed by the egress block 270. In some embodiments, an egress block 270 may also or instead be coupled to other potential destinations, such as an internal central processing unit, a storage subsystem, or a traffic manager 240. In the latter case, at least some data units 205 may be processed by multiple egress blocks 270 in series before being finally disposed of (e.g. sent out of a port 290, dropped, etc.).

In an embodiment, there may be different egress blocks 270 assigned to different flows or other categories of traffic, such that not all data units 205 will be processed by the same egress block 270.

Packet Processors

In an embodiment, each egress block 270 comprises at least one packet processor, which may be any suitable combination of fixed circuitry and/or software-based logic.

Different packet processors may be configured to perform different packet processing tasks. These tasks may include, for example, identifying paths along which to forward data units 205, actually forwarding data units 205 out egress ports 290, implementing flow control and/or other policies, manipulating packets, performing statistical or debugging operations, and so forth. An egress block 270 may comprise any number of packet processors configured to perform any number of processing tasks.

In an embodiment, the packet processors within an egress block 270, or within the device 200 on the whole, may be arranged such that the output of one packet processor is, eventually, inputted into another packet processor, in such a manner as to pass data units 205 from certain packet processor(s) to other packet processor(s) in a sequence of stages, until finally disposing of the data units 205. The exact set and/or sequence of packet processors that process a given data unit 205 may vary, in some embodiments, depending on the attributes of the data unit 205 and/or the state of the device 200. There is no limit to the number of packet processor(s) that may be chained together in such a manner.

2.6. Buffers

Since not all data units 205 received by the device 200 can be processed by the packet processor(s) 220 at the same time, various components of device 200 may temporarily store data units 205 in memory structures referred to as buffers while the data units 205 are waiting to be processed. For example, a certain egress block 270 may only be capable of processing a certain number of data units 205, or portions of data units 205, in a given clock cycle, meaning that other data units 205, or portions of data units 205, must either be ignored (i.e. dropped) or stored. At any given time, a large number of data units 205 may be stored in the buffers of the device 200, depending on network traffic conditions.

A buffer 250 may be a portion of any type of memory, including volatile memory and/or non-volatile memory. In an embodiment, buffers 250 may comprise any number of banks. In an embodiment, each bank may be a distinct single-ported memory, supporting only a single input/output (I/O) operation per clock cycle (i.e. either a single read operation or a single write operation). Single-ported memories may be utilized for higher operating frequency. In other embodiments multi-ported memories may be used in certain circumstances, such as in devices with lower frequency requirements, or with certain combinations of bandwidth and frequency requirements.

In some embodiments, groups of physical banks may be utilized together as a single logical bank, in which data units 205, or portions thereof, may be striped across the physical banks for increased throughput. A buffer 250 may comprise any number of such logical banks.

In an embodiment, each bank, whether logical or physical, is capable of being accessed concurrently with each other bank in a same clock cycle, though full realization of this capability is not necessary.

In an embodiment, each buffer 250 comprises many addressable "slots" or "entries" 252 (e.g. rows, columns, etc.) in which data units 205, or portions thereof, may be stored.

A device 200 may include a variety of buffers 250, each utilized for varying purposes and/or components. Generally, a data unit 205 awaiting processing by a component is held in a buffer 250 associated with that component until the data unit 205 is "released" to the component for processing.

Some or all of the components that utilize one or more buffers 250 may include a buffer manager configured to manage use of those buffer(s) 250. Among other processing tasks, the buffer manager may, for example, allocate and deallocate specific segments of memory for buffers 250, create and delete buffers 250 within that memory, identify available buffer entries 252 in which to store a data unit 205 or portion thereof, maintain a mapping of data units 205 to buffers entries in which data for those data units 205 is stored, determine when a data unit 205 must be dropped because it cannot be stored in a buffer 250, perform garbage collection on buffer entries for data units 205 (or portions thereof) that are no longer needed, and so forth.

A buffer manager may include buffer assignment logic. The buffer assignment logic is configured to identify which buffer entry or entries 252 should be utilized to store a given data unit 205, or portion thereof. In some embodiments, each data unit 205 is stored in a single entry 252. In yet other embodiments, a data unit is received as, or divided into, constituent data unit portions, such as fixed-size cells or frames. The buffers 250 may store these constituent data units 252 separately (e.g. not at the same address location, or even within the same physical or logical bank).

In some embodiments, the buffer assignment logic is relatively simple, in that data units 205 or data unit portions are assigned to buffers randomly or using a round-robin approach. In some embodiments, data units 205 are assigned to buffers 250 at least partially based on characteristics of those data units 205, such as corresponding traffic flows, destination addresses, source addresses, ingress ports, and/or other metadata. For example, different buffers 250 may be utilized to store data units 205 received from different ports 210 or sets of ports 210. In an embodiment, the buffer assignment logic also or instead utilizes buffer state information, such as utilization metrics, to determine which buffer entry 252 to assign to a data unit. Other assignment considerations may include buffer assignment rules (e.g. no writing two consecutive cells from the same packet to the same bank) and I/O scheduling conflicts (e.g. to avoid assigning a data unit to a bank when there are no available write operations to that bank on account of other components reading content already in the bank).

2.7. Queues

In an embodiment, to manage the order in which data units 205 are processed from the buffers 250, various components of a device 200 may implement queueing logic. Each data unit 205, or the buffer locations(s) in which the date unit is stored, is said to belong to one or more constructs referred to as queues 245. Typically, a queue 245 is a set of memory locations (i.e. in the buffers) arranged in some order by metadata describing the queue 245. The memory locations may (and often are) non-contiguous relative to their addressing scheme and/or physical arrangement. For example, the metadata for one queue 245 may indicate that the queue 245 is comprised of, in order, entry addresses 2, 50, 3, and 82 in a certain buffer.

In many embodiments, the sequence in which the queue 245 arranges its constituent data units 205 or data unit portions corresponds to the order in which the data units 205 or data unit portions in the queue 245 will be released and processed. In some embodiments, the number of data units 205 or data unit portions assigned to a given queue 245 at a given time may be limited, either globally or on a per-queue basis, and this limit may change over time.

2.8. Traffic Manager

According to an embodiment, a device 200 includes one or more traffic managers 240 configured to control the flow of data units 205 to egress block(s) 270. A traffic manager 240 receives data units 205 from ports 210, optionally via any number of intermediate components. Device 200 may include egress buffers 250 for buffering data units 205 prior to sending those data units 205 to their respective egress block(s) 270. A buffer manager within the traffic manager 240 may temporarily store data units 205 in egress buffers 250 as they await processing by egress block(s) 270. The number of egress buffers 250 may vary depending on the embodiment. A data unit 205 or data unit portion in an egress buffer 250 may eventually be "released" to one or more egress block(s) 270 for processing, by reading the data unit 205 from the buffer 250 and sending the data unit 205 directly to the egress block(s) 270. In an embodiment, traffic manager 240 may release up to a center number of data units 205 from buffers 250 to egress blocks 270 each clock cycle or other defined time slot.

Beyond managing the use of buffers 250 to store data units 205 (or copies thereof), the traffic manager 240 may include queue management logic configured to assign buffer entries to egress queues 245 and manage the flow of data units 205 through the egress queues 245. The traffic manager 240 may, for instance, identify a specific queue 245 to assign a data unit 205 to upon receipt of the data unit 205. The traffic manager 240 may further determine when to release—also referred to as "dequeuing"—data units 205 (or portions thereof) from queues 245 and provide that data to specific egress blocks 270. The traffic manager 240 may further "deallocate" entries 252 in buffers 250 that store data units that are no longer linked to egress queues 245. These entries 252 are then reclaimed for use in storing new data through a garbage collection process.

In an embodiment, different egress queues 245 may exist for different destinations. For example, each port 210 and/or port 290 may have its own set of queues 245. The queue 245 to which a data unit 205 is assigned and linked may, for instance, be selected based on forwarding information indicating which port 290 the data unit 205 should depart from. In an embodiment, a different egress block 270 may be associated with each different set of one or more queues 245. In an embodiment, the current processing context of the data unit 205 may be used to select which queue 245 a data unit 205 should be assigned to.

In an embodiment, there may also or instead be different egress queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

Though only one egress block 270 and a single traffic manager 240 are depicted in FIG. 2, a device 200 may comprise any number of egress blocks 270 and traffic managers 240. For instance, different sets of ports 210 and/or ports 290 may have their own traffic managers 240 and egress blocks 270. As another example, in an embodiment, the traffic manager 240 may be duplicated for some or all of the stages of processing a data unit 205. For example, system 200 may include a traffic manager 240 and egress block 270 for an egress stage performed upon a data unit 205 exiting the system 200, and/or a traffic manager 240 and egress block 270 for any number of intermediate stages. The data unit 205 may thus pass through any number of traffic managers 240 and/or egress blocks 270 prior to exiting the system 200. In other embodiments, only a single traffic manager 240 is needed. If intermediate processing is needed, flow of a data unit 205 may "loop back" to the traffic manager 240 for buffering and/or queuing again after each stage of intermediate processing.

In the course of processing a data unit 205, a device 200 may replicate a data unit 205 one or more times. For example, a data unit 205 may be replicated for purposes such as multicasting, mirroring, debugging, and so forth. For example, a single data unit 205 may be replicated to multiple egress queues 245. For instance, a data unit 205 may be linked to separate queues 245 for each of ports 1, 35, and 5. As another example, a data unit may be replicated a number of times after it reaches the head of a queue 245 (e.g. for different egress blocks 270). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 250, or a single copy of the data unit 205 may be linked from a single buffer location 252 to multiple queues 245 at the same time.

System 200 illustrates only one of many possible arrangements of components configured to provide the functionality described herein. Other arrangements may include fewer, additional, or different components, and the division of work between the components may vary depending on the arrangement. For example, there may be any number of ports 210/290 and buffer entries 252. As another example, there may be any number of traffic managers 240, each with its own set of queues 245 and buffers 250, and any number of egress blocks 270. Examples of such embodiments are described in subsequent sections.

2.9. Example Ingress Processing

As suggested above, the traffic manager 240 may optionally be coupled to one or more components configured to pre-process data units 205 before sending the data units 205 to the traffic manager 240. For example, a device 200 may further include one or more ingress arbitration components, or arbiters, 220, deployed in front of one or more ingress blocks 230.

Arbiter

Similar to egress traffic managers 240, arbiters 220 control the flow of data units into an ingress block 230, and in fact are sometimes known as ingress traffic managers. Each arbiter 220 is coupled to an ingress buffer 224. Arbiter 220 may utilize buffers 224 to temporarily store incoming data units 205 before sending them to an ingress block 230. Arbiter 220 may be configured to always store incoming data units 205 in buffers 224, or only when needed to avoid potential drops at oversaturated downstream components.

Each data unit 205, or data unit portion, is stored in one or more entries 223 within one or more buffers 224, which entries are marked as utilized to prevent newly received data units 205 from overwriting data units 205 that are already buffered. After a data unit 205 is released to an ingress block 230, the one or more entries in which a data unit 205 is buffered may then be marked as available for storing new data units 205.

Buffers 224 may be stored in a same or different memory than buffers 250. In an embodiment, buffers 224 may comprise a plurality of discrete logical and/or physical banks, in similar manner as described with respect to buffers 250 above. In embodiments where buffers 224 and 250 are the same, ingress buffers 224 and egress buffers 250 may be different portions of that same memory, allocated to ingress and egress operations, respectively.

Arbiter 220 may release up to a center number of data units 205 from buffers 224 to ingress blocks 230 each clock cycle or other defined period of time. The next entry to release may be identified using one or more ingress queues 225, which function similar to egress queues 245. For instance, each ingress port 210 or group of ports 210 may be assigned an ingress queue 225. Ingress queues 225 may be, for example, first-in-first-out queues. That is, when deciding which data unit 205 in an ingress queue 225 to release next, the data unit 205 that has spent the longest time in the ingress queue 225 is selected.

In embodiments with multiple ingress queues 225, the arbiter 220 may utilize a variety of mechanisms to identify the next ingress queue 225 from which to release a data unit 205. For example, each queue 225 may be assigned one or more slots, and the next queue 225 for a given time period may be selected using a round-robin approach that rotates through these slots. As another example, the next queue 225 may be selected using a random, or probabilistic approach. In an embodiment, each ingress queue 225 may be weighted by an advertised transmission rate. For instance, for every one packet released from a queue 225 for a 200 Mbps port, ten might be released from a queue 225 for a 2 Gbps port. The length and/or average age of a queue 225 might also or instead be utilized to prioritize queue selection. In an embodiment, a downstream component may instruct the arbiter 220 to release data units 205 from certain ports. Hybrid approaches may also be used. For example, one of the longest ingress queues 225 may be selected each odd clock cycle, and a random ingress queue 225 may be selected every even clock cycle. In an embodiment, a token-based mechanism is utilized.

In an embodiment, the next ingress queue 225 from which to release a data unit 205 is decided at least partially based on the ports 210 with which the ingress queues 225 are associated. For example, each port 210 may have a different set of ingress queues 225 for the data units 205 that arrive via that port 210. In a given time period, one or more ports 210 may be selected from which to release a data unit. The port(s) 210 may be selected using, for example, a weighted round robin algorithm, where ports 210 are provided bandwidth proportional to their port speed. When a port 210 is selected, one or more ingress queues 225 are selected from the set of queues 225 that is associated with the port 210, using any suitable technique. In an embodiment, for instance, queues 225 are selected using a Strict Priority ("SP") algorithm, weighted deficit round robin ("WDRR") algorithm, or a version of Weighted Fair Queuing ("WFQ") algorithm. A data unit 205 (e.g. the head data unit 205), or a portion thereof, is then release from the selected queue 225.

In an embodiment, ingress queues 225 may also or instead exist for specific groups of related traffic, also referred to as priority sets or classes of service. For instance, all data units 205 carrying VoIP traffic might be assigned to a first queue 225, while all data units carrying Storage Area Network ("SAN") traffic might be assigned to a different queue 225. Each of these ingress queues 225 might be weighted differently, so as to prioritize certain types of traffic over other traffic. Moreover, there may be different ingress queues 225 for specific combinations of ports 210 and priority sets.

Yet other queue selection mechanisms are also possible. The techniques described herein are not specific to any one of these mechanisms, unless otherwise stated. Note that similar selection techniques may also be applied to selecting data units 205 to release from egress queues 245 during egress processing.

Ingress Processing Block

Data units 205 released by an arbiter 220 are forwarded to an ingress block 220 for ingress processing. Generally, an ingress block 220 resolves destinations for the traffic manager 240 to determine which ports/queues a data unit should depart from. There may be any number of ingress blocks 230, including just a single ingress block 230. An arbiter may be coupled to a single ingress block 230, or multiple arbiters may share an ingress block 230. The number of ingress blocks 230 need not necessarily correspond to the number of egress blocks 270 or traffic managers 240 within device 200.

Generally speaking, an ingress block 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress block 230 may be coupled directly or via an interconnect component.

In an embodiment, an ingress block 230 comprises one or more packet processors configured to perform some or all of the foregoing tasks. The packet processors of ingress blocks 230 are generally referred to as ingress packet processors, whereas the packet processors of egress blocks 270 are generally referred to as egress packet processors. The architecture of an ingress block 230 may take any suitable form, including forms similar to an egress block 270 or other egress blocks described herein. For instance, the architecture of an ingress block 230 may be exactly the same as the example egress blocks given in subsequent sections, other than being coupled to a different input (arbiter 220 versus traffic manager 240) and different output (one or more traffic managers 240 instead of one or more ports 290), and other than using an ingress packet processor instead of an egress packet processor.

An example flow of a data unit 205 through device 200 is as follows. The data unit 205 may be received by a port 210. The data unit 205 is buffered by an arbiter 220 until it can be processed by an ingress block 230, and then delivered to an interconnect. From the interconnect, the data unit 205 is forwarded to a traffic manager 240. Traffic manager 240 stores the data unit 205 in a buffer 250 and assigns the data unit 205 to a queue 245. Traffic manager 240 manages the flow of the data unit 205 through the queue 245 until the data unit 205 is released to an egress block 270. Depending on the processing, the traffic manager 240 may then assign the data unit 205 to another queue 245 so that it may be processed by yet another egress block 290, or the egress block 270 may send the data unit 205 out another port 290.

System 200 illustrates only one of many possible arrangements of components configured to provide the functionality described herein. Other arrangements may include fewer, additional, or different components, and the division of work between the components may vary depending on the arrangement. For example, there may be any number of arbiters 220, each with its own set of queues 224 and buffers 225, and any number of ingress blocks 230.

Example ingress (and egress) processing techniques and architectures are further described in, without limitation, U.S. patent application Ser. No. 15/433,825, filed Feb. 15, 2017, and U.S. patent application Ser. No. 16/033,680, filed Jul. 12, 2018, the entire contents of each of which are hereby incorporated by reference for all purposes, as if set forth herein.

2.10. Forwarding Logic

The logic by which a device 200 determines how to handle a data unit—such as where and whether to send a data unit, whether to perform additional processing on a data unit, etc.—is referred to as the forwarding logic of the device 200. This forwarding logic is collectively implemented by a variety of the components of the device 200. For example, an ingress packet processor may be responsible for resolving the destination of a data unit and determining the set of actions/edits to perform on the data unit, and an egress packet processor may perform the edits. Or, the egress packet processor may also determine actions and resolves a destination in some cases. Also, there may be embodiments when the ingress packet processor performs edits as well.

The forwarding logic may be hard-coded and/or configurable, depending on the embodiment. For example, the forwarding logic of a device 200, or portions thereof, may, in some instances, be at least partially hard-coded into packet processors within one or more ingress blocks 230 and/or egress blocks 270. As another example, the forwarding logic, or elements thereof, may also be configurable, in that the logic changes over time in response to data collected from, or instructions received from, other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress block 270 that is coupled to the one or more ports 290.

In an embodiment, such forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit for various reasons. For instance, a traffic manager 240 may determine to drop a data unit because, among other reasons, buffers 250 are overutilized, a queue 245 is over a certain size, and/or a data unit 205 has a certain characteristic.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

2.11. Example Egress Block with Split Control and Payload

In a relatively simple embodiment, an egress block such as egress block 270, or any other egress block referred to herein, may simply comprise a packet processor to which all data unit portions are forwarded. Such a packet processor may be configured, for example, to analyze any data unit portion it receives, perform any processing warranted for the data unit portion, and output the data unit portion to one or more coupled destinations.

However, a packet processor is typically computationally expensive, and usually only operates on the first portion of a data unit. To forward all data unit portions through such a packet processor may be unnecessarily slow and/or resource-intensive. Therefore, in some embodiments, an egress block comprises two different "paths" along which different types of data unit portions may be sent, according to whether or not they need to be processed by a packet processor. The egress block may then merge these two paths after the processing has been performed and output the resulting data unit portions.

Figure 4:
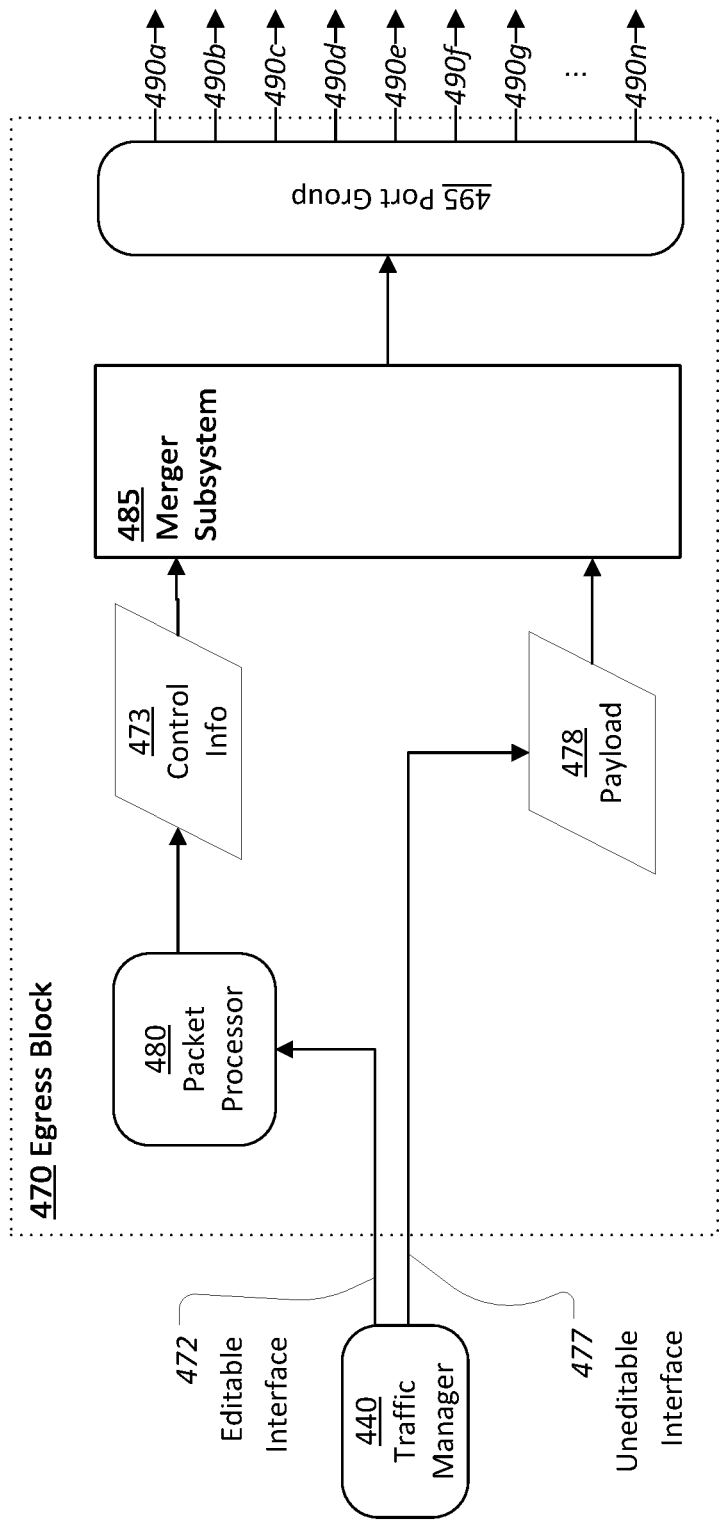
FIG. 4 illustrates an example egress block configured to split data units along different paths.

FIG. 4 illustrates an example egress block 470 configured to split data units along different paths, according to an embodiment. Egress block 470 is an example implementation of the various egress blocks referred to herein, including egress block 270. However, the egress blocks referred to herein need not necessarily be limited to the specific details of egress block 470.

Each path in the egress block 470 may be a physical path over which signals representing the data unit are carried (e.g. specific wiring, traces, and/or other circuitry), or a logical path. The egress block 470 comprises different interfaces that feed into these different paths, including an editable interface 472 and an uneditable interface 477. A traffic manager 440, such as traffic manager 240, is coupled to the egress block 470 via the interfaces 472 and 477. The traffic manager 440 sends at least a first portion of a data unit down a first path, referred to herein as the "control" path or "editable" path, via editable interface 472. The traffic manager 440 sends at least the remainder of the data unit down a second path, referred to herein as the "data" path, "payload" path, or "uneditable" path, via the uneditable interface 477.

The first portion of the data unit, also referred to herein as the "control" portion, may be, for instance, a header, a fixed-size portion of the data unit that contains the header, a start-of-packet ("SOP") subunit of the data unit (e.g. the first cell or frame of a packet), or any other portion that includes enough information to generate control information 473 for the data unit. In some embodiments, or if the data unit is sufficiently small (e.g. a single cell), the entire data unit may be sent via editable interface 472.

The editable path includes a processing unit, referred to as a packet processor 480, which may be coupled directly to the editable interface 472, or via one or more intermediary components. The packet processor 480 inspects the control portion of the data unit and generates control information 473 based thereon. The control information 473 may simply include information already in the data unit (e.g. addressing information, priority data, or labels in the header of the data unit 110), may replace such information in the data unit (e.g. a new destination address or a revised priority level), or may be additive with respect to the information in the header (e.g. internal markings, path information, tracking information, a next internal destination component to process the data unit, editing instructions, other handling instructions, etc.). The control information 473 may be generated based on rule-based and/or hard-coded logic within the packet processor 480. In an embodiment, the control information 473 may optionally be post-processed by one or more additional components before it arrives at a merger subsystem 485.

In an embodiment, both the control portion of the data unit and the control information 473 are forwarded out the editable path to the merger subsystem 485. The control portion may optionally have been edited by the packet processor 480 and/or another component on the editable path, in accordance to instructions from the control information 473. In another embodiment, only the control information 473 is forwarded out of the editable path.

Meanwhile, the traffic manager 480 forwards the remaining portion of the data unit (and the control portion, if not forwarded to the merger subsystem 485) to an uneditable interface 477 of the egress block 470. The portion of the data unit sent via the uneditable interface 477 is referred to herein as payload 478. The uneditable path, in its simplest form, simply moves the payload 478 from the traffic manager 440 to the merger subsystem 485.

Optionally, the uneditable path may include any number of intermediate relays or processing components through which the payload 478 is routed. Although, as the name "uneditable" path suggests, the payload 478 is generally not inspected or edited, in some embodiments such an intermediary component may nonetheless process and even transform the payload 478 under certain conditions. Any processing along the uneditable path is typically performed relatively quickly, such that at least some of the payload 478 arrives at the merging component 485 prior to the packet processor 480 generating the control information 473 associated with the data unit.

In some embodiments, the traffic manager 440 may receive any number of data units concurrently. The traffic manager 440 need not wait for a full data unit to be received, but rather may begin sending data unit portions down the editable path and/or uneditable path as soon as the portions are assembled. For instance, for a packet that is divisible into cells, the traffic manager 440 may send the SOP cell of the data unit down the editable path before having even received other cells of the data unit. Middle-of-packet cells ("MOP" cells), and optionally the SOP cell, may also be sent down the uneditable path before the end-of-packet ("EOP") cell is received. Moreover, portions of different data units (e.g. having been received concurrently on different ports) may be sent down the uneditable path before either of the different data units have been fully received. Thus, for example, cells from different data units may be interleaved amongst each other as they are sent down the uneditable path.

In an embodiment, the separation of data units along two different paths enables hardware designs that leverage different operating frequencies for the circuitry and memory units used along each path, so as to enable the generation of the control information 473 along the editable path using higher cost but faster hardware without requiring that hardware to process the entire data unit. Of course, there may be any number of other contexts where such separation is useful.

Merger Component

Through a variety of techniques, including without limitation those depicted in FIG. 4, control information 473 and payload data 485 arrive, typically asynchronously, at a merger subsystem 140 through the two separate paths. A merger subsystem 485 is configured to correlate the control information 473 for a data unit with its payload data 478. The merger subsystem 485 may do so using any suitable technique, such as locating all data unit portions having a particular packet sequence number. At a suitable time after the control information 473 has been correlated to the payload data 478, the merger subsystem 485 may send the merged data unit to a port group 495, from which the merged data unit may proceed to any of a number of destinations 490 associated with the group 494.

A merger subsystem 485 may receive control information 474 for a data unit in any of a variety of forms, including in the form of a header (e.g. to replace or be inserted into the data unit), a wrapper to be prepended to the data unit, or a separate data structure intended to accompany the data unit. The control information 473 may include data that explicitly or implicitly identifies at least one path or target component 490 to which the data unit should be forwarded for further processing. The control information 473 may optionally include a variety of other information, including information conventionally found in a header, type information indicating whether the data unit is single-destination or multi-destination, extra processing instructions intended for downstream components of the implementing apparatus, and so forth. In an embodiment, the control information 473 may include instructions to the merger subsystem 473 to edit one or more portions of the data unit, such as edits to the control portion of the data unit if the control portion is not edited on the editable path, or to any other portion of the data unit. For instance, such an edit may include adding a timestamp to an EOP data unit portion.

A merger subsystem 485 merges the control information 473 with the data unit (or data unit portions), either by modifying the data unit itself (e.g. prepending the control information 473 to the data unit or a SOP cell for data unit, or inserting the control information 473 within the data unit), or by sending the control information 473 adjacent to the data unit when dispatching the data unit to its next destination 490.

In an embodiment, the merger subsystem 485 may include any number of memories of any suitable size, in which data units may be stored temporarily (i.e. buffered and/or queued) while waiting for associated control information 473 to be received from the control path 132. In an embodiment, the merger subsystem 485 may include a scheduler component configured to determine when to release data units from the memory or memories in which they are buffered to the port group 495.

In an embodiment, when a merger subsystem 485 receives control information 473, the merger subsystem 485 sends some or all of the control information 473 to a scheduler. The scheduler uses some or all of the control information 473 to decide when to dispatch the data unit to a next destination component 490. At or before the appropriately scheduled dispatch time, the merger subsystem 485 utilizes identification data within the control information 473, such as a packet identifier embedded within the header by the sending network device or the traffic manager 440, to locate and read the data unit (or portions of the data unit) that is associated with the control information 473 from the one or more memories of merger subsystem 485. The merger subsystem 485 then merges the control information 473 and payload 478 as described above.

Examples of a merger subsystem 485 include, without limitation, the merger subsystems described in the aforementioned U.S. patent application Ser. No. 15/433,825.

The merger subsystem 485 sends the merged data unit out via a port group 495 to the destination component(s) 490 indicated by the control information 473. The port group 495 may comprise one or more outgoing interfaces for each possible destination component 490 for a merged data unit. A merger subsystem may be attached to one or more port group and may resolve which port group the merged data is to be sent.

Destination components 490, illustrated as destinations 490a-490n, may include, for example, processing components, routing decision components, packet inspection components, traffic action control components, tracking or reporting components, traffic managers, individual egress ports such as ports 290, queues or buffers for such components, or any other suitable destination component.

The port group 495 may be configured to send a single data unit out on one interface (unicast) or configured to send a copy of the data unit to each of any number of interfaces (multicast), depending on how many destinations 490 are identified by the control information 473. The port group 495 can send traffic out each interface concurrently.

Depending on the embodiment, the port group 495 receives and dispatches data units as separate portions (e.g. the individual cells of a packet) or all at once. In at least one embodiment, portions of a data unit may be dispatched even before the merger subsystem 485 has received the entire data unit (e.g. for data flows with large packets where the control information 473 is generated from the SOP cell before the EOP cell is received or completes the uneditable path).

In an embodiment, a destination 490 is an egress port that sends signals representing the data unit portion out a network interface to another node on a network. In some embodiments, some or all of the control information 473 may be removed before sending the data units from the network device.

In an embodiment, a destination 490 may be another processing component coupled to the port group 495 via circuitry through which signals representing the data units sent from the merger subsystem 485 are received directly by the processing component. In an embodiment, a destination 490 may be a processing component configured to read data units sent by the merger subsystem 485 from a memory (e.g. a register). Thus, the outgoing interface of port group 495 that corresponds to this destination 490 is configured to write data units to this memory rather than send the data directly to the corresponding processing component.

FIG. 4 illustrates but one example of an egress block 470 with multiple paths. Other egress blocks with multiple paths may include fewer, additional, or different components, and the division of work between the components may vary depending on the arrangement.

Example Split Egress Processing with Cell-Based Traffic

Figure 5:
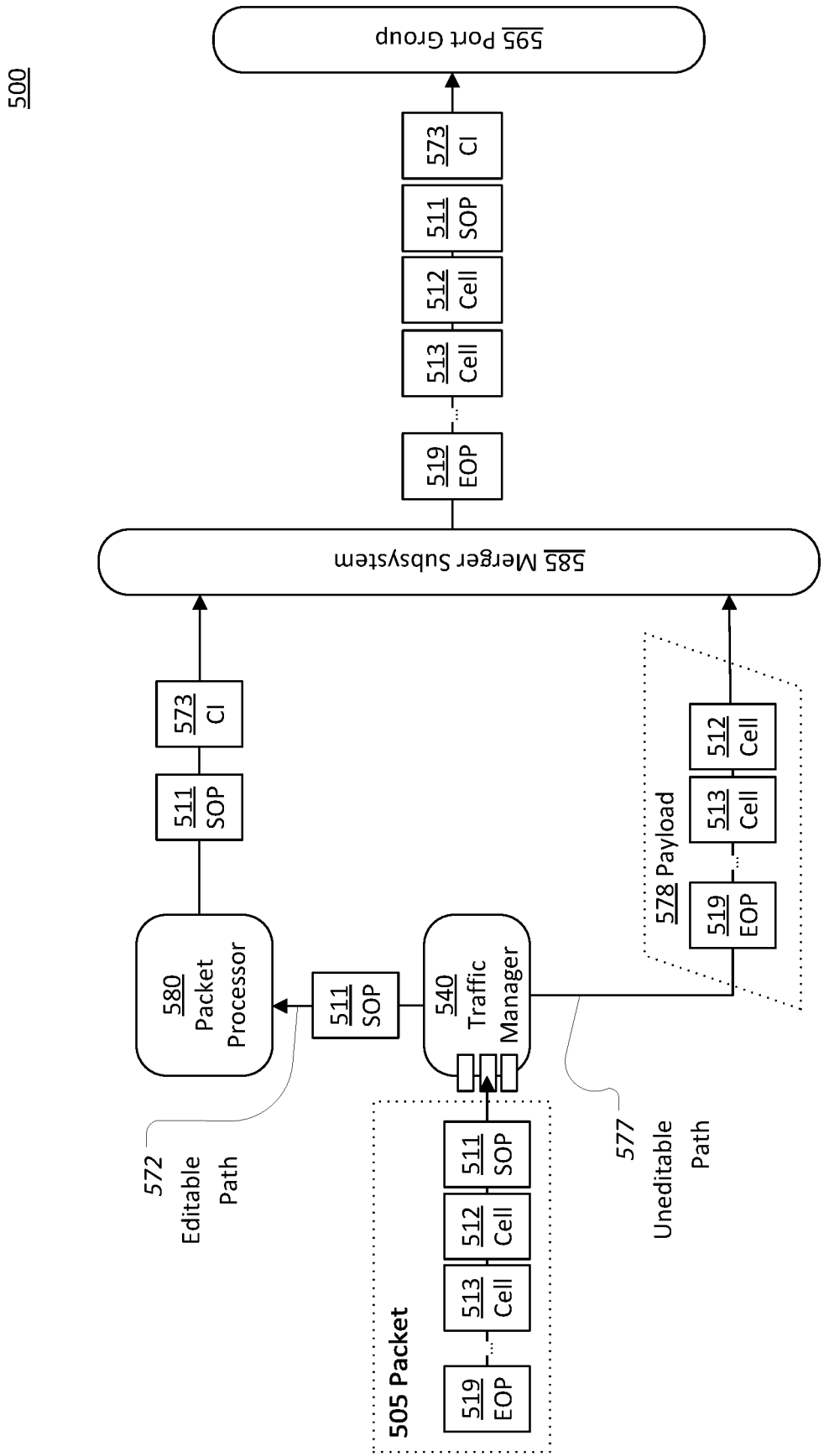
FIG. 5 is an illustrative view of various aspects of an example system for handling cell-based traffic.

FIG. 5 is an illustrative view of various aspects of an example system 500 for handling cell-based traffic, according to an embodiment. The components of system 500 are in many aspects similar to those depicted in FIG. 4, though certain details have been omitted for clarity. For instance, traffic manager 540 of system 500 is similar to traffic manager 440, packet processor 580 of system 500 is similar to packet processor 480, merger subsystem 585 of system 500 is similar to merger subsystem 485, and port group 595 of system 500 is similar to port group 495.

However, to better illustrate the flow of a data unit when received as distinct data unit portions, FIG. 5 illustrates the flow of a packet 505 that is divided into distinct cells 511-519. Cell 511, a SOP cell, is received first at traffic manager 540. Traffic manager 540 sends SOP cell 511 along editable path 572 to packet processor 580, which will generate control information 573 based on SOP cell 511. The control information 573 is then forwarded to merger subsystem 585, along with the SOP cell 511. The SOP cell 511 which may, depending on the embodiment, be edited by the packet processor 580 or another component on the editable path 572 to add or remove header information or other data.

Meanwhile, traffic manager 540 may receive, in turn, cell 512, cell 513, and any number of additional cells of packet 510, up until receiving an EOP cell 519. Traffic manager 540 sends these cells 512-519 along uneditable path 577, collectively forming the payload 578 for packet 505.

Note that, in another embodiment, SOP 511 may also be sent along the uneditable path 572, in which case the SOP 511 is forwarded to the merger subsystem 585 with the payload 578. In such an embodiment, SOP 511 would not be forwarded from the packet processor 580 to the merger subsystem 585 via the editable path 572, and any edits to he SOP 511 would be performed by the merger subsystem in accordance to instructions in the control information 573.

In the depicted example, merger subsystem 585 buffers any cells 511-519 that are received from the uneditable path 577 before receiving control information 573 from the editable path 572. The buffered cells 511-519 cannot be sent until control information 573 is received by and dispatched from merger subsystem 585. Once received by merger subsystem 585, in some embodiments, control information 573 may likewise be buffered until a scheduler subsystem (not depicted) or other resource regulating component determines that resources are available to dispatch SOP 511 and control information 573. At the scheduled time, control information 573 may be prepended to SOP 511, as depicted, or otherwise sent to port group 595 in association with SOP 511 and/or any other cell 512-519. In other embodiments, transmission of the packet 505, starting with control information 573 and SOP 511, may begin as soon as the control information 573 has been received.

Once SOP 511 has been dispatched to port group 595, merger subsystem 585 may dispatch any cells 512-519 that are buffered in memory at merger subsystem 585, in turn. Moreover, merger subsystem 585 may immediately dispatch any cells 512-519 received after SOP 511 and control information 573 have been dispatched, without necessarily buffering these cells 512-519. Nonetheless, these cells 512-519 may also be buffered at merger subsystem 585 for some time while waiting for dispatch of any buffered preceding cells of packet 505 and/or while waiting for resources to become available.

In an embodiment, any number of additional cells 512-519 may be sent along the editable path 572 for analysis when generating control information 573, and thus need not necessarily be communicated along uneditable path 577 if they are communicated to merger subsystem 585 along the editable path 572.

In an embodiment, traffic manager 540 does not necessarily receive cells 511-519 one after another, but rather may receive any number of other cells for other packets in between receiving each of cells 511-519. Likewise, the merger subsystem 585 may dispatch any number of other cells from other packets in between dispatching each of cells 511-519.

Further note that system 500 illustrates only one of many possible arrangements of components configured to handle data flows composed of distinct subunits. Other arrangements may include fewer, additional, or different components, and the division of work between the components may vary depending on the arrangement.

2.12. Example Egress Block with Shared Packet Processor

Figure 6:
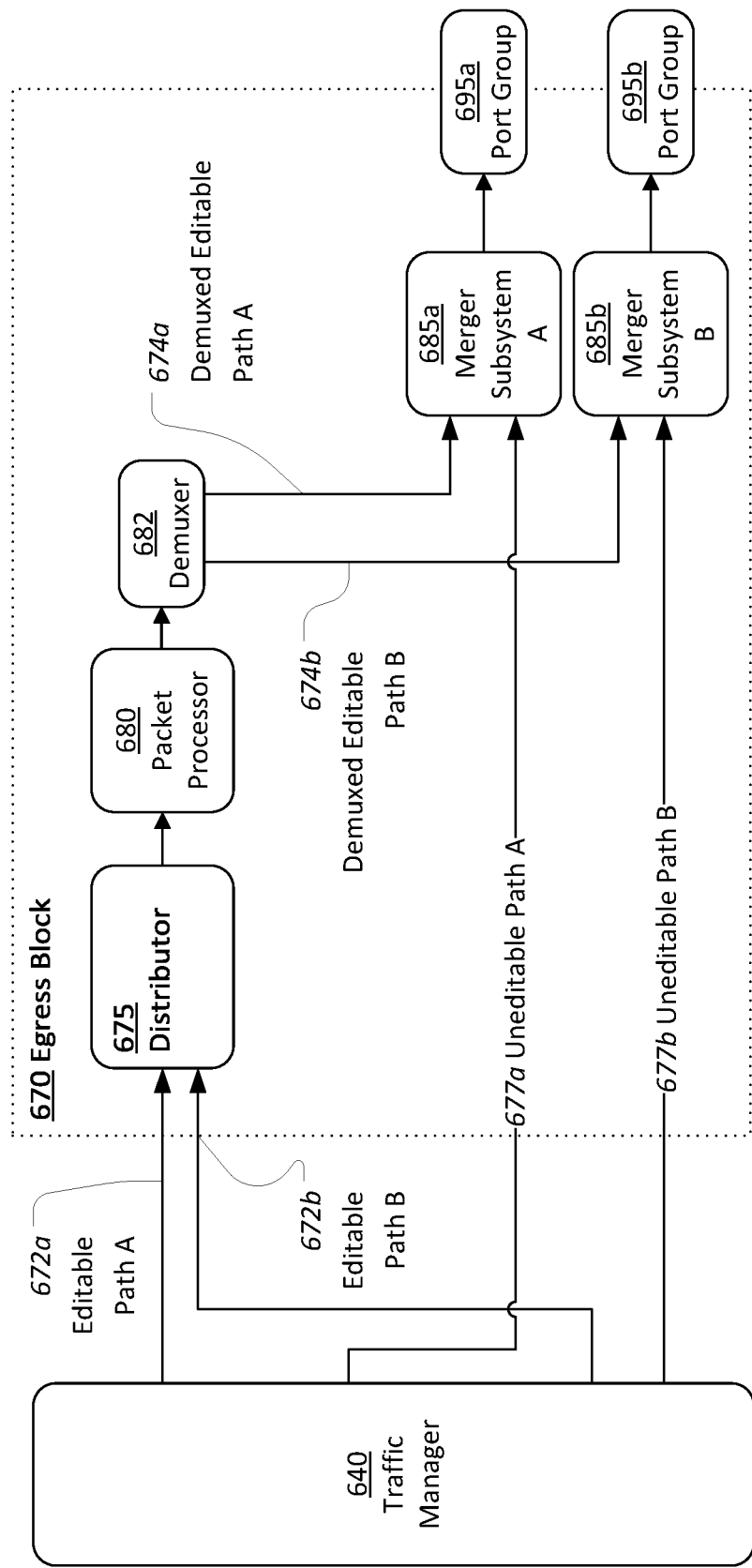
FIG. 6 illustrates an example egress block comprising editable paths coupled to a shared packet processor.

FIG. 6 illustrates an example egress block 670 comprising editable paths 627 coupled to a shared packet processor 680, according to an embodiment. The traffic manager 640 may be similar to traffic manager 440 described above. However, traffic manager 640 is coupled to egress block 670 via multiple pairs of editable and uneditable paths, each pair corresponding to a different merger subsystem 685 and egress port group 695.

As depicted, uneditable paths 677 include uneditable paths 677a and 677b, coupled to merger subsystem 685a and 685b, respectively. Each uneditable path 677 is similar to uneditable path 477, and carries the payload portion of the data units sent by traffic manager 640. Uneditable path 677a carries the payload portions of data units sent to port group 695a, while uneditable path 677b carries the payload portions of data units sent to port group 695b.

Editable paths 672 include the depicted editable paths 672a and 672b, along which traffic manager 640 sends the control portions of the data units it receives. Editable path 672a carries the control portions of data units sent to port group 695a, while editable path 672b carries the control portions of data units sent to port group 695b. Editable paths 672 are both coupled directly or indirectly to a common packet processor 680, which is similar to packet processor 480. Packet processor 680 receives the control portions of the data units from the multiple editable paths 672, interleaved together. In fact, in an embodiment, packet processor 680 need not be able to discern over which editable path 672 a given data unit was received.

Packet processor 680 produces control information, such as control information 473, based upon the data unit portions that it receives. Packet processor 680 then sends this control information to a demuxer 682, which may be included in the packet processor 680 or external to the packet processor 680, depending on the embodiment. Based upon metadata associated with the control information, such as a control path identifier, the demuxer splits the control information back into multiple paths 674, with the control information for any data units that were originally sent via control path 672a continuing along demuxed control path 674a, and the control information for any data units that were originally sent via control path 672b continuing along demuxed control path 674b.

Merger subsystems 685a and 685b are coupled to the demuxer 682 via, respectively, the demuxed control paths 674a and 674b. The merger subsystems 685 thus receive only the control information for the port group 695 to which they correspond. The merger subsystems 685 merge the control information for each data unit with the corresponding payload data received over their respectively coupled uneditable path 677. The merger subsystems 685 behave, in this respect, in the same manner as merger subsystem 485.

Finally, merger subsystems 685 output the merged data units. The component or components to which they output the merged data units may differ depending on the embodiment. However, in general, the outputs of the merger subsystems 685 are coupled to either port group 695 or circuitry configured to use the control information to determine other components and/or interfaces (i.e. other destinations) to which to send the data unit. For instance, in an embodiment, each merger subsystem 685 may output merged data units to a different interconnect, as described previously.

Distributor

In an embodiment, a traffic manager 640 may from time to time output data units—or more specifically the control portions of the data units—along the editable paths 672 at a rate that, in aggregate, exceeds the rate at which packet processor 680 can process the data units. To avoid or at least reduce the dropping of data units that cannot be processed by the packet processor 680 during these periods, the control paths 672 may converge at a distributor component 675, comprising a buffer memory configured to temporarily store data units (or at least their control portions) while they await processing by the packet processor 680. When packet processor 680 is ready for another data unit—which, depending on the embodiment, may be after a fixed number of clock cycles, when packet processor 680 signals that it is ready, etc.—a next data unit is released from the buffer memory of the distributor 675 to packet processor 680.

Different buffering techniques may be utilized depending on the embodiment. For instance, the buffer memory may be a simple first-in-first-out ("FIFO") buffer, from which data units are released to packet processor 680 in the order they arrive, regardless of their data unit source or other characteristics. Or, the buffer memory may be organized into separate queues. Such queues may correspond to the editable path 672 over which the data units they enqueue were received and/or to characteristics of those data units.

In an embodiment, to further avoid or at least reduce the dropping of data units that cannot be processed by the packet processor 680 during periods of high traffic, the distributor 675 may support backpressure based on the current FIFO occupancy level and/or other factors. The distributor 675 may further be configured to indicate this backpressure to the traffic manager 640, which may in turn be configured to slow the rate at which data units are sent.

In embodiments where the buffer memory is other than a simple single FIFO buffer, a scheduler is included in the distributor 675. The scheduler is configured to select which data unit to release to the packet processor 680 whenever the packet processor 680 is ready to process another data unit. The scheduler may select a next data unit in a variety of manners. For instance, in an embodiment, the scheduler is configured to select a specific queue from which to release the next data unit. The queues may be, for instance, FIFO-based queues. Hence, by selecting the next queue, the scheduler selects the next data unit to release (i.e. the data unit at the head of the selected queue).

The scheduler may use any of a number of policies to determine which queue to select. For instance, the scheduler may implement a round-robin policy, weighted round-robin policy, probabilistic policy, or any other suitable policy. In some embodiments, the scheduler may adapt its policy in accordance to information about the current operations of the device in which it is deployed. Such information is referred to herein as demand data, and may include, for instance, information about how full various memory resources are, the sizes of certain queues both within and without the distributor 675, the amount of traffic received over certain ports or groups of ports, and so forth.

In an embodiment, the buffer memory at the distributor 675 may become full. At such times, or in anticipation of such times, the scheduler may send a command to one or more traffic managers 640 to slow down the rate at which they send data units, or even pause delivery of data units.

FIG. 6 illustrates but one example of an egress block 670 with a shared packet processor 680. Other egress blocks with a shared packet processor may include fewer, additional, or different components, and the division of work between the components may vary depending on the arrangement. For instance, there may be more than two editable paths 672 that converge, and there may be a corresponding number of uneditable paths 672 and merger subsystems 685. As another example, distributor 675 may be optional in certain embodiments.

As yet another example, merger subsystems 685 may share a port group 695, or be connected to a common interconnect that permits sharing of two or more port groups 695.

In an embodiment, a distributor 675 may be coupled to multiple packet processors 680, and include one or more schedulers for selecting data units to send to the packet processors 680. For instance, there may be a group of two or more packet processors 680 shared amongst one, two, or any other number of traffic managers 640, and distributor 675 may manage the dispatch of data units to these packet processors 680.

As yet another example, more than one traffic manager 640 may be coupled to egress block 670. Each traffic manager may have at least one pair of paths 672 and 677 into egress block 670. Each of the editable paths 672 may converge at the distributor 675 or packet processor 680, regardless of its source traffic manager 640. Each pair of paths 672 and 677 may have its own merger subsystem 685.

In an embodiment, individual traffic managers 640 may be coupled to more than one egress blocks 670. Different data units may be assigned to different egress blocks 670 for processing, based on metadata associated with the data units. For each egress block 670, a traffic manager 640 may have its own editable path 672 and uneditable path 677. However, multiple traffic managers 640 may nonetheless be coupled to the same packet processor 680. That is, for example, a first traffic manager and a second traffic manager may both send data units (or the control portions thereof) that have a first characteristic to a first egress block 670 via a first editable path 672, data units that have a second characteristic to a second egress block 670 via a second editable path 672, and so forth.

Examples of these and other egress blocks are described, without limitation, in the afore-mentioned U.S. patent application Ser. No. 15/433,825 and U.S. patent application Ser. No. 16/033,680.

Shared Data Path Resources

According to an embodiment, an egress block such as egress block 670 may also or instead share one or more resources across a plurality of uneditable paths 677, in similar manner to the way in which the packet processor 680 is shared on the editable path 672. The uneditable paths may converge at a common distribution component that behaves in similar manner to distributor 675 in regulating the flow of payload portions to some shared resource, such as a processor or buffer. The payload portions are then demuxed after passing through the resource and sent to the appropriate merger subsystem.

Such a data handling system may or may not include a shared packet processor on the editable path, depending on the embodiment. In some embodiments, a first data handling system having a shared uneditable path resource may coexist in the same device, or even the same processing stage, with a second data handling system having a shared editable path packet processor. In other embodiments, a data handling system having a shared data path resource may be used in a network device entirely without a data handling system having a shared control path packet processor.

2.13. Multiple Egress Blocks with Non-Shared Traffic Managers

Figure 7:
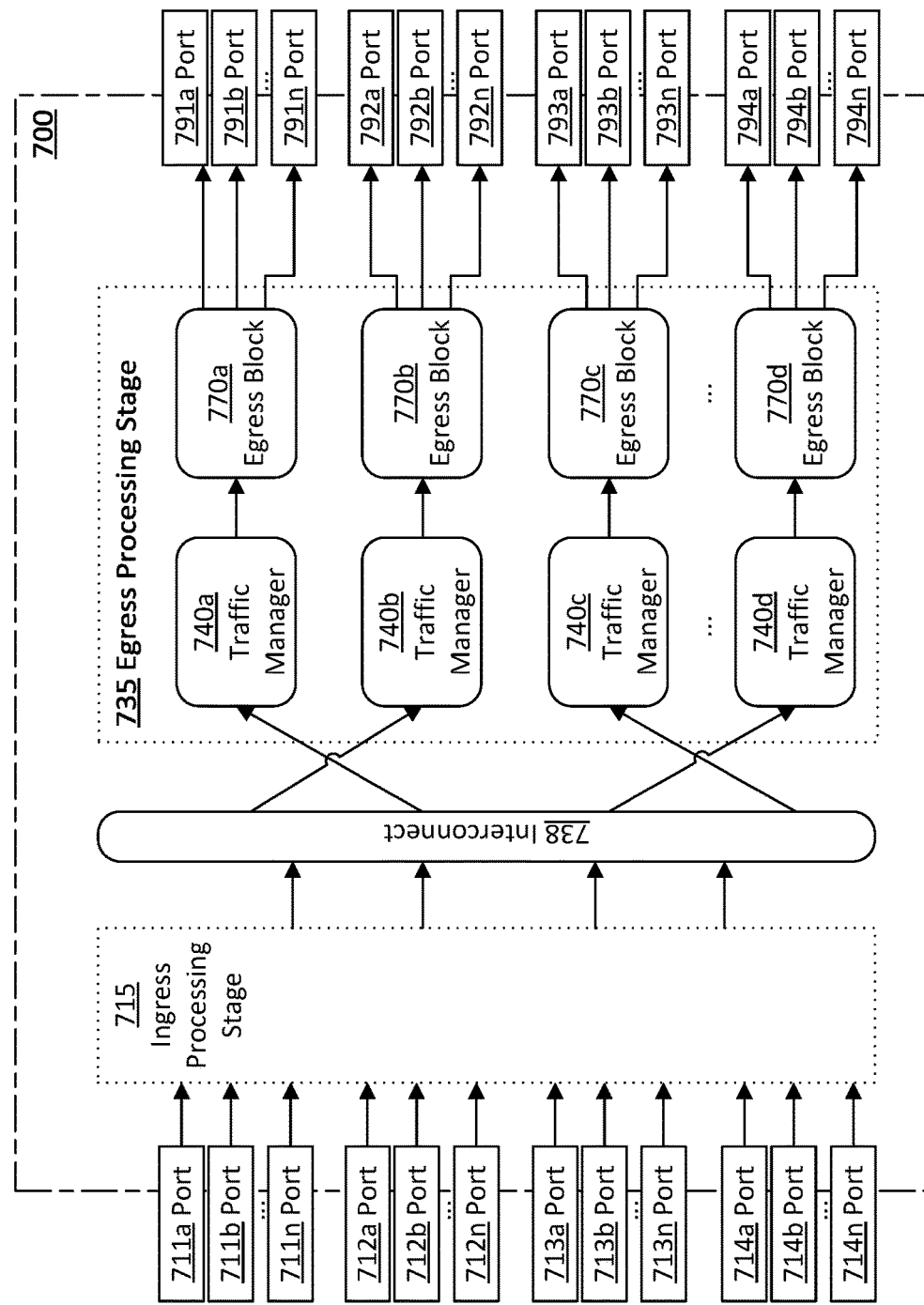
FIG. 7 is an illustrative view of various aspects of an example network device comprising multiple egress blocks and non-shared traffic managers.

FIG. 7 is an illustrative view of various aspects of an example network device 700 comprising multiple egress blocks 770 and non-shared traffic managers 740, according to an embodiment. Device 700 shares many components in common with device 200, and indeed may be an alternate view of device 200, though it will be realized that device 700 may be implemented without the specific details of device 200, as well.

Data units, such as data units 205, arrive at device 700 via any of a number of ingress ports 711-714, similar to ports 210. In an embodiment, ports 711-714 may be arranged as port groups. For instance, ports 711*a-n* may belong to a first port group, ports 712*a-n* may belong to a second port group, and so forth. Ports 711-714 are coupled to one or more components in an ingress processing stage 715, such as one or more of arbiters 220 and/or ingress blocks 230 from FIG. 2. In an embodiment, each group of the ports 711-714 is coupled to a different arbiter, which may in turn be coupled to a different ingress block. In another embodiment, one or more ingress blocks are shared by multiple arbiters. Of course, many other arrangements of components within an ingress processing stage 715 are possible, and the techniques described herein are not specific to any particular arrangement of ingress processing stage 715.

The ingress processing stage 715 may be coupled to one or more interconnects 738. For instance, if the ingress processing stage 715 includes multiple ingress blocks, the output of each ingress block (e.g. the output of an ingress packet processor or an ingress merger subsystem) may be coupled to an input interface of interconnect 738. The interconnect 738 may be any component, such as a crossbar, capable of accepting a data unit as input via one or more input interfaces and sending or writing that data unit as output to one or more identified destinations out of a plurality of different destinations that are coupled to the interconnect 738. The interconnect component 738 may comprise one or more outgoing interfaces for each possible destination component for a data unit. In the depicted embodiment, the destinations are traffic managers 740, though other types of destinations may also be included.

In an embodiment, interconnect 738 identifies the appropriate interface(s) to send a data unit using associated control information, such as may be generated by an ingress packet processor during the ingress processing stage 715. The interconnect component 738 may be configured to send a single data unit out on one interface (for single-destination traffic) or configured to send a copy of the data unit to each of any number of interfaces (for multi-destination traffic), depending on which destination(s) are identified by the control information. The interconnect 738 can send traffic out each interface concurrently. Typically, the interconnect 738 receives and dispatches data units 738 as separate portions (e.g. the individual cells of a packet) over a period of time.

Each traffic manager 740 is coupled to the interconnect 738 via one or more interfaces, via which the traffic manager 740 may receive data units or portions thereof. Traffic manager 740 may be any type of traffic manager, including any traffic manager described herein. There may be any number of traffic managers 740 in system 700, each having its own buffers and queues. In an embodiment, all portions of the same data unit should be forwarded to the same traffic manager. Moreover, in the case of multi-destination traffic, copies of a data unit may be forwarded to multiple traffic managers 740.

Each traffic manager 740 is coupled to an egress block 770, to which the traffic manager 740 is configured to send up to a certain amount of data a given time slot. Egress blocks 770 may be any type of egress block, including those already described herein. Traffic managers 740 and egress blocks 770 are said to form, collectively, an egress processing stage 735.

Egress blocks 770 are configured to process the data units they receive and send the data units out egress ports 791-794. In an embodiment, like ingress ports 711-714, egress ports 791-794 may be arranged as port groups, with each group of ports 791-794 being coupled to a different egress block 770.

The additional egress blocks 770 and ports 791-794, of course, increase the flexibility of the device 700 in connecting greater numbers of network nodes at, potentially, increased speeds. However, a potential drawback of adding increasingly greater numbers of egress blocks 770 and/or ports 791-794 is that, conventionally, each group of ports 791-794 and/or egress block 770 requires at least one separate traffic manager 740. Each additional traffic manager 740, meanwhile, requires its own memory and processing resources, the costs of which places practical limits on the number of traffic managers 740 (and therefore, conventionally at least, on the number of ports 791-794 and egress blocks 770) that can be included in a device 700.

2.14. Shared Traffic Manager

Figure 8:
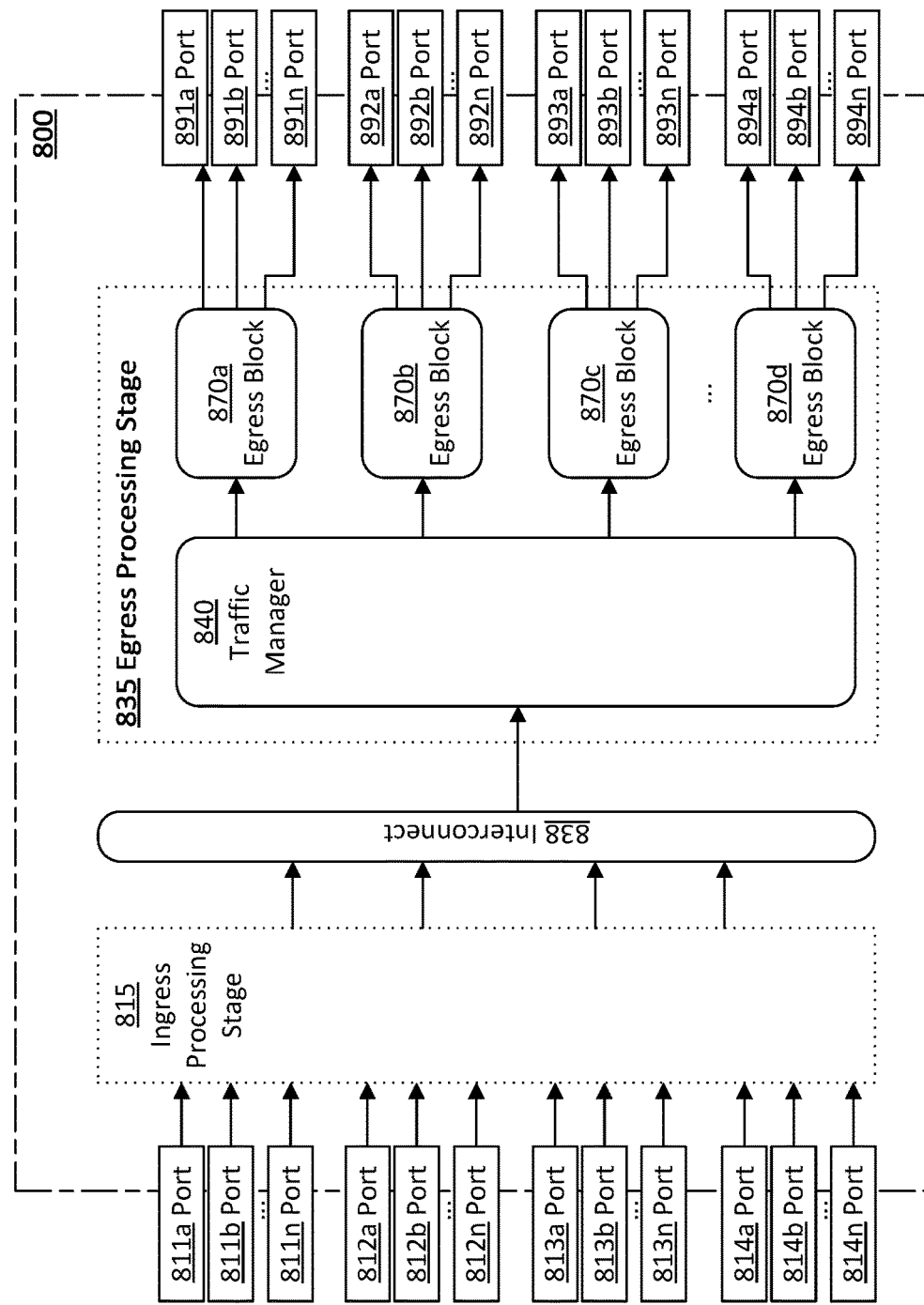
FIG. 8 is an illustrative view of various aspects of an example network device comprising multiple egress blocks and a shared traffic manager.

According to an embodiment, improved memory utilization and other benefits may be realized through the use of a shared traffic manager. FIG. 8 is an illustrative view of various aspects of an example network device 800 comprising multiple egress blocks 870 and a shared traffic manager 840, according to an embodiment. As with device 700, device 800 shares many components in common with device 200, and indeed may be an alternate view of device 200, though it will be realized that device 800 may be implemented without the specific details of device 200, as well.

Device 800 is in a number of ways similar to device 700. For instance, device 800 comprises ingress ports 811-814, an ingress processing stage 815, an interconnect 838, egress blocks 870, and egress ports 891-894, which are similar to ingress ports 711-714, ingress processing stage 715, interconnect 738, egress blocks 770, and egress ports 791-794, respectively.

However, the egress processing stage 835 of device 800 includes only a single traffic manager 840 shared amongst the egress blocks 870. Traffic manager 840 functions, in many aspects, similar to traffic manager 240, in that it is coupled to buffers and queues by which it regulates the flow of data units to egress blocks 870. However, traffic manager 840 comprises output interfaces for more than just a single egress block 870. For instance, the traffic manager 840 may be coupled to an editable interface and an uneditable interface for egress block 870a, an editable interface and an uneditable interface for block 870b, and so forth.

Accordingly, traffic manager 840 may include logic for determining which egress block(s) 870 to send a data unit to. This logic may utilize, for instance, control information or other data unit metadata to identify a port 891-894 or group of ports targeted by a data unit. Based on this identification, the logic may send the data unit to the appropriate egress block(s) 870.

Because the traffic manager 840 is shared amongst the egress blocks 870, memory and other resources may, in at least some contexts, be better utilized for traffic management than in a device such as device 700. For example, suppose a device has, in aggregate, a 4 MB buffer for traffic management. In device 700, each traffic manager 740 would be limited to buffering 1 MB of data units, since they each have their own buffer memory. If an egress port or port group 791-794 were to suddenly experience a large amount of traffic, the traffic would have to be dropped once its traffic manager hit the 1 MB buffer limit. By contrast, the traffic manager 840 would be able to utilize the full 4 MB buffer. If an egress port or port group 891-894 were to suddenly experience a large amount of traffic, the traffic may not need to be dropped until its traffic manager hit the 4 MB buffer limit.

Figure 9:
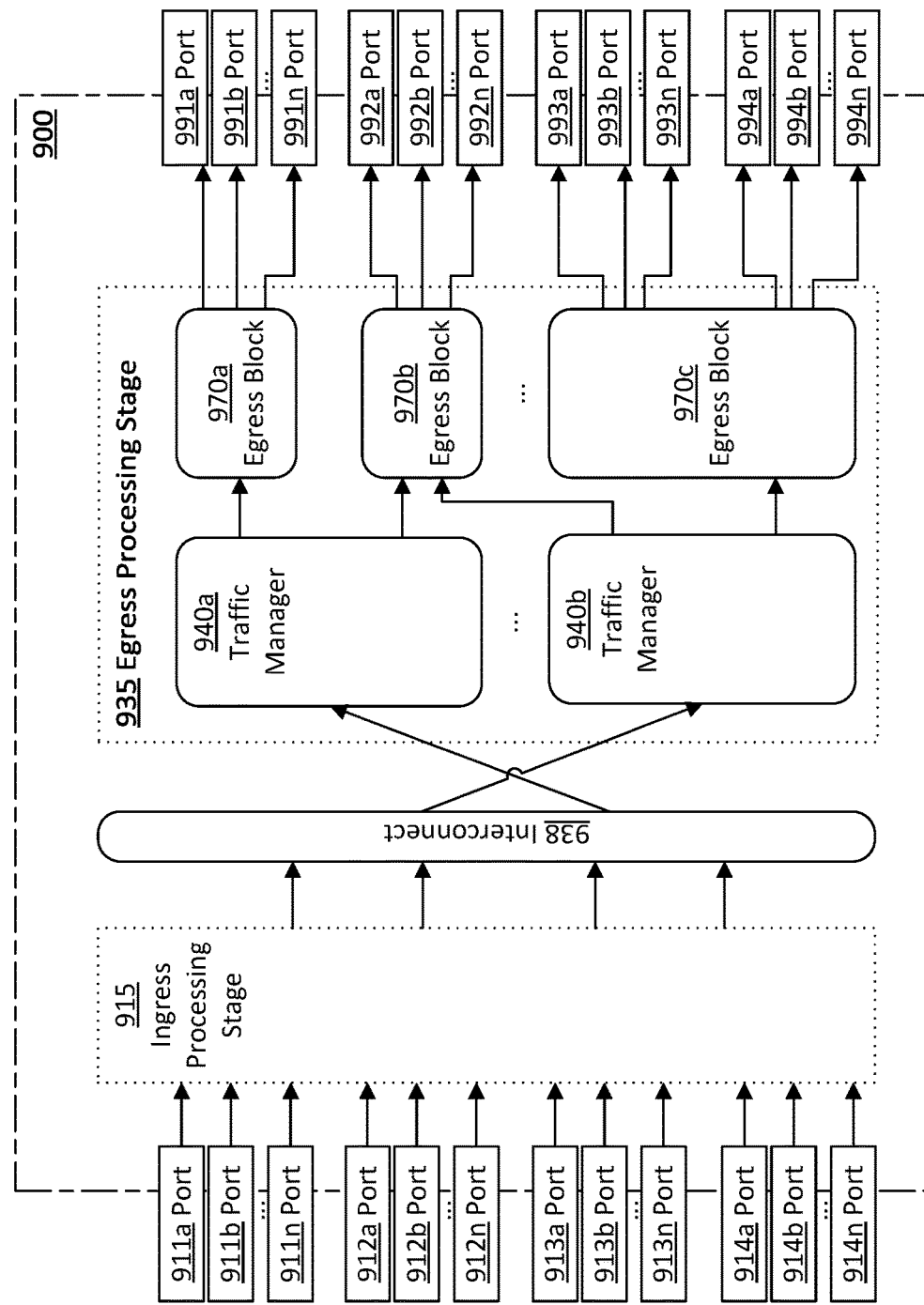
FIG. 9 is an illustrative view of various aspects of an example network device comprising multiple egress blocks and multiple shared traffic managers.

In other embodiments, there may be multiple shared traffic managers in a device. Such a configuration may realize some of the advantages of sharing a single traffic manager for all egress blocks, without the complexity of interconnecting a traffic manager with all of the egress blocks. For example, FIG. 9 is an illustrative view of various aspects of an example network device 900 comprising multiple egress blocks 970 and multiple shared traffic managers 940, according to an embodiment.

Device 900 is in many ways similar to device 800 and device 700. For instance, device 900 comprises ingress ports 911-914, an ingress processing stage 915, an interconnect 938, egress blocks 970, and egress ports 991-994, which are similar to ingress ports 811-814, ingress processing stage 815, interconnect 838, egress blocks 870, and egress ports 891-894, respectively.

However, the egress processing stage 935 of device 900 includes multiple traffic managers 940 shared amongst the egress blocks 970. For instance, traffic manager 940a is couple to both egress blocks 970a and 970b, while traffic manager 940b is coupled to egress blocks 970b and 970c. Of course, in other embodiments, a traffic manager 940 may be coupled to any number of egress blocks 970, and there may be any number of shared traffic managers 940 in a device 900.

The traffic managers 940 need not be identical. For instance, they may have different buffer sizes, queue assignment logic, and so forth. In an embodiment, various aspects of the traffic managers 940 may be configurable so as to adapt to certain traffic flows or patterns. In an embodiment, some traffic managers 940 may be dedicated traffic managers that are coupled to a single egress block 970.

Moreover, though device 900 is depicted as having a shared egress block 970b that is coupled to both traffic managers 940a and 940b, in other embodiments, shared traffic managers 940 need not share a common egress block 970.

2.15. Traffic Manager with Statistical Buffer

As previously suggested, memory units only support a limited number of input or output (I/O) operations in a given time slot (e.g. clock cycle). For instance, single-ported memories—which are often desirable for use as buffers on account of their relatively high speeds and low expense—may only support a single read or write per time slot. Consequently, the rate at which a traffic manager can supply data units to egress blocks is limited by the number of operations supported by the memory units within the traffic manager. In a device with a shared traffic manager, this limitation may be more pronounced than in a device without shared traffic managers, since the average rate at which a conventional traffic manager can provide data units to any single egress block is effectively divided by the number of egress blocks that share the traffic manager.

According to an embodiment, a shared traffic manager such as traffic manager 840 or traffic managers 940 may utilize more than one bank of memory to buffer data units. During a given time slot, an entire data unit portion may be written to or read from each of the banks, and each data unit portion may then be forwarded to the appropriate egress block. Hence, the rate at which the traffic manager can provide data units to egress blocks is increased in proportion to the number of banks in the traffic manager's buffer.

Figure 10:
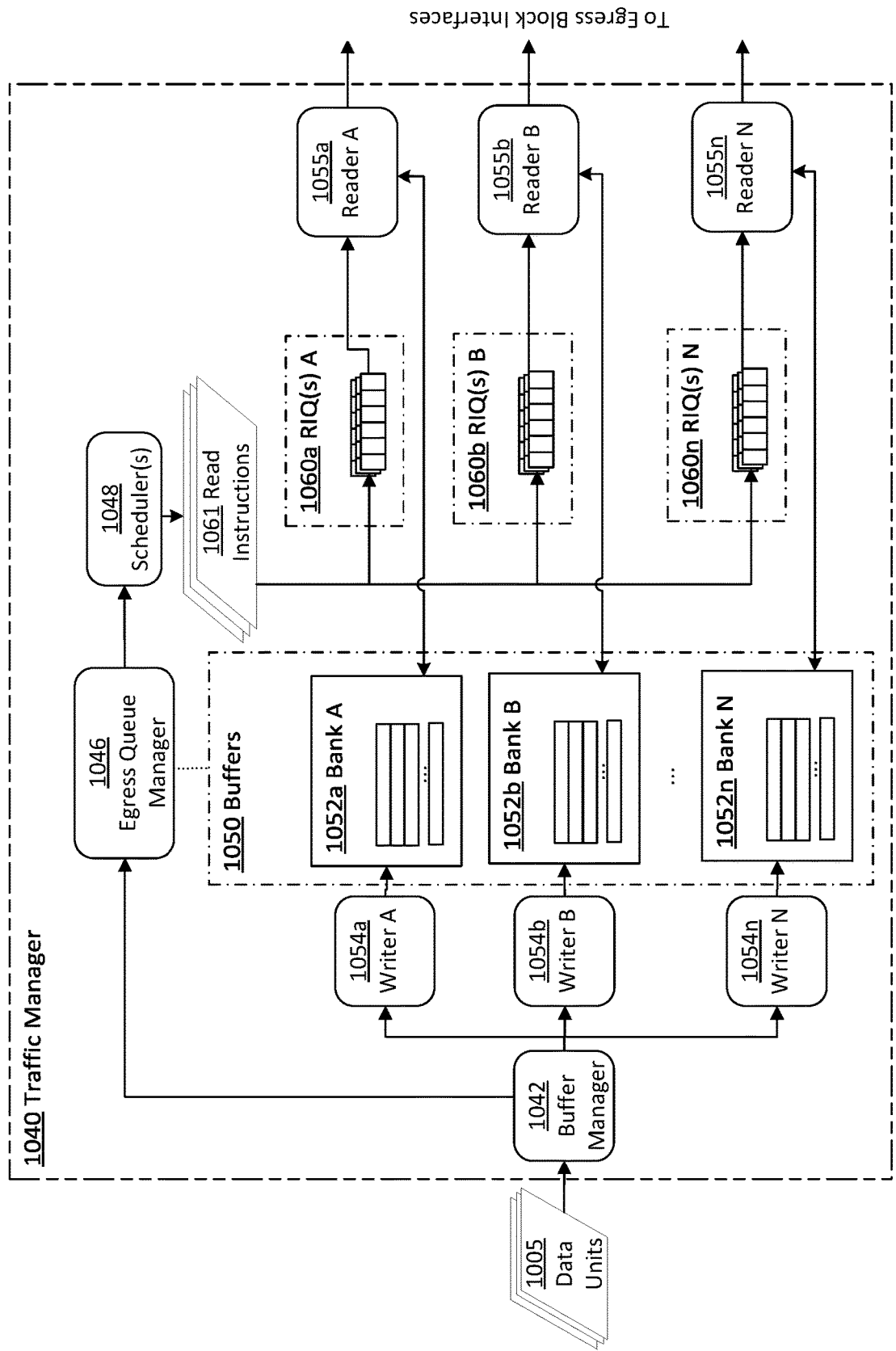
FIG. 10 is an illustrative view of a shared traffic manager in which data unit portions are buffered in multiple banks.

FIG. 10 is an illustrative view of a shared traffic manager 1040 in which data unit portions are buffered in multiple banks 1052, according to an embodiment. The traffic manager 1040 is configured to receive data units 1005, such as packets, in discrete portions, such as cells or frames.

Buffer Management

Once received, the data unit portions are analyzed by a buffer manager 1042 of traffic manager 1040. The buffer manager 1042 uses various buffer assignment logic to assign the data unit portions to be stored in particular buffer entries within egress buffers 1050, which are in many ways similar to egress buffers 250.

Buffers 1050 comprises a plurality of banks 1052a-n, collectively banks 1052. Each bank comprises any number of entries, each of which is of a size sufficiently large enough to store any given data unit portion. Banks 1052 may be physical banks, or banks 1052 may be logical banks comprised of multiple physical banks. In the latter case, each entry within the banks may be striped across the multiple physical banks. In either case, banks 1052 are limited in the number of I/O operations that may be performed in a given time slot. For instance, in an embodiment, banks 1052 are single-ported, meaning only buffer entry may be read or written in a single time slot.

Buffer manager 1042 may utilize any buffer assignment logic, depending on the embodiment. For instance, buffer manager 1042 may assign data unit portions to banks 1052 at random. As another example, buffer manager 1042 may track one or more recent banks 1052 to which portions of a data unit 1005 were written, and select to store the next portion of the data unit in a bank other than these one or more recent banks 1052.

As yet another example, buffer manager 1042 may select banks 1052 to store data units 1005 in using a round-robin approach, either for every data unit portion it receives, or on a data-unit-by-data-unit basis. For instance, in the latter case, the buffer manager 1042 may store a "next bank" pointer for each data unit 1005. A data unit's next bank pointer indicates the next bank 1052, in a circular sequence of banks 1052, to select for writing the next data unit portion of the data unit 1005 that the traffic manager 1040 receives. In embodiments where read operations have priority over write operations, this next bank is not necessarily the next bank to be written, but the next bank from which to begin searching for a non-conflicting bank to write to. For example, in the event that the bank 1052 to which the pointer points is unavailable for writing in the next clock cycle (e.g. because it is locked for another I/O operation, or it is full), the next available bank 1052 in the sequence may be selected instead. The next bank pointer is then updated to point to the next bank 1052 in the sequence after the bank 1052 just selected.

In selecting a bank to write a data unit portion to in a given time slot, buffer manager 1042 must consider which banks 1052 are already being accessed during the time slot, and avoid writing to any banks 1052 that have reached their access limit. In some embodiments, buffer manager 1042 always selects banks 1052 to write to before any other component reads banks 1052. In other embodiments, buffer manager 1042 may be configured to select a bank 1052 to write to after certain read operations have already been selected by other components, and buffer manager 1042 must therefore communicate with these other components to identify banks that may be unavailable on account of the read operations.

Traffic manager 1040 comprises a writer component 1054 for each bank 1052. A writer 1054 receives a write request comprising the data unit portion to write, as well as an address to which the buffer manager 1042 has selected to write the data unit portion in the bank 1052 associated with the writer 1054. The actual address may be selected using any suitable selection technique. In an embodiment, buffer manager 1042 includes a "free list" that indicates which entries in which banks 1052 are available for writing. This list is updated any time a data unit portion is written, so as to avoid overwriting the data unit portion with a subsequently received data unit portion. An address is added back to the free list when the data unit portion is no longer needed (e.g. dropped, sent from the traffic manager 1040, etc.).

Egress Queue Management

Egress queue management logic 1046 within traffic manager 1040 places data units 1005 in one or more egress queues, such as egress queues 245. Any suitable queue assignment logic may be utilized to assign data units 1005 to egress queues. For instance, in an embodiment, there may be an egress queue for each egress port to which the traffic manager 1040 can send data. Moreover, there may be different queues for different types of data units 1005.

In some embodiments, a traffic manager 1040 may forward a data unit 1005 in one of two different modes. First, certain data units 1005 may be forwarded in a store-and-forward ("SAF") mode. In this mode, a data unit 1005 must be fully received by the traffic manager before it is eligible for transfer. Hence, the egress queue management logic 1046 may wait to assign and link a data unit 1005 to a queue until the entire data unit 1005 has been buffered. Second, certain other data units may be forwarded in cut-through ("CT") mode. In this mode, a data unit 1005 is eligible for transfer as soon as its first portion has arrived. In an embodiment, there may be different queues for each mode, with CT mode data units taking priority so long as there is no egress contention. In yet other embodiments, a traffic manager 1040 may forward in only one of these modes.

Whatever assignment technique is used, egress queue manager 1046 places the data unit 1005 in the selected queue or queues by, for example, linking the data unit 1005, or metadata describing the data unit 1005, to the tail end of the queue or queues. Metadata describing a data unit 1005 may include, for instance, various attributes of the data unit 1005 and/or locations within the banks 1052 at which to find particular portions of the data unit 1005, or chains of data unit portions.

Traffic manager 1040 further comprises a plurality of schedulers 1048. Each scheduler 1048 may be associated with one or more queues, from which the scheduler 1048 may select a next data unit portion to schedule for sending from the traffic manager 1040 in a given time slot. For instance, there may be a scheduler 1048 for each packet processor, each port, and/or each port group in the egress blocks to which the traffic manager 1040 is coupled. The scheduler 1048 may be configured to select a particular data unit portion to send, from the set of all queues associated with its packet processor, port, or port group. In an embodiment, there is one scheduler 1048 per egress block. In another embodiment, there may be multiple schedulers 1048 per egress block.

In an embodiment, a scheduler 1048 that is associated with multiple queues may comprise logic for determining which queue to select from next. For instance, the scheduler 1048 may select from the queues based on priority levels associated with the queues, based on a weighted round-robin or probabilistic selection algorithm, based on the relative sizes of the queues, based on the ages of the data units at the head of the queues, based on which egress ports are associated with which queues, and/or using any other selection strategy.

In an embodiment, a data unit may be sent over multiple time slots. For instance, in an embodiment, only a single data unit portion, or a limited number of data unit portions, may be selected for sending per time slot. In one such embodiment, the scheduler 1048 may continue to schedule the sending of the data unit portions belonging to the data unit 1005 for each successive time slot after the data unit is initially selected, until the entire data unit is released. The scheduler 1048 may then select another queue from which to release a data unit 1005.

In an embodiment, when a next data unit is select, the scheduler 1048 copies various dequeue metadata, such as pointers to the head portions of the data unit in each bank 1052, a transmit context for the port associated with the queue from which the data unit was selected. In each successive clock cycle or other suitable time slot, so long as the metadata in the transmit context still indicates that there are unscheduled portions of the data unit to be dequeued, the scheduler 1048 uses the transmit context to locate and schedule data unit portions for release. When no further portions need to be scheduled, if additional copies of the data unit need not be made, the data unit is removed from its queue. Otherwise, the scheduler 1048 may leave the data unit in its queue. The scheduler 1048 then selects a new data unit. If the data unit that was just selected was not removed from its queue, the next selected data unit may or may not be the same data unit that was just selected.

Of course, any other queue management and scheduling approaches may be utilized, depending on the embodiment.

Read Instruction Queues

In an embodiment, to avoid read conflicts and/or optimize read operations from the banks 1052, when the schedulers 1048 schedule a data unit portion to be released, that portion is not necessarily read immediately. Rather, the schedulers 1048 are configured to generate read instructions for the scheduled data unit portions, and add those read instructions to read instruction queues 1060.

A read instruction may indicate various information about a read operation that needs to be performed to obtain the desired data unit portion from the location in buffers 1050 to which the data unit portion was written. For instance, the read instruction may indicate the address of an entry in a bank 1052 that stores the data unit portion, an egress block to which the data unit portion should be sent, and an egress block interface to use to send the data unit portion. Additionally, the read instruction may store other data such as a data unit identifier, a timestamp of when the read instruction was generated, an egress queue identifier, a priority score for the data unit, various attributes of the data unit, a size of the data unit portion, or any other relevant metadata.

A read instruction queue may also be referred to herein as a "RIQ." In an embodiment, each bank has a separate set of RIQs 1060, each corresponding to a different scheduler 1048. In another embodiment, certain RIQs may be shared by multiple schedulers. For instance, a certain egress block may have more than one scheduler, but there may be a common RIQ in each bank for all of the schedulers of the egress block.

A RIQ 1060 may operate the same as any other queue described herein. For instance, if the RIQ 1060 is a FIFO queue, read instructions may be added to the tail of the queue, and popped from the head of the queue when they are ready for execution. Of course, non-FIFO RIQs 1060 may also be implemented.

RIQ Optimizer

In an embodiment, traffic manager 1040 may further comprise an optional RIQ optimizer that analyzes RIQs 1060 periodically or at other intervals to identify read instructions that may be consolidated.

For example, a multi-destination data unit 1061 may have been replicated one or more times, as described in other sections. The data unit 1061 may thus, for instance, have ended up linked to two or more egress queues, each targeting a different egress block. Two different schedulers 1048 may thus generate two different read instructions 1061 for a given portion of the data unit at potentially different times. These read instructions 1061 may end up in different RIQs 1060 for the same bank 1052. The RIQ optimizer may consolidate these read instructions 1061 into a single read instruction 1061 that targets multiple egress blocks and/or egress block interfaces. The consolidated read instruction 1061 may replace one of the original read instructions 1061, while the other original read instruction 1061 may be removed. In this manner, duplicate read operations may be reduced, thus improving the efficiency of traffic manager 1040. This consolidation technique may apply to any read instructions for replicated data units, regardless of the manner of replication.

As another example, in certain embodiments, a logical bank 1052 that stripes data unit portions across two or more physical banks may store duplicate copies of smaller data unit portions in physical banks that would otherwise remain empty. The RIQ optimizer may consolidate read instructions 1061 for two or more such smaller data unit portions into a single read instruction 1061 that reads the two of more smaller data units from different physical banks within the logical bank 1052. Specific details of such a consolidated read instruction 1061 are described in other sections.

In an embodiment, instead of having an RIQ optimizer, the afore-mentioned collapsing of instructions together may be performed whenever a potentially collapsible read instruction is selected for execution. That is, for example, when a read instruction for a certain address is selected, the RIQs 1060 are scanned for any other read instructions for the same address, which are then collapsed into the originally selected read instruction.

Readers

Traffic manager 1040 further comprises a reader 1055 for each bank 1052. A reader 1055 is configured to execute one or more read instructions 1061 from one or more of the RIQs 1060 for its associated bank 1052 in any time slot in which the reader 1055 is not precluded from accessing the bank 1052 by, for example, write operation(s) from a writer 1054. For instance, in an embodiment where each bank 1052 is single-ported, the reader 1055a may execute a single read instruction 1061 in any clock cycle that the writer 1054a does not write to bank 1052a.

Depending on the embodiment, read operations may have priority over write operations, or vice versa. When write operations have priority, readers 1055 may simply be blocked from reading a bank in any time period when there insufficient I/O operations remaining to access the bank. When read operations have priority, however, traffic manager 1040 may further include a read policy engine to prevent certain banks from being read one or more times in a given time period, so as to ensure that there will be enough I/O access remaining to fulfill any write requests for that time period. Any suitable resource scheduling mechanism may be utilized. For instance, banks may be blocked from read operations based on round-robin or random selection, based on average RIQ scores or other scoring mechanisms, based on which banks were previously written to in one or more previous clock cycles, and/or based on any other suitable factors.

The data unit portion(s) read by reader 1055 are then sent to the egress block(s), or egress block interface(s), identified by the read instruction 1061, potentially via one or more intermediary components described in other sections. For example, if the data unit portion is a SOP cell, the read instruction 1061 might indicate to send the data unit portion to a specific editable interface of a certain egress block. Likewise, if a data unit portion is in the middle or at the end of a data unit 1005, the read instruction 1061 might indicate to send the data unit portion to an uneditable interface of a certain egress block.

Although depicted as logically separate, it will be recognized that, in at least some embodiments, a writer 1054 and reader 1055 may actually be a single I/O component that either reads or writes depending on the demands of traffic manager 1040.

Arbitration Unit

As mentioned, each bank 1052 may have a plurality of RIQs 1060. A bank 1052 may have, for example, one or more RIQs 1060 for each scheduler 1048. A traffic manager 1040 may utilize a variety of techniques to select between these RIQs 1060 when determining the next read instruction 1061 for a reader 1055 to process.

Figure 11:
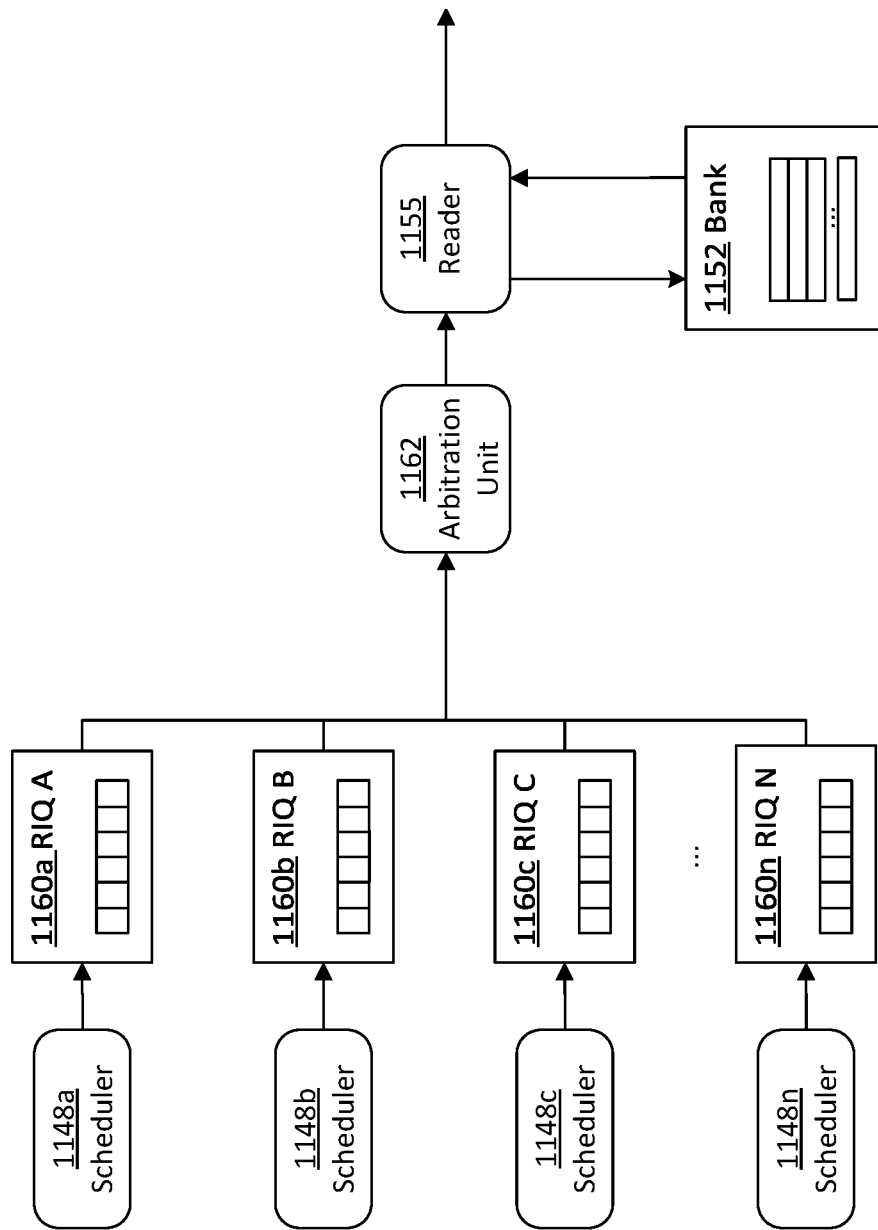
FIG. 11 illustrates the use of an arbitration unit to select between a set of read instructions for a bank.

For example, FIG. 11 illustrates the use of an arbitration unit 1162 to select between a set of RIQs 1160 for a bank 1152, according to an embodiment. Arbitration units 1162 are, collectively, an example of read operation selection logic configured to select read instructions to execute from one or more RIQs. As illustrated in FIG. 11, multiple schedulers 1148 may generate read instructions, such as read instructions 1061, for a bank 1152. The read instructions generated by each scheduler 1148 may be placed in a different RIQ 1160 belonging to that scheduler. Each time slot, if access to bank 1152 is not otherwise precluded (e.g. by a write operation, by a policy engine, etc.), the arbitration unit 1162 may select a number of read instructions from the RIQs 1160 for execution by reader 1155. For instance, in embodiments with single-ported banks 1152, the number of read instructions selected by arbitration unit 1162 in a time slot may be limited to one.

Arbitration unit 1162 may use any of a variety of techniques to determine which read instruction to select. For instance, arbitration unit 1162 might select the read instruction within the RIQs 1160 that has the oldest timestamp, or the read instruction for the oldest data unit portion. As another example, arbitration unit 1162 might prioritize selection of editable data unit portions over uneditable data unit portions, or vice versa, depending on the context. In an embodiment, arbitration unit 1162 may select a read instruction based on whether it is collapsible with another read instruction, based on criteria similar to that explained with respect to the RIQ optimizer above.

In some embodiments, only the heads of RIQs 1160 may be selected. Hence, selecting a read instruction from RIQs 1160 may, in essence, amount to selecting a RIQ 1160. The RIQ 1160 from which to take the next read instruction may selected using a round-robin approach, a weighted round-robin approach, a probabilistic approach, a random approach, in accordance to some fixed pattern, or using any other selection approach. In an embodiment, the next RIQ 1160 may be selected based on the size of the RIQ 1160, or a moving average thereof. In an embodiment, the next RIQ 1160 may be selected based on the age of the data unit portion being read by the read instruction at the head of the RIQ 1160, or on the average age of all data unit portions targeted by the read instructions in the RIQ 1160.

In an embodiment, RIQ scores may be generated for individual read instructions and/or RIQs 1160. RIQ scores may be a function of one or more metrics, including, without limitation, any of the metrics mentioned above. For instance, a RIQ score may be generated for at least the read instruction at the head of each RIQ 1160, and the arbitration unit 1160 may select the highest scoring read instruction.

Regardless of how the read instruction is selected, arbitration unit 1162 forwards the selected read instruction to reader 1155, which then executes the selected read instruction and outputs the corresponding one or more data unit portions. In an embodiment, some or all of the metadata in the read instruction, or even the entire read instruction, may be outputted in associated with the data unit portion.

Arbitration units such as arbitration unit 1162 may be deployed within a shared traffic manager such as shared traffic manager 1040, between each reader and its corresponding RIQs.

Tiered Arbitration of RIQ Sets

Figure 12:
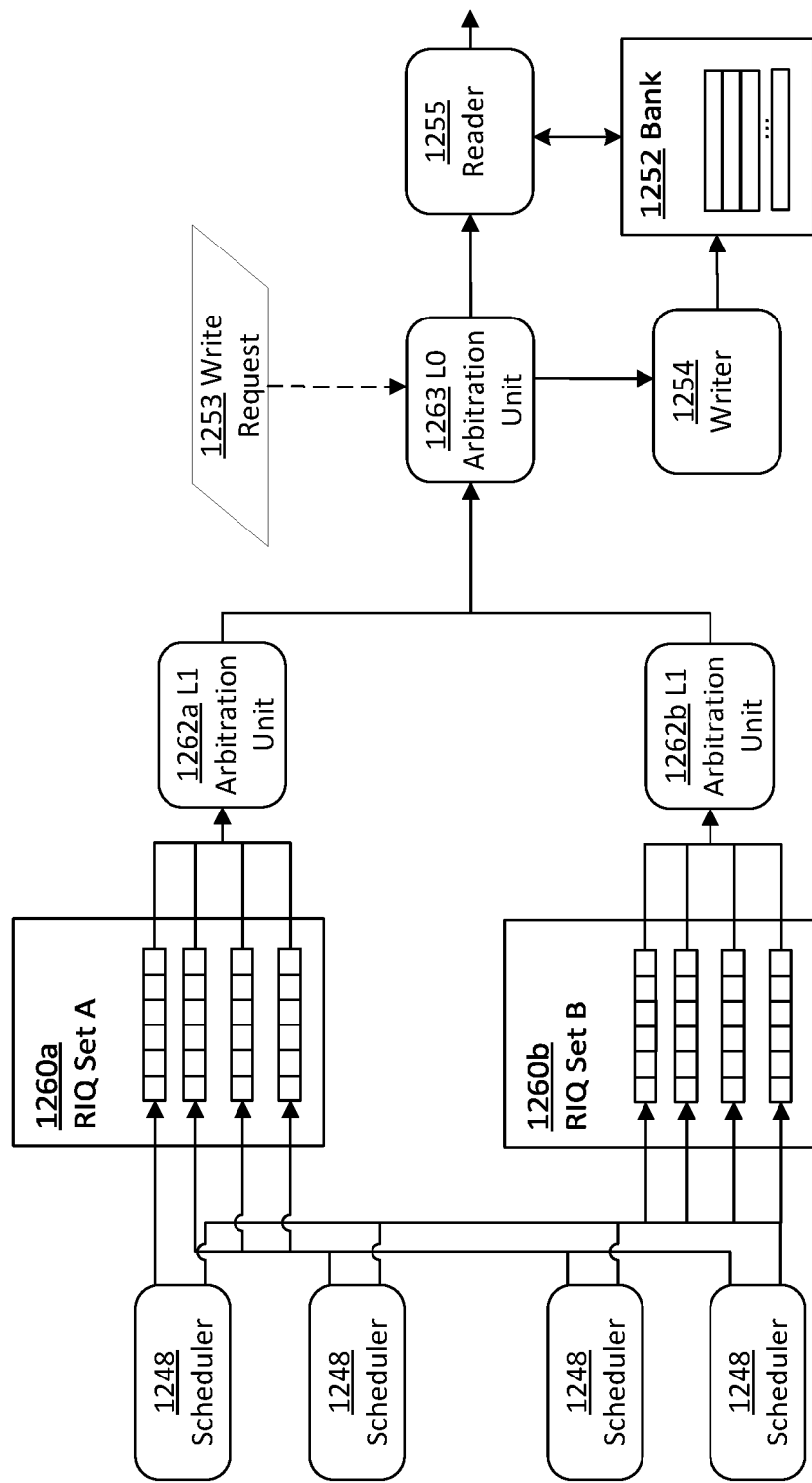
FIG. 12 illustrates one example architecture for arbitrating between multiple sets of read instruction queues.

Alternatively, there may be multiple sets of RIQs for each bank 1052 of traffic manager 1040, requiring tiered arbitration techniques. FIG. 12 illustrates one example architecture for arbitrating between multiple sets of RIQs 1260, according to an embodiment. Each scheduler 1248 is coupled to multiple RIQs for bank 1252, each pertaining to a different RIQ set 1260. Each RIQ set 1260 may be associated with a different attribute of the targeted data unit portion or read instruction. The scheduler 1248 may send a read instruction associated with a certain attribute to the RIQ in the RIQ set 1260 that corresponds to that attribute.

For instance, RIQ Set A may be reserved for read instructions for multi-destination traffic, while RIQ Set B may be reserved for read instructions for single-destination traffic. As another example, RIQ Set A may be reserved for read instructions for editable data unit portions, while RIQ Set B may be reserved for read instructions for uneditable data unit portions. Of course, any other types of sets pertaining to any number of other attributes may also or instead be utilized.

Each RIQ Set 1260 has its own "Level 1" arbitration unit 1262 that selects a read instruction from the corresponding RIQ Set 1260 using techniques such as already described. In an embodiment, arbitration units 1262 need not select between their respective RIQs in the same manner. That is, for example, read instructions for multi-destination traffic may be scored differently than read instructions for single-destination traffic. For instance, a primary scoring factor for read instructions for multi-destination traffic may be whether they can be collapsed with any other read instruction for the same address, whereas read instructions for single-destination traffic may be prioritized differently.

Another "Level 0" arbitration unit 1263 may then select between the read instruction candidates selected by arbitration units 1262. Arbitration unit 1263 may use yet different techniques to select between read instructions. For example, arbitration unit 1263 may select read instructions based on weights associated with each RIQ Set 1260. For instance, for every three read instructions that target multi-destination traffic, seven read instructions for single-destination traffic may be selected. Or, as another example, arbitration unit 1263 may calculate its own RIQ scores, or utilize those already computed by arbitration units 1262.

The selected read instruction is then forwarded to reader 1255, which behaves similarly to reader 1055 and 1155. However, if a write request 1253 is pending, arbitration unit 1263 may instead forward the write request 1253 to writer 1254.

In yet other embodiments, there may be any number of RIQ Sets 1260, and any number of levels of arbitration. Each level would have its own arbitration units. Of course, from another perspective, all of the arbitration units in all of the levels could collectively be considered a single arbitration unit configured to select a read instruction through a hierarchy of sub-decisions.

Read Data Cache

In an embodiment, egress block interfaces may only be capable of inputting a certain number of data unit portions, or even just a single data unit portion, in a given time slot. On the other hand, two or more readers may, at the same time, execute read instructions for data unit portions that are destined for the same egress block interface. To avoid data loss when more data unit portions have been read for an egress block interface than can be sent in a given time slot, a traffic manager 1040 may feature a read data cache.

Figure 13:
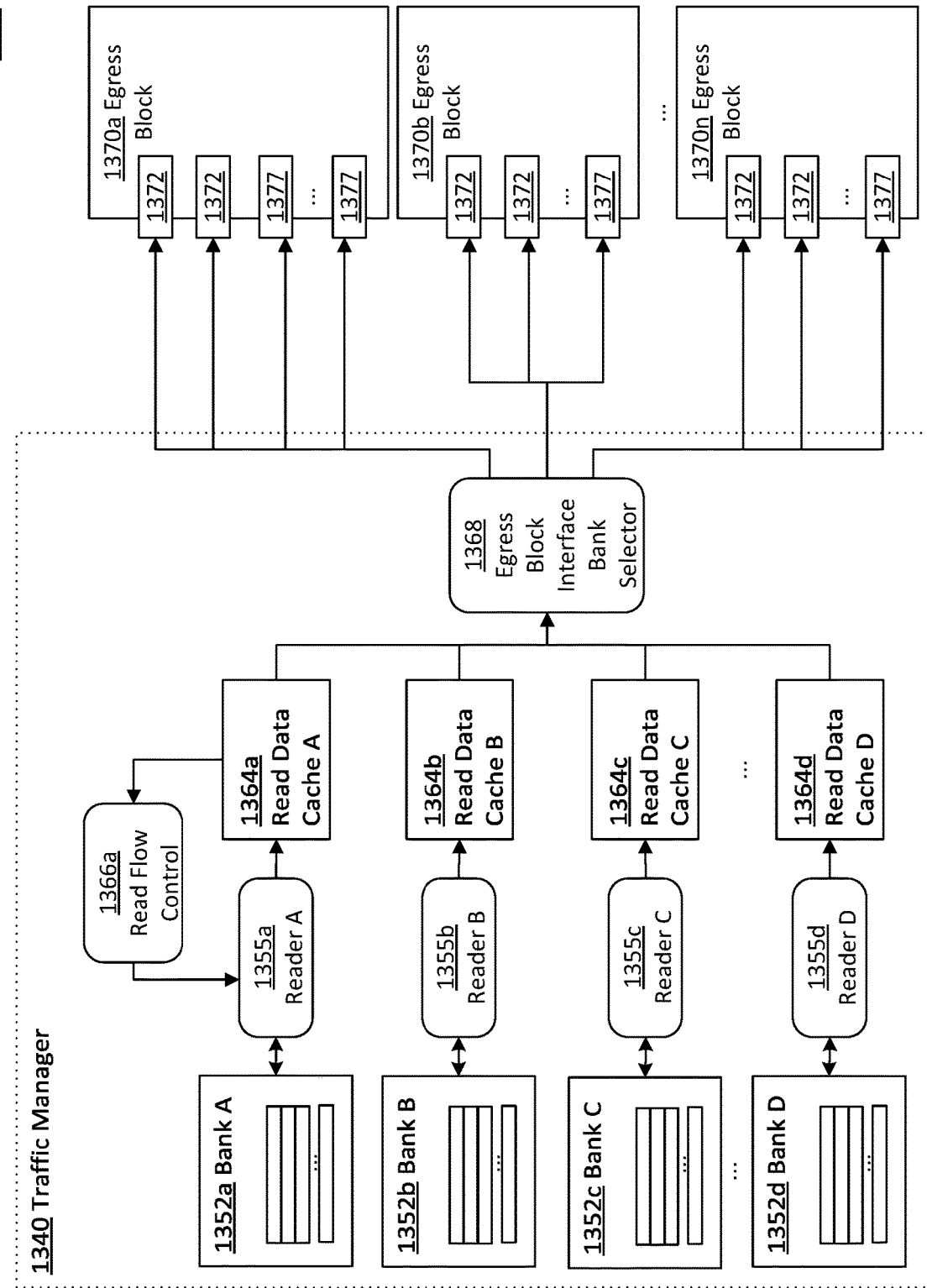
FIG. 13 is an illustrative view of a system in which a traffic manager utilizes read data caches to temporarily cache data unit portions read from banks before sending those data unit portions to their respective egress block interfaces.

FIG. 13 is an illustrative view of a system in which a traffic manager 1340 utilizes read data caches 1364 to temporarily cache data unit portions read from banks 1352 before sending those data unit portions to their respective egress block interfaces 1372 or 1377, according to an embodiment. Traffic manager 1340, which may the same as or different from traffic manager 840, 940, or 1040, comprises readers 1355, such as readers 1055, that read from banks 1352, such as banks 1052. The specific data unit portions read in a given time slot may be selected in any suitable manner, including using schedulers, read instructions, RIQs, and/or arbitration units, such as described above.

After a reader 1355 reads a data unit portion from its respective bank 1352, reader 1355 places the data unit portion in a read data cache 1364 associated with reader 1355. Each reader 1355 may have its own read data cache 1364, or a reader 1355 may share a read data cache 1364 with one or more other readers. In the former case, a read flow control component 1366 may be associated with the reader 1355 and its read data cache 1364. The read flow control component 1366 may instruct the reader 1355 to slow or stop execution of read instructions when the amount of data unit portions in the read data cache 1364 is above a certain threshold. Or, the read flow control component 1366 may instruct the reader 1355, or an arbitration unit coupled thereto, to slow or stop executing read instructions associated with a certain attribute, when the amount of data unit portions in the read data cache 1364 is above a certain threshold.

Although read data caches 1364 may be of any size, in an embodiment, each read data cache 1364 is a shallow cache, comprising no more than a handful of entries.

Egress Block Interface Bank Selector

Each of the egress blocks 1370 to which traffic manager 1340 is coupled, which may be any type of egress block described herein, may have one or more editable interfaces 1372 and one or more uneditable interfaces 1377 connected to traffic manager 1340. In a given time slot, an egress block interface bank selector 1368 in traffic manager 1340 attempts to send the maximum possible number of data unit portions from read data caches 1364 to egress blocks 1370.

For instance, if each interface 1372/1377 supported inputting a single data unit portion each time slot, egress block interface bank selector 1368 may select a single data unit portion from read data caches 1364 to send to each interface 1372/1377, assuming one is available. If the read data caches 1364 include more than one data unit portion that targets an interface 1372/1377, egress block interface bank selector 1368 may utilize any suitable approach to select one of these data unit portions. For instance, the ages of the data unit portions or associated read instructions may be used to rank the data unit portions. Likewise, the utilization level of the read data cache 1364 in which a data unit portion is stored may be used to rank that data unit portion. RIQ scores may likewise be utilized to rank data unit portions. The highest-ranking data unit portion for a given interface 1372/1377 is then sent to that interface 1372/1377.

System 1300 illustrates but one example device in which read data caches may be utilized. Other devices may include fewer or additional components in varying arrangements. For example, in yet other embodiments, there may be other numbers of interfaces 1372 and 1377. Moreover, there may be a single type of interface, or more than two types of interfaces. There may also be any number of banks 1352.

Link Memories

According to an embodiment, a scheduler may generate read instructions for reading from other memories in addition to the buffer memory. Instead of actual data units or data unit portions, these memories may store certain metadata associated with the data units that may be needed to determine where each data unit's portions are stored, the ordering of the data unit portions, how the data units are handled by the traffic manager, and so forth. These memories are collectively referred to herein as link memories.

In an embodiment, the same structures and functions that exist for scheduling read operations may also be utilized for reading from these link memories as well. However, when the metadata is read from the link memories, instead of sending the metadata to an egress block, the traffic manager is configured to write the metadata to a transmit context and/or to direct the metadata to the appropriate scheduler, so that the scheduler may continue to generate read instructions for reading the data unit from the buffer memory. Of course, some or all of the metadata may also or instead be directed to other components of the traffic manager.

Figure 26:
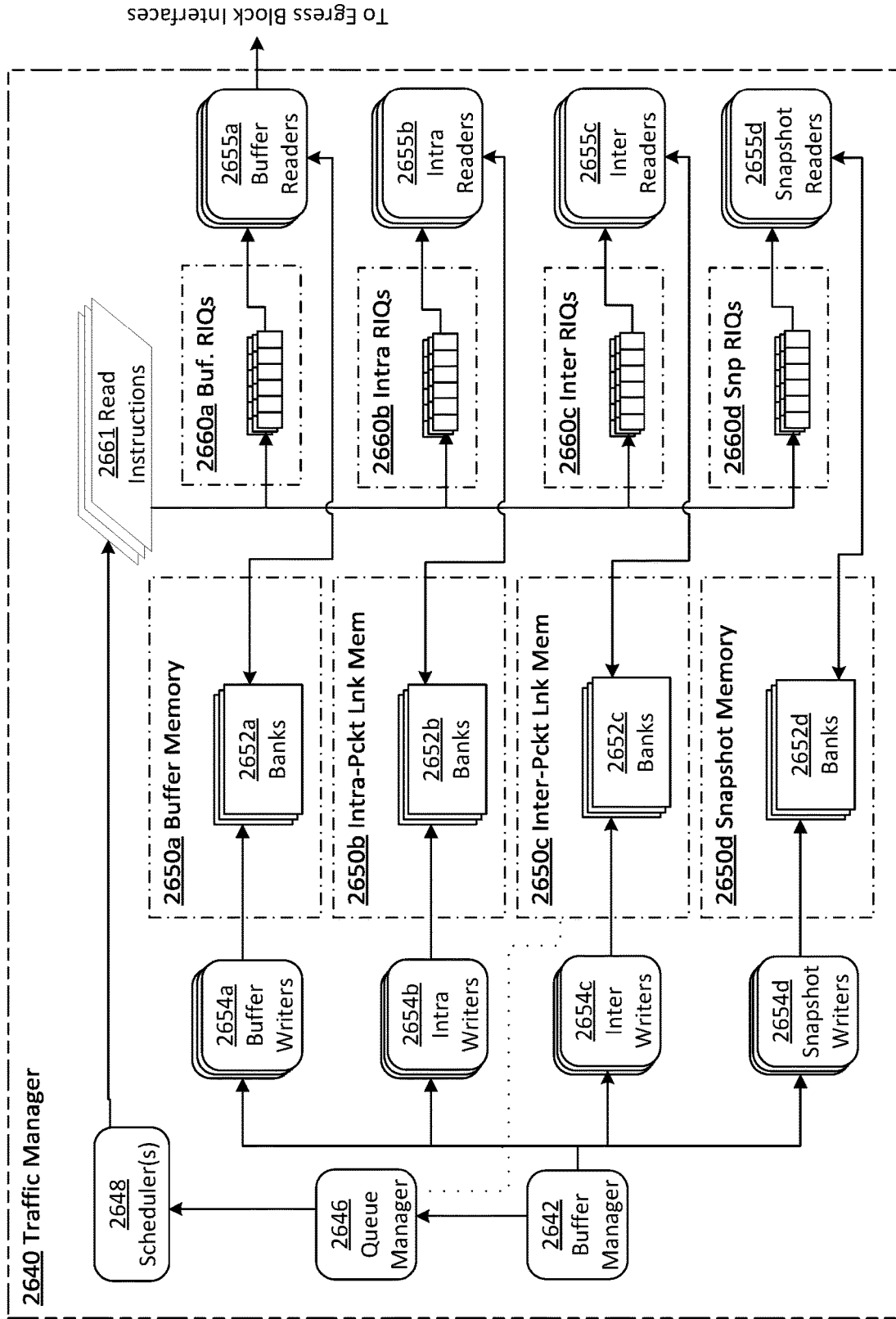
FIG. 26 illustrates an example traffic manager configured to utilize read instruction queues for link memories in addition to a buffer memory.

For example, FIG. 26 illustrates an example traffic manager 2640 configured to utilize read instruction queues for link memories in addition to a buffer memory, according to an embodiment. Traffic manager 2640 is in many aspects similar to traffic manager 1040. For example, traffic manager 2640 comprises a buffer manager 2642, queue manager 2646, scheduler 2648, banks 2652a, writers 2654a, readers 2655a, RIQs 2660a, and buffer memory 2650a, which are similar to buffer manager 1042, queue manager 1046, scheduler 1048, banks 1052, writers 1054, readers 1055, RIQs 1060, and buffer memory 1050, respectively. Indeed, in an embodiment, traffic manager 1040 and traffic manager 2640 may be the same traffic manager, though in other embodiments traffic manager 1040 may be implemented without the particular details of traffic manager 2640.

Traffic manager 2640 further comprises various other memories 2650, including an intra-packet link memory 2650b, an inter-packet link memory 2650c, and a snapshot memory 2650d. Each of the link memories 2650b-d stores metadata useful for handling the data units buffered in buffer memory 2650a.

The intra-packet link memory 2650b includes, among other data, metadata needed to locate individual portions of the data units. For example, for each data unit, the intra-packet link memory 2650b may store metadata indicating a chain of entries within each bank 2652a that contains data unit portions belonging to the data unit. The inter-packet link memory 2650c includes, among other data, metadata necessary to dequeue data units from their queues. For example, such metadata may specify the location of a head data unit portion within the buffer memory as well as the locations of the first data unit portion for the data unit in one or more other banks 2652a. Such metadata might also include the length of the data unit, destination information, priority information, and so forth. The snapshot memory 2650d, meanwhile, may be used as an overflow memory to store data that might otherwise be placed in the inter-packet memory 2650c, if there were enough room therein. Non-limiting examples of such memories are described in, for example, U.S. patent application Ser. No. 16/029,441, filed Jul. 6, 2018, the entire contents of which are hereby incorporated by reference for all purposes as if set forth herein.

Each of memory 2650 has its own set of banks 2652. The number of banks 2652 in each memory 2650 need not be the same. For instance, the number of banks 2652a in the buffer memory 2650a may be greater than the number of banks 2652d in the snapshot memory 2650d. Nor need the banks 2652 of one memory 2650 be of the same size as the banks 2652 of another memory.

Each memory 2650 has also its own sets of writers 2654 and readers 2655, which again need not be the same in number for each memory 2650. These writers 2654 and readers 2655 may operate concurrently. For instance, at the same time a reader 2655a is reading a data unit portion from an entry in one of banks 2652a, a reader 2655b may be reading intra-packet linking data from an entry in one of banks 2652b.

The schedulers 26480 are configured to generate read instructions 2661 for each of these memories 2650. However, while the schedulers 2648 will generally generate read instructions for buffer memory 2650 as frequently as possible, the schedulers 2648 may in some embodiments generate read instructions for the other memories 2650 less frequently. For instance, it may only be necessary to generate a read instruction to read the inter-packet link memory 2650c once for each data unit. Meanwhile, it may only be necessary to generate a read instruction for the intra-packet link memory 2650b intermittently, when the data is needed (generally no earlier than three or four cycles into reading a data unit). Furthermore, read instructions for the snapshot memory may be needed even less frequently, and typically only if the data unit is greater than a certain size.

Each memory 2650 may have its own set of RIQs 2660 into which its read instructions 2661 are placed. These RIQs 2660 may take any form described herein. For instance, there may a separate subset of RIQs 2660a for each bank 2652a, a separate subset of RIQs 2660b for each bank 2652b, and so forth. Within each subset, there may be a separate queue for each scheduler 2648. For each memory 2650, any components utilized to control the flow of read instructions through the corresponding RIQs 2660 may likewise be duplicated. For instance, there may a separate arbitration unit and read data cache for each bank 2652. Or, if an IRSA Controller is utilized, there may be a separate IRSA Controller for each memory 2650.

Traffic manager 2640 is but one example of a traffic manager that utilizes link memories. Other traffic managers may include fewer or additional components, in varying arrangements. For example, some of the memories 2650, such as snapshot memory 2650d, may be omitted, and/or there may be other types of link memories 2650.

Miscellaneous

Shared traffic manager 1040 is but one example of a shared traffic manager. Other shared traffic managers may include fewer or additional components in varying arrangements. For instance, schedulers 1048 may simply be configured to collaborate together through some locking mechanism to choose no more than one operation for a given bank per clock cycle, thus avoiding the need of RIQs 1060 and arbitration units 1062. Similarly, a single scheduler 1048 may be utilized to choose a single operation for each bank in a given time slot, thus again avoiding the need of RIQs 1060 and arbitration units 1062. Or, all read instructions 1061 may be added to a single RIQ 1060 for a given bank, regardless of the scheduler 1048 from which they originate, thus potentially avoiding the need for an arbitration unit 1062.

Moreover, in other embodiments, the demands of the egress blocks may be insufficient to warrant the complexity of supplying multiple banks in the traffic manager, and hence a shared traffic manager can be implemented without the specific details of FIG. 10. Furthermore, a traffic manager 1040 may include a variety of other non-depicted components, such as replication logic for coping data units to multiple ports, active queue management ("AQM") logic, buffer accounting logic, and so forth.

2.16. Shared Read Instruction Queues

Figure 14:
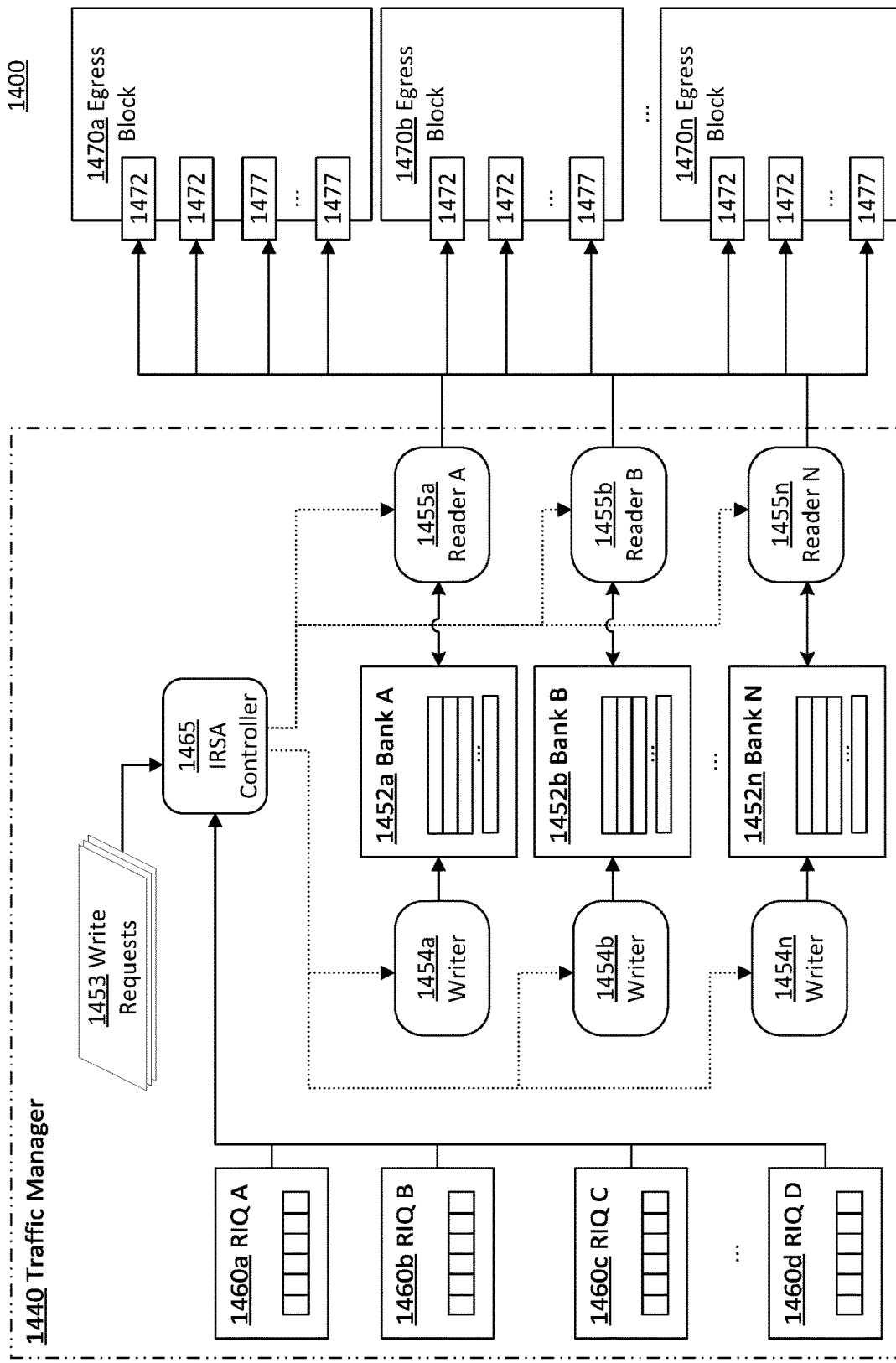
FIG. 14 illustrates a device configured to utilize read instruction queues that are non-bank-specific.

The embodiments depicted in FIGS. 10-12 show each bank in the buffer memory as having its own RIQs. However, in other embodiments, RIQs need not be bank-specific, but may instead store read instructions for any one of the banks in the buffer memory. For instance, FIG. 14 illustrates a device 1400 configured to utilize RIQs 1460 that are non-bank-specific, according to an embodiment.

Device 1400 comprises a traffic manager 1440 coupled to a number of egress blocks 1470 via egress block interfaces 1472/1477. Traffic manager 1440 is another example of a traffic manager 240, 840, or 940. Meanwhile, egress blocks 1470 may be any type of egress block described herein.

Similar to traffic manager 1040, traffic manager 1440 buffers data unit portions in memory banks 1452. Traffic manager 1440 thus comprises writers 1454 for each bank 1452, similar to writers 1054, and readers 1455 for each bank 1452, similar to readers 1055. Also similar to traffic manager 1040, traffic manager 1440 comprises various RIQs 1460 for storing read instructions. However, unlike in traffic manager 1440, the RIQs 1460 are not necessarily bank-specific. That is, they may store read instructions for multiple banks.

There may be any number of RIQs 1460 for any purpose or categorization of read instructions. Depending on the embodiment, read instructions may be added to the RIQs 1460 using any suitable mechanism. For example, in an embodiment, traffic manager 1440 may include schedulers such as a scheduler 1048. Each RIQ 1460 may be associated with a specific one of these schedulers. There may be a single RIQ 1460 per scheduler, or there may be various sets of RIQs, such as RIQ sets 1260, for each scheduler.

In an embodiment, there is a single scheduler per each egress block. In other embodiments, there may be multiple schedulers operating concurrently for each egress block. The multiple schedulers may each have their own unique RIQ or set of RIQs, or they may share a RIQ or set of RIQs.

Moreover, unlike in traffic manager 1440, the writers 1454 and readers 1455 are all coupled to a common Intelligent Read Selection Assignment ("IRSA") Controller 1465. The IRSA Controller 1465 not only selects which read instructions to execute in a given time slot, but also selects which banks 1452 are to be written to satisfy write requests 1453. IRSA Controller 1465 is another example of read operation selection logic configured to select a read instruction from one or more RIQs.

The IRSA Controller 1465 analyzes read instructions in RIQs 1460 and incoming write requests 1453. Based thereon, the IRSA Controller 1465 determines a schedule for utilizing banks 1452 that optimizes read capacity and/or egress block capacity. The IRSA Controller 1465 may analyze all instructions in the RIQs 1460, or just the instructions at the heads of the RIQs 1460, depending on the embodiment. The schedule may, for example, attempt to ensure that data unit portions are sent to as many egress blocks 1470 as possible in a given time slot, while still satisfying write requests 1453. The schedule may also or instead be optimized for other purposes, such as ensuring that data unit portions for certain classes or egress queues of traffic are forwarded to their intended egress blocks 1470 as quickly as possible.

In an embodiment, IRSA Controller 1465 may consolidate read instructions in the same manner as described above for the RIQ optimizer and/or arbitration units.

In an embodiment, the IRSA Controller 1465 may be configured to select read instructions by ranking the analyzed read instructions in accordance to some scoring algorithm, such as the RIQ scores described above. The highest scoring non-conflicting read instructions may be scheduled for execution in the upcoming time slot. In the case of conflicts between read instructions in the ranking, lower-scoring read instructions are removed from the ranking. For instance, in embodiments with single-ported banks 1452, if two or more high-scoring read instructions are for the same bank 1452 or egress block interface 1472/1477, the highest scoring read instruction is scheduled, and the others are removed from the ranking for the current time slot. Similarly, the IRSA Controller 1465 may remove read instructions from the ranking for banks 1452 to which it has assigned a write operation.

In addition to RIQ scoring factors already explored above, in some embodiments, the scoring mechanism may consider the number of other read instructions for a given bank or targeted egress block interface 1470. For instance, all things being equal, if there are two read instructions that may be selected for a bank 1452, and one of the read instructions is for a data unit portion that targets an egress block interface 1472/1477 that no other analyzed read instruction targets, then that read instruction may be scored higher and therefore be more likely to be scheduled for execution. Similarly, if there are many read instructions whose data unit portions target a certain egress block interface 1472/1477, but one of the read instructions is for a bank 1452 that is not being read by any other analyzed read instruction, then that read instruction may be scored more highly and therefore be more likely to be scheduled for execution.

In an embodiment, the IRSA Controller 1465 schedules write operations for write requests 1453 prior to selecting read instructions, and thus IRSA Controller 1465 does not schedule read instructions for banks 1452 that are not accessible on account of the write operations. The IRSA Controller 1465 then schedules as many non-conflicting read instructions as possible.

In yet another embodiment, IRSA Controller 1465 schedules a number of read instructions before assigning banks 1452 for write operations. This number may vary depending on the embodiment. For instance, in one embodiment, this number may be the number of banks 1452 available minus the maximum possible number of write requests 1453 in a given time slot. In an embodiment, this number may be further reduced by an optional extra number of banks 1452 to account for the possibility that a bank 1452 may be full or otherwise unavailable, or to give additional flexibility for the IRSA Controller 1465 to follow certain rules or policies when selecting banks for write operations. Insodoing, the IRSA Controller 1465 is able to create a more optimal schedule for the read instructions, without sacrificing write requests 1453. Moreover, once the write operations are scheduled, the IRSA Controller 1465 may continue assigning any additional read instructions from RIQs 1460 that would not conflict with the schedule, thus maximizing use of banks 1452 and/or egress blocks 1470.

In an embodiment, such an IRSA Controller 1465 may negate the need for read data caches such as read data caches 1364. This is because the IRSA Controller 1465 is screening for egress block interface conflicts in advance, so the logic of egress block interface bank selector 1368 is no longer needed.

In an embodiment, a traffic manager 1440 (or 1040) may place additional constraints on how read operations are resolved, such as limiting the number of reads to a given port or port group to one per clock cycle, or one per N clock cycles. Thus, for example, IRSA Controller 1465 may consider downstream component limitations as well as historical information to control the rate of transmission to downstream components.

System 1400 illustrates but one example device in which an IRSA Controller may be utilized. Other devices may include fewer or additional components in varying arrangements. For example, in yet other embodiments, there may be other numbers of interfaces 1472 and 1477. Moreover, there may be a single type of interface, or more than two types of interfaces. There may also be any number of RIQs 1460 and banks 1452.

In an embodiment, the same techniques described above may be utilized in embodiments where the RIQs a bank-specific. An IRSA Controller or policy engine may be configured to optimally scheduler reads and writes from the RIQs in such an embodiment. Although this may not eliminate the need for read data caches, the techniques may still provide more optimal access to the banks.

2.17. Ingress Buffer Bypass

Conventionally, the ingress processing stage follows an architecture very similar to that depicted in FIG. 4, with an arbiter in place of the traffic manager and an interconnect in place of the port group. The interconnect connects to multiple traffic managers. All data unit portions are buffered, at least temporarily, by the arbiter, which uses ingress queues to determine when to release the data unit portions from the ingress buffers. The ingress processing stage thus, among other aspects, regulates the flow of data units to these traffic managers.

Figure 27:
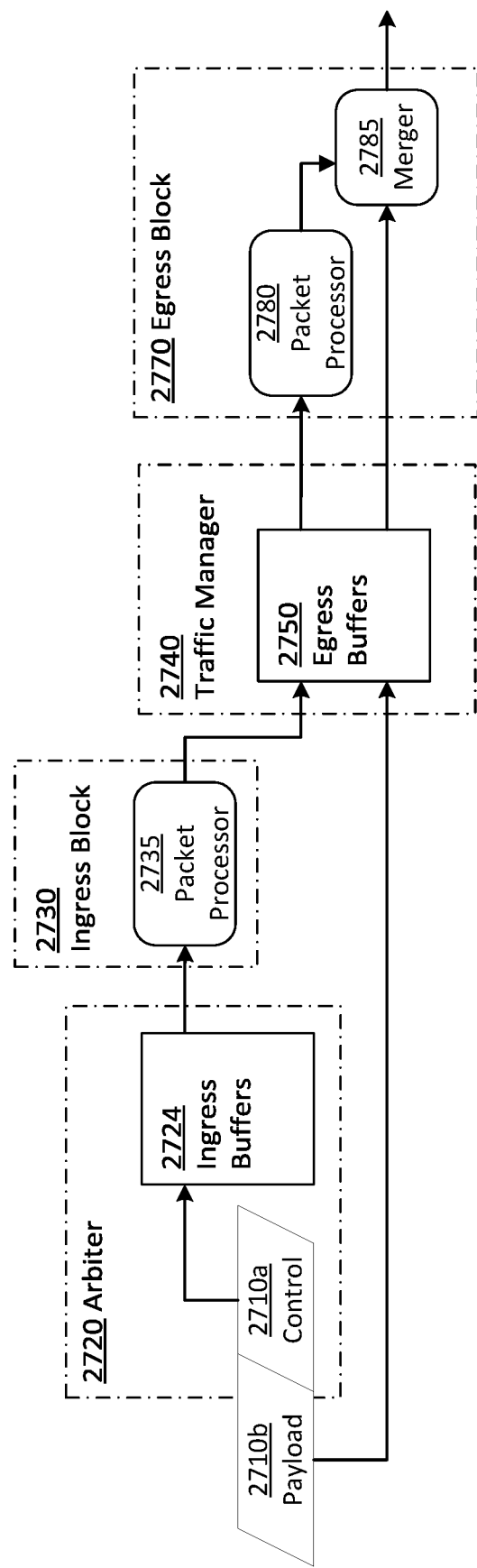
FIG. 27 illustrates a device configured to leverage a shared traffic manager to reduce ingress processing stage resource requirements.

According to an embodiment, a shared traffic manager such as described herein may reduce conventional buffer and other resource requirements to handle data units on ingress. For example, FIG. 27 illustrates a device 2700 configured to leverage a shared traffic manager to reduce ingress processing stage resource requirements, according to an embodiment. Device 2700 may, in an embodiment, be the same as devices 200 and/or 800, though in other embodiments devices 200 and/or 800 may be implemented without the specific details of device 2700.

Device 2700 comprises one or more arbiters 2720 configured to receive data units such as data unit 2710. Arbiters 2720 may be similar to arbiter 220. For instance, an arbiter 2720 may be coupled to ports similar to ports 210, and may comprise or be coupled to ingress buffers 2724, which are similar to ingress buffers 224. Moreover, an arbiter 2720 may include ingress queues such as ingress queues 225.

Arbiter 2720 is further configured process the control portion 2710a of each data unit 2710 differently than the payload portion 2710b of the data unit 2710. Arbiter 2720 buffers control portion 2710a in an ingress buffer 2724, where the control portion 2710a is stored until the arbiter 2720 dequeues the data unit 2710 from an ingress queue.

In an embodiment, the control portion 2710a, as received, may include both control data and payload data. For instance, the control portion may be an SOP cell that includes both packet headers and the start of the packet payload. In an embodiment, the control portion 2710a may be buffered and communicated as it was received, or the control portion 2710a may be stripped of any payload data before being buffered and/or communicated.

The control portion 2710a is then forwarded along a control path to the ingress block 2730, where it is processed by an ingress packet processor 2735 using techniques such as already described herein. The packet processor 2735 generates control information, which is forwarded out of the ingress block 2730 and to the shared traffic manager 2740. The generated control information is separate and distinct from both the control data already found in the control portion 2710a and any control information that will eventually be generated in egress block 2770.

The control portion 2710a may or may not be forwarded from the ingress block 2730 with the control information, depending on whether, and to what extent, the control portion 2710a is also found in the payload portion 2710b of the data unit. The control information is eventually buffered with the rest of the data unit 2710 in the egress buffers 2750, either individually or with the control portion 2710a, depending on the embodiment.

As mentioned, the data unit 2710 also includes a payload portion 2710b. The payload portion may include any portions of the data unit 2710 that are not the control portion (e.g. MOP or EOP cells). Moreover, depending on the embodiment, the control portion—or at least the payload data found therein—may also be included in payload portion 2710b. Any data in the payload portion 2710b not already buffered with the control portion need not be placed in the ingress buffers 2742. Payload portion 2710b is forwarded directly to the traffic manager 2740, bypassing the ingress processing components. For instance, the payload portion 2710b may bypass a merger subsystem in ingress block 2730. Indeed, ingress block 2730 may in some embodiments altogether lack a merger subsystem.

Once the data unit 2710 has passed through the ingress processing stage (i.e. arbiter 2720 and its associated ingress block 2730), the data unit may be processed by the egress processing stage (i.e. traffic manager 2740 and one or more egress blocks 2770) in the manners described elsewhere herein. For example, the traffic manager 2740 may buffer the data unit in egress buffers 2750 until the data unit has been dequeued. The traffic manager 2740 may determine which egress block(s) are targeted by the data unit. Then, the traffic manager 2740 may forward the control portion 2710a to the egress packet processor 2780 of a target egress block 2770, while the payload portion 2710b is forwarded to the merger subsystem 2785 of the target egress block 2770. The merger subsystem 2785 merges the payload portion 2710b with control information for the data unit generated by the egress packet processor 2780, and forwards the data unit 2710 to the appropriate port(s).

Note that traffic manager 2740 and egress block 2770 may be any suitable traffic manager and egress block described herein. In an embodiment, one consequence of the arbiter 2720 not buffering the payload portion 2710b may be that, in embodiments where the control portion is not included in the payload portion 2710b, the traffic manager 2740 receives the control portion 2710a after some or all of the payload portion 2710b. The traffic manager 2740, which is typically unable to link the data unit 2710 to a queue until without receiving the control portion 2710a, would therefore wait to link the data unit 2710 until significantly after some or all of the rest of the data unit 2710 has been received, regardless of whether operating in SF or CT mode. Moreover, it may not be known whether the data unit fails certain egress admission checks until after the traffic manager receives the control portion 2710a and/or control information, by which time the payload portion 2710b may already be completely buffered. Hence, whereas a data unit 2710 that fails these checks might typically be sent directly to garbage collection without buffering, this ingress buffer bypass technique may result in a larger amount of the egress buffers 2750 being sent to garbage collection.

This potential side-effect notwithstanding, bypassing the ingress buffers may offer significant advantages for device 2700. For example, among other aspects, bypassing the ingress buffers may reduce the complexity of the ingress processing stage of the device 2700 (e.g. decreasing the physical area of the logic), increase the responsiveness of the ingress processing stage, and/or allow for faster ingress accounting. Moreover, bypassing the ingress buffers may free memory resources that might otherwise have been devoted to ingress buffers for other purposes (e.g. egress buffers), or in the alternative reducing the overall amount of memory required in the device 2700.

2.18. Buffer Read Optimization

Physical memory banks are typically limited in the amount of data that can be read or written in a given I/O operation. The size of each addressable entry, or "block," within the physical bank often corresponds to this limit. However, certain types of memory units, referred to herein as logical banks, are configured to increase this limit by storing data structures striped across physical blocks in a plurality of physical banks. In a given I/O operation during a given time slot (e.g. clock cycle), each physical bank in the logical bank may read from or write to a block concurrently in a transparent manner, such that the logical bank effectively reads or writes an amount of data much greater than that which can be accessed by any single physical bank. For instance, a logical bank comprising four physical banks that are each capable of executing a 128-byte operation in a given time slot would appear to be capable of executing a single 512-byte operation during that time slot.

In systems configured to store data structures of a known maximum size, such as, without limitations, the cells of a network packet, it is common to arrange the logical bank such that each data structure is stored in a single addressable entry within the logical bank. Each "logical" entry, or block, is in fact comprised of physical blocks from each physical bank in the logical bank (e.g. the set of all physical blocks that have the same address, relative to their physical banks). A data structure is subdivided amongst physical blocks whose addresses correspond to the address of the logical block.

Note that, in some embodiments, the addressing scheme within the physical bank need not be sequential or even contiguous relative to the physical locations at which the blocks are actually found, but rather various logical block addressing schemes may be utilized within the physical banks themselves.

Figure 15:
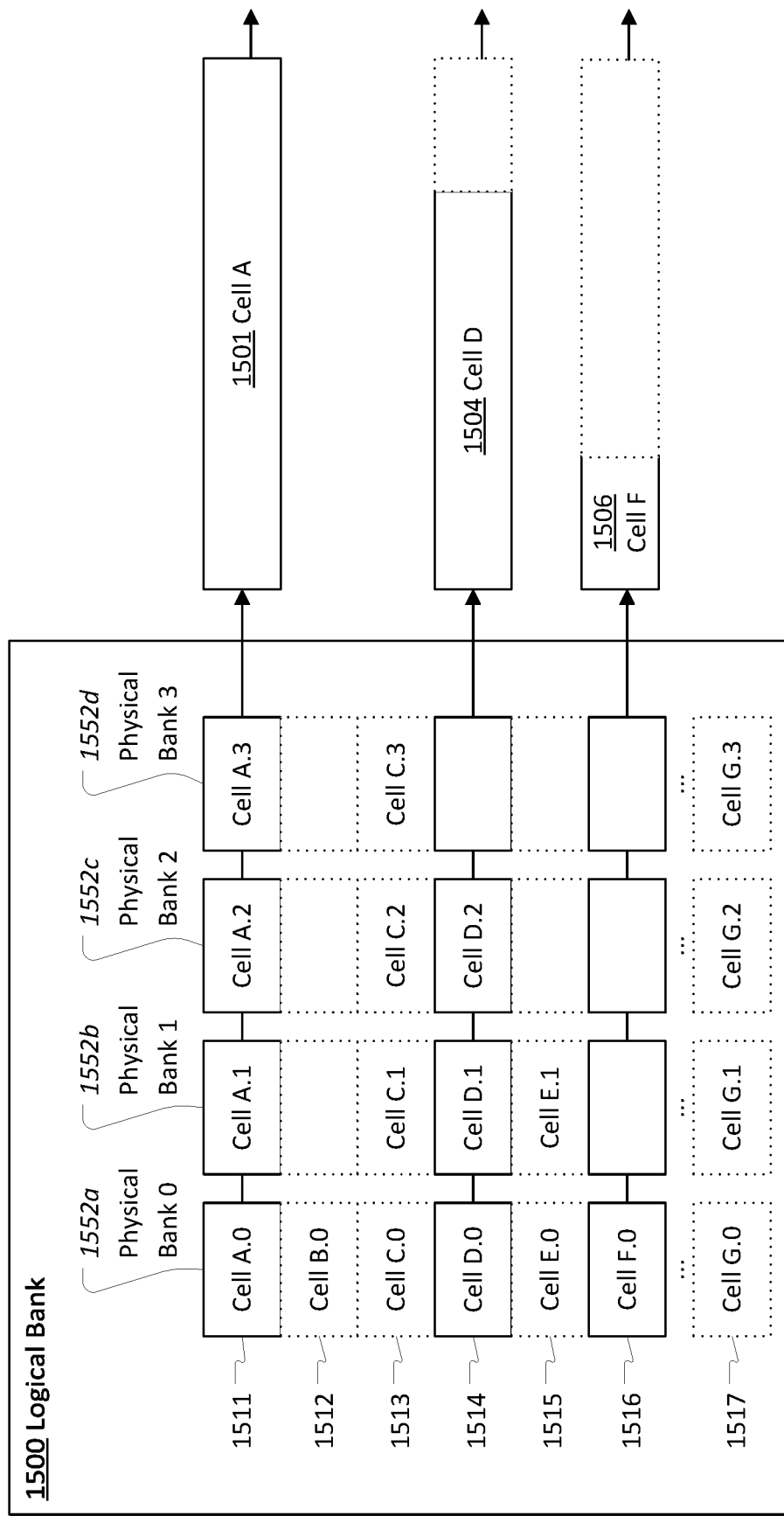
FIG. 15 illustrates a logical bank configured to stripe a data structure across multiple physical banks.

FIG. 15 illustrates a logical bank 1500 configured to stripe a data structure across multiple physical banks 1552, according to an embodiment. The depicted data structure is a cell, and certain advantages are realized when logical bank 1500 is used to buffer cells in a network device. For example, certain advantages may be realized when using logical bank 1500 within an egress buffer 250 or ingress buffer 224, or as a bank 1052 or 1452. However, there are other advantages to using logical bank 1500 in other networking contexts beyond those already described herein. Moreover, in other embodiments, cells may be replaced by any data unit or data unit portion whose maximum possible size fits in a single logical block of logical bank 1500.

Indeed, though the techniques described herein include particular advantages when used in the context of buffering within a network device, some advantages may nonetheless be realized when using the described techniques for storing any data structure of such a maximum size, even outside of the context of network communications.

Logical bank 1500 comprises logical blocks 1511-1517, also referred to herein as entries. Each logical block 1511-1517 buffers a different cell A-G. Although only seven logical blocks are depicted, there may in fact be any number of logical blocks 1511-1517, some of which may be, at any given time, empty.

Cells A-G are of varying sizes, but in any event no greater than a maximum size of each logical block 1511-1517. Larger cells such as Cell A and Cell G may be, for example, SOP cells or middle-of-packet cells of larger data units, while smaller cells such as Cell D or Cell B may be EOP cells or small single-cell data units. Adjacent cells A-G need not necessarily belong to the same data unit, as the cells of a data unit may be stored in many different logical banks 1500.

Each logical block 1511 comprises a physical block from each physical bank 1522. In the depicted embodiment, there are four physical banks 1522a-d, and hence each logical block comprises four physical blocks. However, there many be any other number of physical banks 1522 greater than one, such as two, eight, sixteen, and so forth. Each physical block is of a same physical block size, and the logical block size is the physical block size multiplied by the number of physical banks 1552.

When writing Cells A-G, they are each divided into a number of segments. Each segment is of a size that is no greater than the physical block size. Each segment is written concurrently to a separate physical block in a different physical bank. For instance, Cell A is divided into the following segments: Cell A.0, Cell A.1, Cell A.2, and Cell A.3. Each segment is written to a physical block at the same address, relative to its target physical bank, as the address of the logical block in which Cell A is stored. Hence, since Cell A is stored in logical block 1511, its first segment is stored in physical block 1511 of bank 1552a, its second segment is stored in physical block 1511 of bank 1552b, and so forth.

Cells that are smaller than the maximum logical block size may be striped across fewer than all of the physical banks 1552. For instance, Cell E is less than half the maximum logical block size. It is divided into only two segments, Cell E.0 and E.1, which are written to the address 1515 in physical banks 1552a and 1552b. The physical blocks at address 1515 in banks 1552c and 1552d are empty.

When reading a cell from a logical address, each physical bank 1552 reads and outputs its physical block at the specified address. The outputs are concatenated together. Hence, a read operation for logical address 1511 would produce the complete Cell A as its output 1501, a read operation for logical address 1514 would produce the complete Cell D as its output 1504, and a read operation for logical address 1516 would produce the complete Cell D as its output 1506.

For cells smaller than the maximum logical block size, such as Cell F, much of the read capacity of logical bank 1500 is wasted returning empty or meaningless data. In some embodiments, some of this wasted read capacity may be reclaimed by storing duplicate copies of smaller cells within unused physical blocks, and modifying read operations so that physical banks 1552 whose blocks are not used for a read operation instead read and return duplicate copies of one or more other cells from other logical blocks. Thus, multiple smaller data units may be returned in a single read operation. In this manner, read operations for small data units may be consolidated, as stated earlier in the disclosure.

For example, any time a cell is written to a logical block, the writer may determine whether the size of the cell allows the writer to write multiple copies of the cell within the logical block. If so, the writer writes as many copies as it can to the logical block, taking into consideration that each copy must start at a new physical bank/block.

Then, before sending a read instruction to a reader, it is determined whether the cell targeted by the read instruction spans all of the physical banks. If not, one or more additional read instructions may be analyzed to determine whether any set of physical banks not being used to read the original cell may instead be used to read copies of one or more additional cells. If so, the corresponding read instructions for the original cell and the one or more additional cells may therefore be consolidated. Instead of simply indicating to read from a single logical address, a read instruction consolidated in this manner might, for instance, specify or otherwise indicate each physical block to be read, by physical bank identifier and address.

In some embodiments, there may be additional constraints on when read instructions may be consolidated. For instance, in order for a set of read instructions to be consolidated, they may need to target a same port, port group, or egress block. Or, as another example, read instructions might not be consolidated if doing so would cause a downstream component, such as a port or egress block, to exceed some performance or resource limit.

Figure 16:
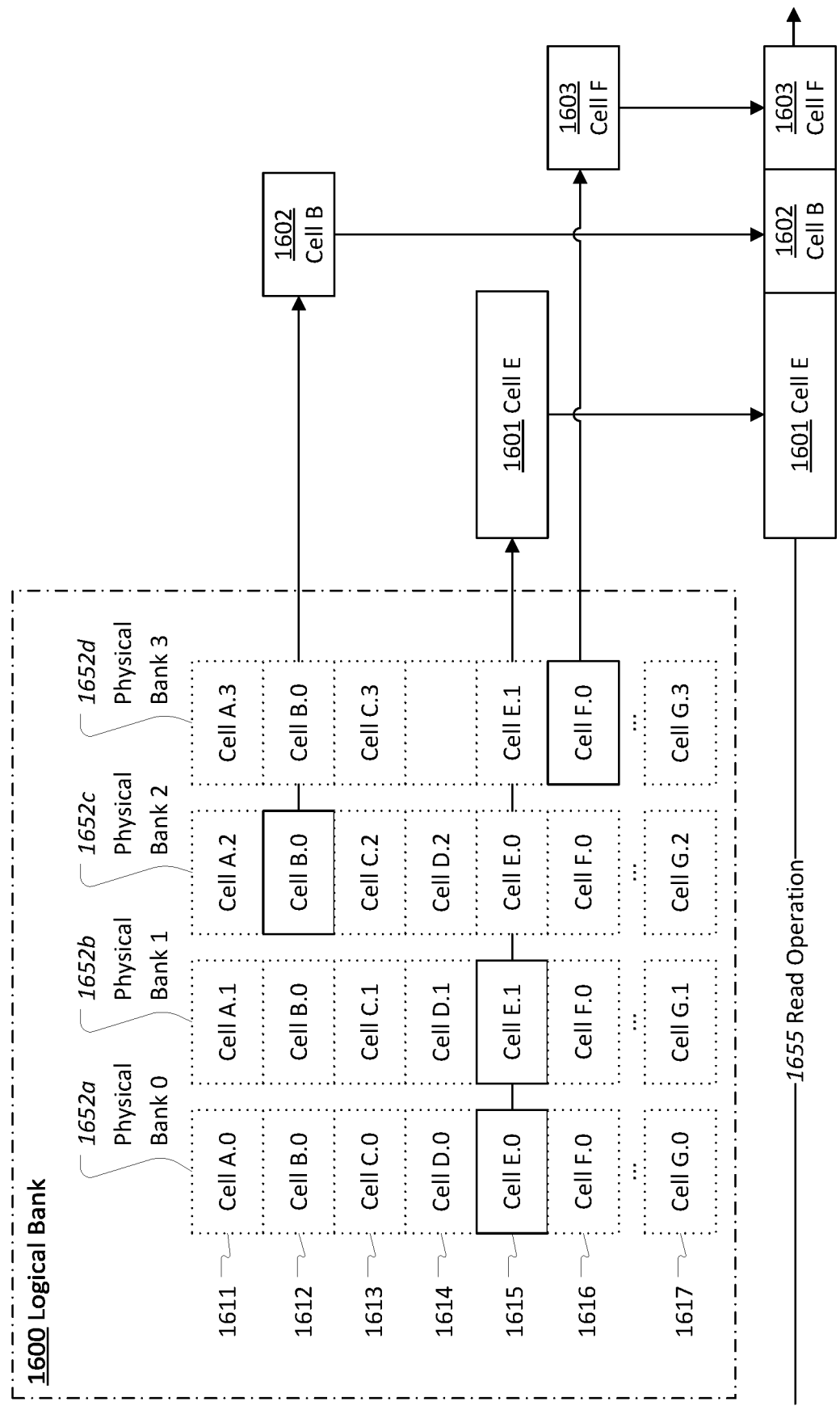
FIG. 16 illustrates a logical bank configured to optimize read operations by storing duplicate copies of smaller cells in unused physical blocks.

FIG. 16 illustrates a logical bank 1600 configured to optimize read operations by storing duplicate copies of smaller cells in unused physical blocks, according to an embodiment. Logical bank 1600 may be utilized in place of logical bank 1500.

Logical bank 1600 is in many ways similar to logical bank 1500. For instance, logical bank 1600 includes physical banks 1652, which are similar to physical banks 1552, and logical blocks 1611-1617, which are similar to logical blocks 1511-1517. Logical blocks 1611-1617 again store Cells A-G, which are divided into segments and written to physical blocks in different banks 1652.

However, for those cells that are less than half the maximum size of a logical block 1611-1617, instead of leaving the remaining physical blocks of their respective logical blocks empty, duplicate copies of the cells have been written the remaining physical blocks. For instance, in logical block 1512 of logical bank 1500, Cell B had just one segment written to physical bank 1552a, while the physical blocks of banks 1552b-d remained empty. By contrast, in logical bank 1600, a copy of Cell B has been placed in each physical block at address 1612. As another example, in logical block 1515 of logical bank 1500, Cell E filled just two physical blocks in physical banks 1552a-b, while the physical blocks of banks 1552c-d remained empty. By contrast, in logical bank 1600, a copy of Cell E has been placed in the physical blocks of banks 1652c-d.

In an embodiment, in the event there will be physical blocks that remain empty after all possible copies are written, the selection of physical blocks to which the copies are written may be optimized to increase the likelihood that reading of the copy can be piggybacked upon another read operation. For instance, if there are ten banks and a cell spans four of the banks, the copy might be placed in the last four banks, leaving the middle two banks empty. This might allow the copy to be read at the same time as a cell that spans the first five or six banks.

An example consolidated read operation 1605 is illustrated. The corresponding read instruction may have specified to read address 1615 from banks 1652a and 1652b, address 1612 from bank 1652c, and address 1616 from bank 1652d. The logical bank 1600, executing the read operation, would return a data stream comprising Cell E (from address 1615 of banks 1652a-b) followed by Cell B (from address 1612 of bank 1652c) and then Cell F (from address 1616 of 1652d).

Of course, a variety of other consolidated read operations are also possible for the data depicted in FIG. 16. For instance, even though Cell D is bigger than half of the maximum logical block size, and therefore there is no duplicate copy of Cell D, the reading of Cell D nonetheless does not require all physical banks 1652. Therefore, a copy of a single-segment cell such as Cell B or Cell F may be read from bank 1652d at the same time as Cell D.

2.19. Miscellaneous

For simplification, the traffic managers, egress blocks, packet processors, distributors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the flows described below may be performed in a variety of systems, including in devices such as devices 200, 800, 900, and other devices described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

3.1. Data Unit Intake

Figure 17:
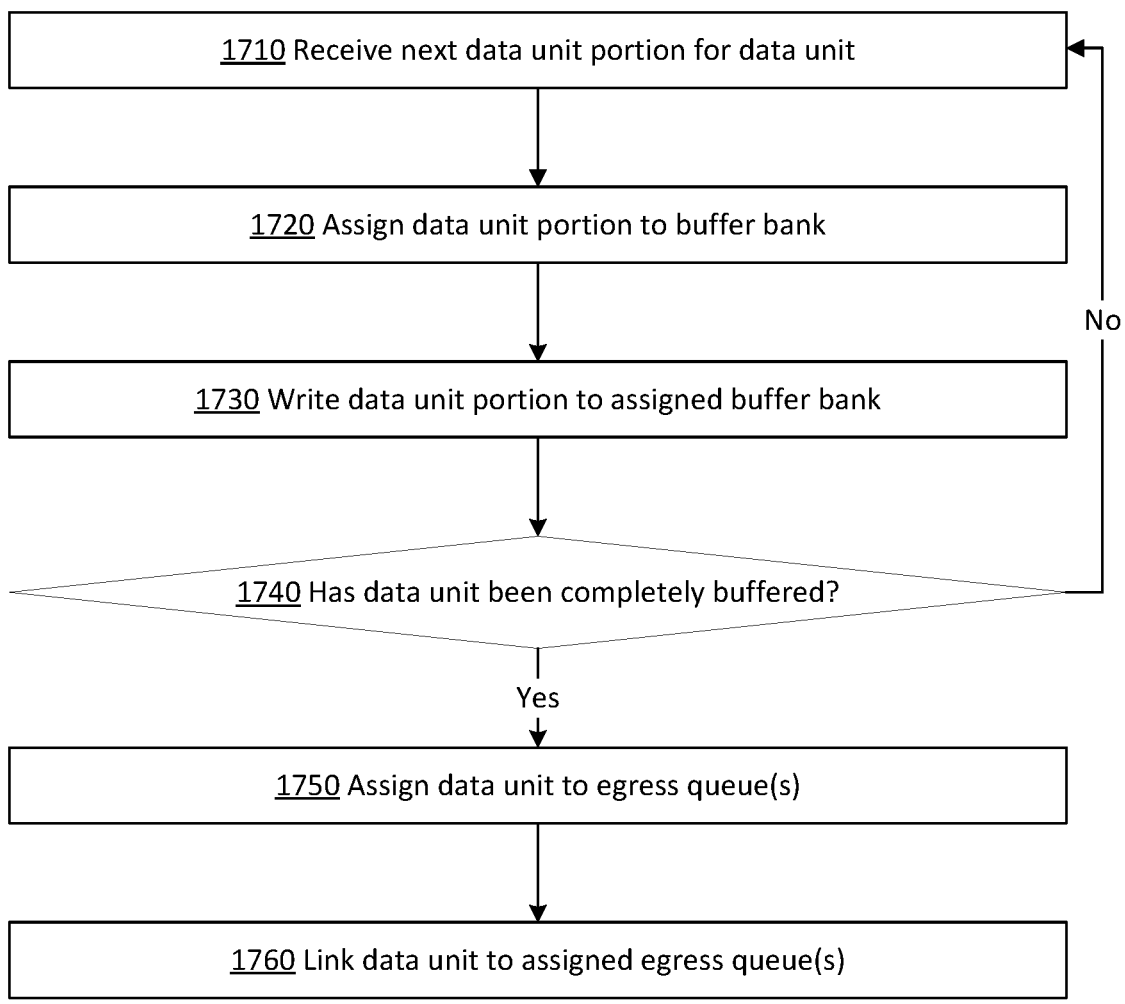
FIG. 17 illustrates an example flow for data unit intake at a traffic manager.

FIG. 17 illustrates an example flow 1700 for data unit intake at a traffic manager, according to an embodiment.

Flow 1700 is but one example flow for handling an incoming data unit at a traffic manager. Other flows may include fewer, additional, or different elements in varying arrangements.

Block 1710 comprises receiving a next data unit portion for a data unit, such as a cell or frame of a packet. The data unit portion is received at a traffic manager, such as a traffic manager 240, 1040, or any other traffic manager described herein. The data unit portion may be received via a port, an interconnect, an ingress processing stage, and/or any other circuitry. If the data unit portion is the first data unit portion of the data unit, various metadata may be created for the data unit in a receive context that temporarily stores the metadata until the data unit is linked to a queue. Such metadata may include a data unit identifier, information indicating where its portions are stored, and so forth. This metadata may be updated over multiple iterations of blocks 1710-1740.

Block 1720 comprises assigning the data unit portion to a buffer bank, such as a bank 1052, 1600 or any other suitable memory unit. A variety of approaches may be utilized to make such an assignment, including a random approach or a round-robin approach. The assignment make take into consideration whether or not a bank is available for writing, on account of being used for other I/O operations and/or being full. Specific examples of such approaches are described in other sections. Block 1730 comprises writing the data unit portion to the assigned buffer bank.

Block 1740 comprises determining whether the data unit to which the data unit portion belongs has been completely buffered. If not, flow 1700 returns to block 1710 to await further portions of the data unit. Otherwise, flow 1700 proceeds to block 1750.

Block 1750 comprises assigning the data unit to one or more egress queues. Various control information or metadata found in or associated with the data unit may be utilized to assign the data unit to a queue. For instance, if the control information or metadata indicates that the data unit is destined for a certain port, the data unit may be linked to a queue for that port. Various other attributes of the data unit may also or instead be utilized to assign a queue, as described elsewhere. Data units that target multiple destinations, such as multicast data units, may be linked to multiple egress queues. In some embodiments, such as when the traffic manager is operating in cut-through mode, block 1750 may instead be performed immediately after the first data unit portion is received, after the first iteration of block 1730.

Block 1760 comprises linking the data unit to the assigned egress queue(s). The linking may comprise, for instance, placing the data unit in the queue (e.g. at its tail) by linking metadata describing the data unit to the egress queue. In an embodiment, prior to the linking, one or more checks may be performed to ensure that various flow control, shaping, or other rules or policies are enforced. If these checks fail, the data unit may be dropped instead of linked to the queue.

Since data units may be received interleaved together, multiple instances of flow 1700 may be performed at least partially concurrently. For instance, while awaiting another data unit portion for a first data unit in block 1710, blocks 1710-1740 may be performed any number of times for a second data unit.

3.2. Scheduling Read Instructions

Figure 18:
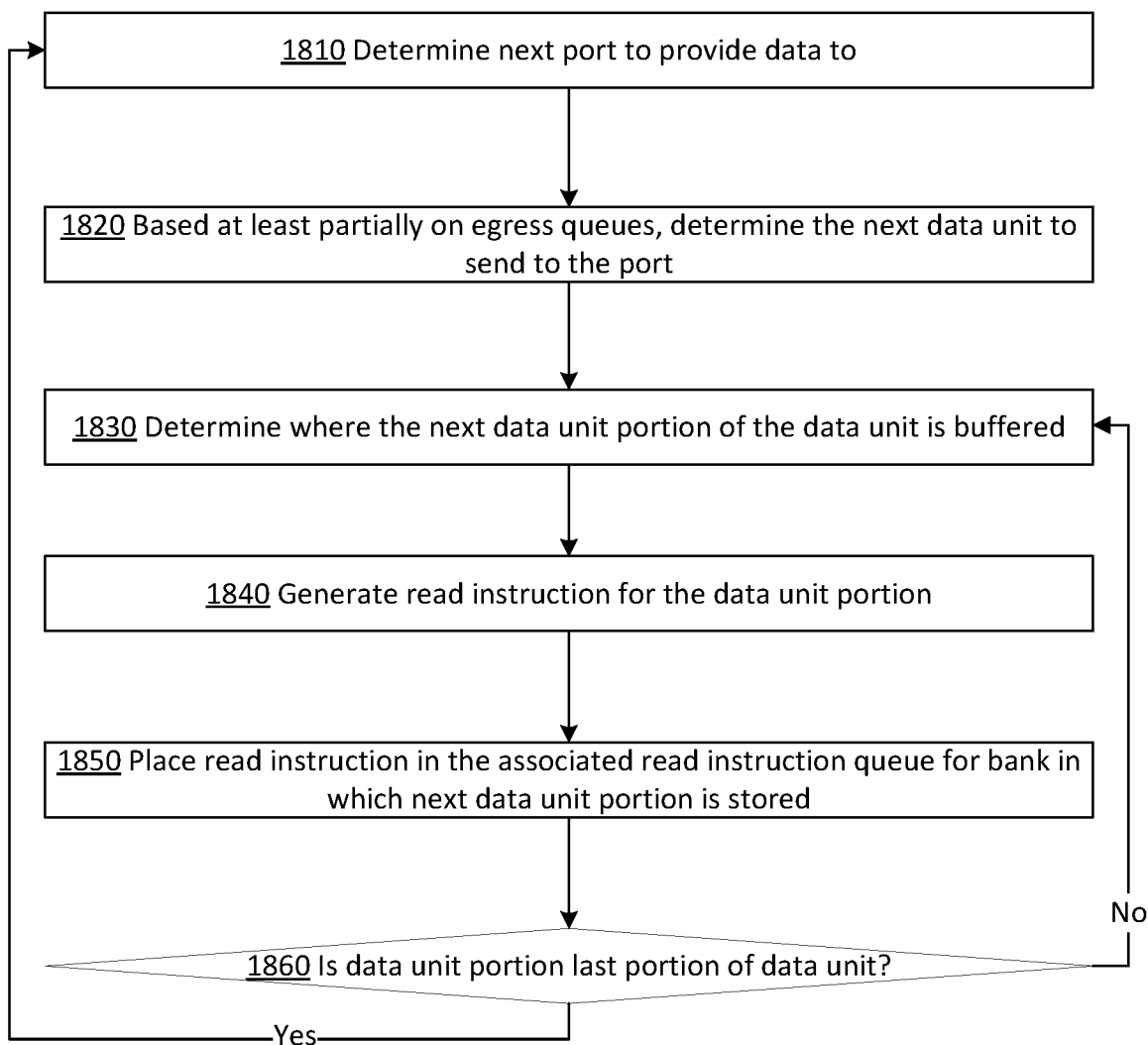
FIG. 18 illustrates an example flow for scheduling read instructions to read data unit portions from a buffer bank within a traffic manager.

FIG. 18 illustrates an example flow 1800 for scheduling read instructions to read data unit portions from a buffer bank within a traffic manager, according to an embodiment. In an embodiment, flow 1800 is performed concurrently with, but asynchronously relative to, flow 1700, within a device such as device 200 or 1000. For example, flow 1800 may be implemented by a scheduler such as scheduler 1048 that reads the egress queues manipulated via flow 1700. However, in other embodiments, flow 1700 may be practiced without necessarily performing flow 1800, and vice versa.

Block 1810 comprises determining a next port, from a group of ports, to provide data to. For example, an egress block, packet processor, editable path, or other construct may be associated with a group of ports for which a traffic manager may comprise a scheduler. The scheduler may utilize various port selection logic to decide which port to supply data to next, such as weighted round robin selection logic, probabilistic logic, and so forth.

Block 1820 comprises selecting, based on one or more egress queues associated with the selected port, a next data unit, such as a next packet, to send to the port. For instance, if there is only one egress queue, the head of the queue may be taken, or a highest scoring data unit in the queue may be taken. If there are two or more egress queues for the selected port, then a suitable selection mechanism is used to select between the queues, such as the SP, WDRR, WFQ, or other algorithms described in other sections, and the head of the selected queue may then be taken.

Block 1830 comprises determining where the next data unit portion of the data unit, such as a cell, is buffered. For instance, block 1830 may comprise determining the bank, and address of the entry within the bank, in which the next data unit portion was written per block 1730 of flow 1700. In some embodiments, metadata associated with the data unit may be used to determine the location, either directly, or by following a chain of data unit portions until the next data unit portion is reached.

Block 1840 comprises generating a read instruction, such as a read instruction 1061, for the data unit portion. The read instruction generally indicates the bank address within which the data unit portion is stored as well as an egress block or egress block interface to which the data unit portion is to be sent. The read instruction may also include other metadata useful in determining a priority score for the read instruction, such as described in other sections.

Block 1850 comprises placing the read instruction in an associated RIQ, such as in a RIQ 1060 or 1460. There may be, for example, a RIQ for each scheduler, egress port, port group, or any other suitable construct with which the data unit portion may be associated. In some embodiments, each bank may have its own set of RIQs, and the read instruction is placed in the scheduler's RIQ for the bank in which the data unit portion is stored.

Block 1860 comprises determining whether the data unit portion is the last data unit portion in the data unit (e.g. an EOP cell). If not, flow 1800 returns to block 1830 to continue scheduling the departure of the data unit from the traffic manager. Blocks 1830-1860 are typically performed once in a given time slot (e.g. clock cycle). In this manner, once a data unit has been selected for a port, each scheduling event of the port results in a read instruction for one data unit portion of the data unit.

Read instructions are generated for the data unit until a read instruction has been generated for every portion of the data unit. Thus, if the data unit portion in block 1860 was the last portion of the data unit, flow 1800 returns to block 1810 for dequeueing another data unit.

Flow 1800 is but one example flow for scheduling read instructions. Other flows may include fewer, additional, or different elements in varying arrangements. For example, block 1810 may be omitted, and the next data unit to send may be determined simply by selecting between the egress queues in block 1820. In yet other embodiments, data unit portions may be scheduled individually, without respect to the data unit to which they belong.

Multiple instances of block 1800 may be performed at the same time, by different schedulers associated with different port groups, egress blocks, packet processors, or other constructs.

In an embodiment, at various times in the process of reading a data unit, block 1840 may further comprise generating read instructions to read certain data unit metadata from one or more link memories, as described in other sections. Accordingly, block 1850 may further comprise placing these read instruction(s) in the corresponding RIQs for the one or more link memories.

3.3. Read Instruction Queue Arbitration

Figure 19:
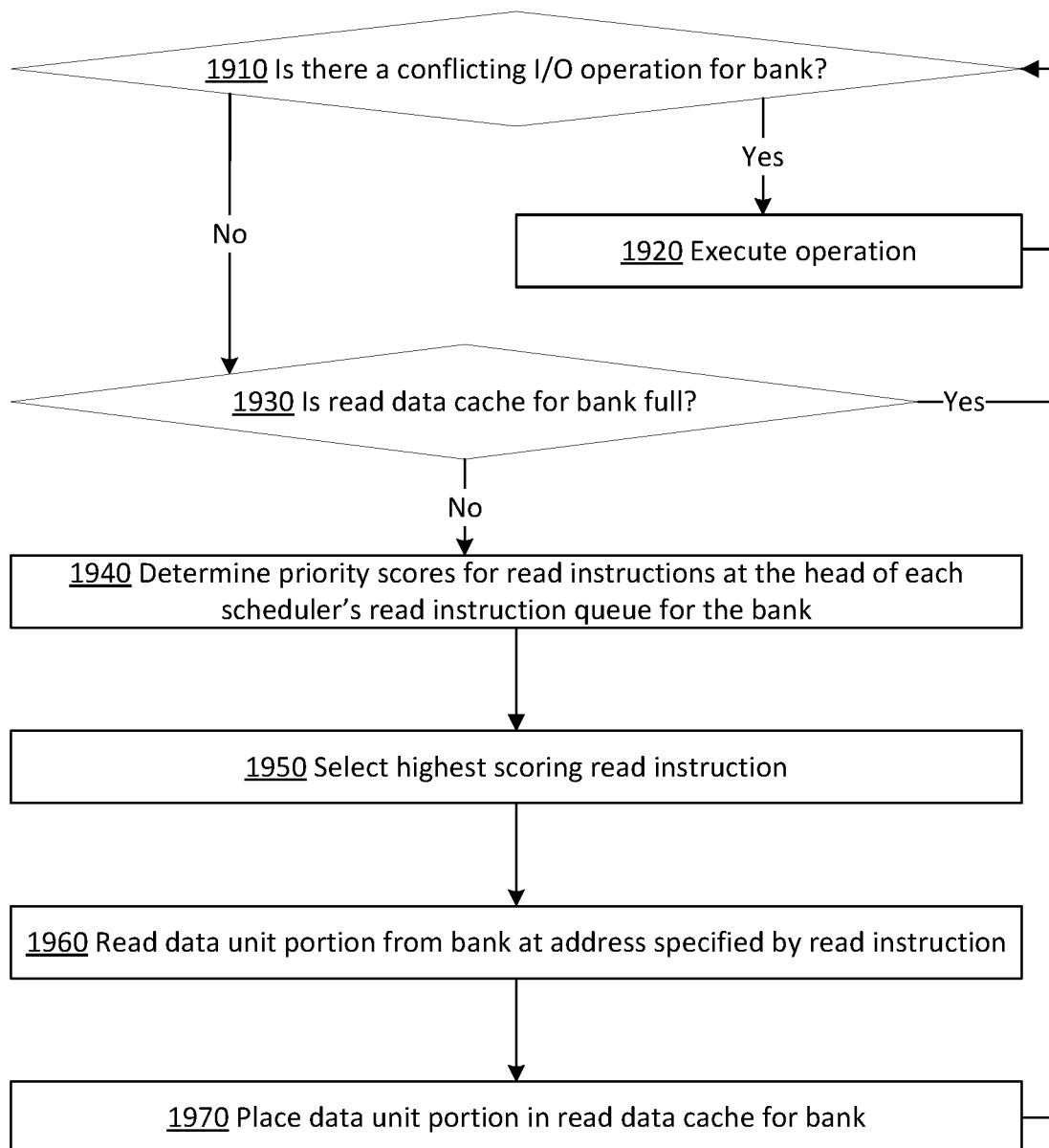
FIG. 19 illustrates an example flow for selecting a next read instruction to execute from multiple read instruction queues.

FIG. 19 illustrates an example flow 1900 for selecting a next read instruction to execute from multiple read instruction queues, according to an embodiment. Flow 1900 may be performed, for example, with respect to RIQs generated in performance of block 1850 of flow 1800. Indeed, flow 1900 and flow 1800 may be performed concurrently, but asynchronously, within a same traffic manager. In other embodiments, however, flow 1900 may be performed without necessarily implementing flow 1800.

In an embodiment, multiple instances of flow 1900 are performed concurrently. For example, one instance of flow 1900 may be performed concurrently for each bank in a traffic manager. Flow 1900 may be performed within any traffic manager described herein, or in any other suitable context.

Block 1910 comprises determining whether there is a conflicting I/O operation for the bank with respect to which flow 1900 is being implemented. This may or may not be necessary depending on the embodiment. For instance, in embodiments where write operations have priority, block 1910 may comprise determining whether there is an existing write operation for the bank.

The bank may be any suitable type of bank, including without limitation the logical and/or physical banks described herein. Flow 1900 assumes, for simplification, that the bank is single-ported, and thus capable of only one I/O operation per time slot. Hence, if there is a pending conflicting I/O operation for the bank, then in block 1920, the I/O operation is performed, and flow 1900 loops back to block 1910 for the next time slot.

If there is no conflicting I/O operation for the bank, then flow 1900 proceeds to block 1930. Block 1930 comprises determining whether a read data cache for the bank is full. Each bank may have a shallow read data cache in which data unit portions are stored while awaiting transfer out of the traffic manager. Read data caches 1364 are non-limiting examples of such read data caches. If, at any given time, the read data cache for a bank is full, then no further data unit portions can be read until one or more data unit portions are removed from the read data cache. Hence, flow 1900 loops back to block 1910 for the next time slot.

If there is room in the read data cache, then flow 1900 proceeds to block 1940. Block 1940 comprises determining priority scores for the read instructions at the heads of the bank's RIQs. The priority score of a read instruction may be specified directly in the read instruction, or be calculated as a function of one or more attributes or metrics related to one or more of: the read instruction, the RIQ in which the read instruction is found, the data unit portion targeted by the read instruction, or the egress block interface targeted by the read instruction. More specific examples of RIQ scoring mechanisms are described in other sections.

The read instructions are ranked by their scores and, in block 1950, the highest scoring read instruction is selected for execution. Block 1960 then comprises executing the read instruction by reading the indicated data unit portion from the bank address specified by the read instruction. Block 1970 comprises placing the data unit portion in the read data cache for the bank, along with some or all of the information in the read instruction.

Flow 1900 is but one example flow for selecting a read instruction to execute. Other flows may include fewer, additional, or different elements in varying arrangements. For example, in some embodiments, buffer banks may be capable of being accessed more than once in a time slot (e.g. double-ported). Consequently, flow 1900 may be modified so as to not loop back until the maximum number of I/O operations supported by the memory unit have been executed or until there are no more read instructions to execute.

As another example, in an embodiment, there may not be a read data cache, in which case block 1930 may be omitted, and block 1970 may comprise immediately sending the data unit portion to an egress block interface indicated by the read instruction. In another embodiment, a reader may be configured to stop or slow execution of read instructions once the utilization of the read data cache reaches a certain capacity, as opposed to being completely filled.

In an embodiment, more read instructions may be scored than just the read instructions at the heads of the RIQs. In an embodiment, non-scoring-based mechanisms, such as random or round-robin, may instead be utilized to select the next read instruction.

In an embodiment, blocks 1910-1960 may be performed with respect to RIQs for one or more link memories concurrently with the performance of flow 1900 with respect to the RIQs for the buffer memory. That is to say, the same logic utilized to read data unit portions from the banks of the buffer memory may also be utilized to read data unit metadata from the banks of one or more link memories. However, the data unit metadata may be written to or directed to components other than the read data cache, such as to a transmit context or a scheduler.

3.4. Releasing Data Unit Portions from a Read Data Cache

Figure 20:
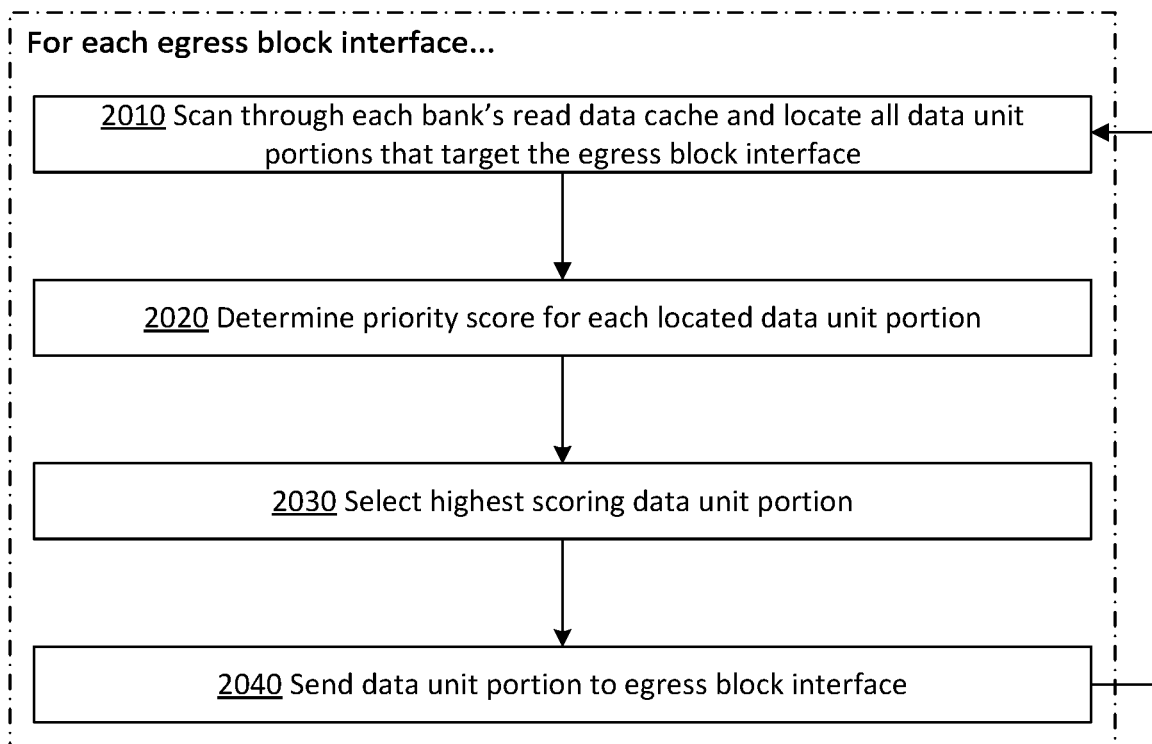
FIG. 20 illustrates a flow for reading data unit portions from a read data cache.

FIG. 20 illustrates a flow 2000 for reading data unit portions from a read data cache, according to an embodiment. The read data cache may be, for example, the read data cache to which data unit portions were written in block 1970 of flow 1900. Hence, flow 2000 and flow 1900 may be performed concurrently, but asynchronously, within a same traffic manager. In other embodiments, however, flow 2000 may be performed without necessarily implementing flow 1900.

Blocks 2010-2040 are performed, in a given time slot, for each egress block interface to which a traffic manager is connected. For instance, flow 2000 may be performed by an egress block interface bank selector 1368 configured to attempt to locate data to send to each egress block interface in the time slot. The egress block interfaces may be any type of interface to an egress block, including the examples described elsewhere herein.

Block 2010 comprises scanning through each bank's read data cache to locate data unit portions that target the egress block interface. This may be determined, for instance, by examining read instructions associated with the data unit portions.

Block 2020 comprises determining a priority score for each data unit portion located in block 2010. Any suitable scoring mechanism may be utilized to determine a score for a data unit portion, including those already described herein. In an embodiment, the score determined for the data unit portion's read instruction in block 1940 may be utilized as the priority score, or at least as a factor in determining the priority score.

The data unit portions are ranked by their scores and, in block 2030, the highest scoring data unit portion is selected. Block 2040 then comprises releasing the data unit portion from the read data cache by sending the data unit to the egress block interface.

In some embodiments, multiple smaller data unit portions may have been read at the same time, per consolidation techniques described elsewhere in this disclosure. In one such embodiment, all of the data unit portions that were read at the same time may be stored together as a single entry in the read data cache. An egress block interface may be limited as to the amount of data it may accept rather than a number of data unit portions. Therefore, if the data unit portions target the same egress block interface, all of the data unit portions in the entry of the read data cache may be sent to the egress block interface together. The scoring in block 2030 would therefore score such read data cache entries together rather than as separate data unit portions. Moreover, in such embodiments, the logic to consolidate read instructions may be configured to favor consolidating or even exclusively consolidate read instructions that target the same egress block interface(s).

Flow 2000 is but one example flow for selecting a read instruction to execute. Other flows may include fewer, additional, or different elements in varying arrangements. For example, in an embodiment, round-robin, random, or other non-scoring selection mechanisms may be utilized to select the data unit portion to send to the egress block interface.

3.5. Processing Data Units with an Egress Block

Figure 21:
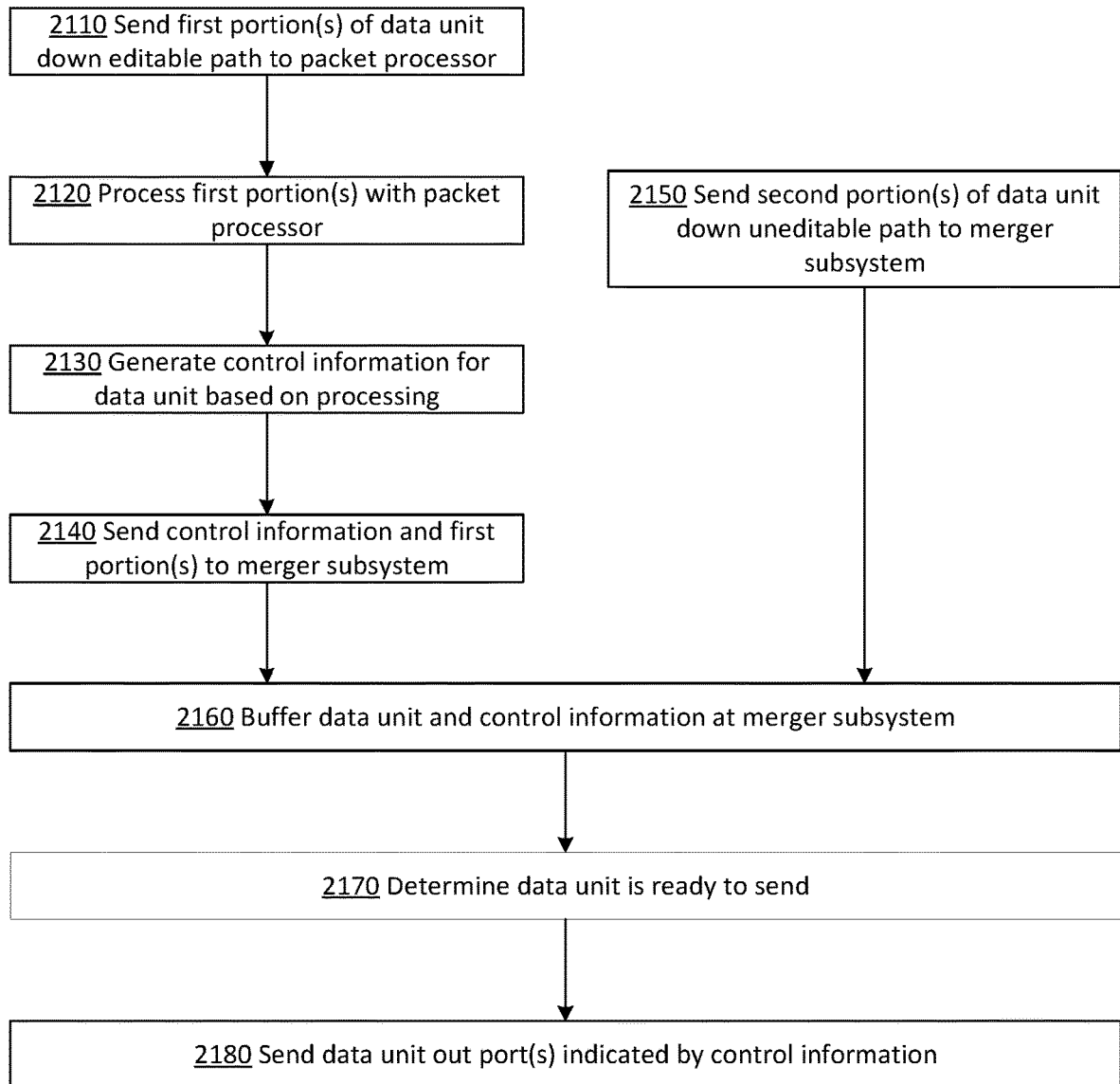
FIG. 21 illustrates a flow for processing a data unit using an egress block.

FIG. 21 illustrates a flow 2100 for processing a data unit using an egress block, according to an embodiment. Flow 2100 may be performed within any egress block that has editable and uneditable paths, including the example egress blocks described herein.

Block 2110 comprises sending one or more first portions of the data unit down an editable path to a packet processor. For instance, in cell-based embodiments, this may entail sending the SOP cell of the data unit. Optionally, instead of sending the entire SOP subunit of the data unit, block 2110 may involve stripping the SOP subunit of any non-header data and forwarding only the header data.

In an embodiment, block 2110 may be performed responsive to the sending of the one or more first data unit portions to an editable egress block interface in one or more iterations of block 2040 of flow 2000. However, block 2110 may be instead be triggered by other blocks of other process flows.

Block 2120 comprises processing the first data unit portion(s) with a packet processor. The packet processor may perform any suitable processing, as described in other sections. Optionally, in embodiments with shared egress packet processors, the first data unit portion(s) may wait for some time in a buffer at a distributor component before being released to the packet processor for processing.

Block 2130 comprises the packet processor generating control information based on the processing. The one or more first portions portion may include a variety of information, such as destination and source addresses, data unit type or classifier information, timestamps, and so forth. The packet processor may perform a variety of rule-based and/or hard-coded operations with respect to this information, the results of which may form the control information.

The control information generally indicates one or more destinations for the data unit, such as a destination component, queue, buffer, memory location, port, and/or other suitable destination. The control information may further, for instance, include information already in the data unit (e.g. addressing information, priority data, or labels in the header of the data unit), replace such information in the data unit (e.g. a new destination address or a revised priority level), or be additive with respect to the information in the header (e.g. internal markings, path information, tracking information, a next internal destination component to process the data unit, other handling instructions, etc.). The control information may further include other information, such as instructions for editing one or more portions of a data unit.

Block 2140 comprises sending the control information and first portion(s) to a merger subsystem associated with the editable path. In embodiments with a shared packet processor, the outputted control information may pass through a demuxer configured to identify the appropriate merger subsystem to send the control information to. The control information may be sent by itself, or embedded in the one or more first data unit portions.

Block 2150, performed at least partially concurrently with blocks 2110-2140, comprises sending one or more second portion(s) of the data unit down an uneditable path to the same merger subsystem. In an embodiment, the first portion(s) may be included with the second portion(s) of the data unit in block 2150, if not sent with the control information in block 2140. In an embodiment, block 2150 may be performed responsive to the sending of the one or more second data unit portions to an uneditable egress block interface in one or more iterations of block 2040 of flow 2000. However, block 2150 may be instead be triggered by other blocks of other process flows.

Block 2160 comprises buffering the control information, first portion(s), and/or the second portion(s) at the merger subsystem to await merger with each other. Once the merger subsystem has received all portions of the data unit and the control information, then, in block 2170, it may be determined that the data unit is ready to send (e.g. immediately, or at a time selected by a scheduler in the merger subsystem).

Block 2180 comprises sending the data unit out one or more ports indicated by the control information. These ports may be coupled to the merger subsystem by, for instance, and interconnect and/or port group hardware. The merged data unit may be sent all at once, or sent as separate portions over time, potentially interleaved with portions of other data units, depending on the embodiment.

Flow 2100 illustrates only one of many possible flows for processing a data unit in an egress block. Other flows may include fewer, additional, or different elements, in varying arrangements. For example, the editable path and/or uneditable path may include other processing components whose functions are not described in flow 2100.

3.6. Multi-Tiered Arbitration of Read Instruction Queues

Figure 22:
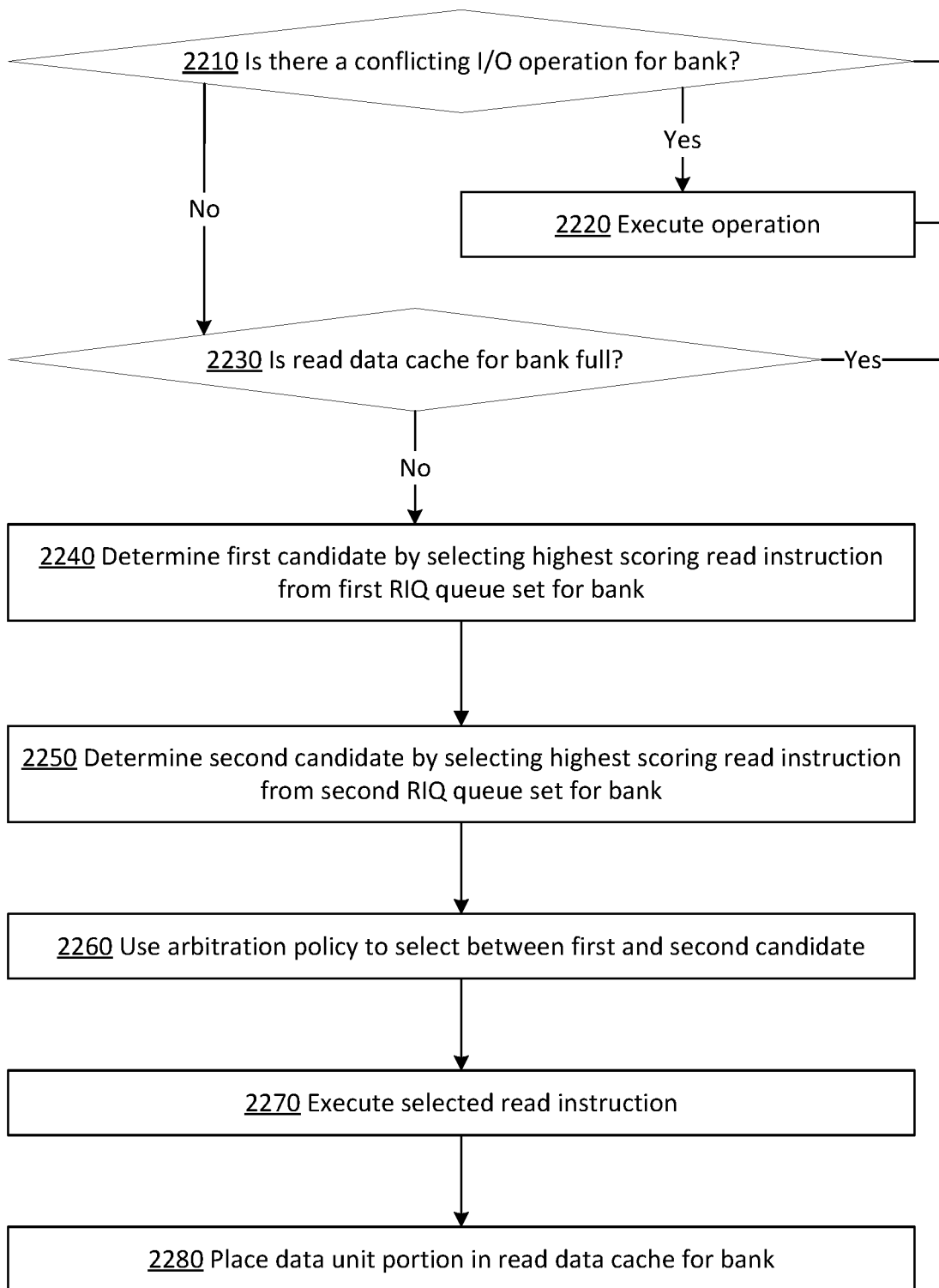
FIG. 22 illustrates a flow for tiered arbitration of multiple sets of read instruction queues, according to an embodiment.

FIG. 22 illustrates a flow 2200 for tiered arbitration of multiple sets of read instruction queues, according to an embodiment. Flow 2200 might be used, for instance, in place of flow 1900 when there are multiple sets of RIQs (e.g. editable versus uneditable, multi-destination versus single-destination, etc.).

Blocks 2210-2230 proceed similarly to blocks 1910-1930 of flow 1900. Note that, if write operations do not have priority, blocks 2210-2220 may not be necessary.

However, if it is determined that the read data cache is full in block 2230, flow 2200 proceeds to block 2240. Block 2240 comprises determining a first candidate read instruction from a first set of RIQ queues. This may comprise, for instance, determining a highest scoring read instruction from the first set, using techniques such as described with respect to blocks 1940-1950 of flow 1900 or elsewhere herein.

Block 2250 comprises determining a second candidate read instruction from a second set of RIQ queues. This may comprise, for instance, determining a highest scoring read instruction from the second set, using techniques such as described with respect to blocks 1940-1950 of flow 1900 or elsewhere herein. The scoring mechanism for the second set may, in some embodiments, be different than for the first set. For instance, if one set of RIQ queues is for multi-destination traffic and another set of RIQ queues is for single-destination traffic, the most important multi-destination data unit portion to read may have different qualities than the most important single-destination data unit portion to read.

Block 2260 comprises using an arbitration policy to select between the first and second candidates. A simple random or round-robin policy may be utilized. Or, the policy may be weighted in favor of a certain set based on a variety of factors, such as the aggregate size of each respective set of RIQ queues, or a moving average of that size. In an embodiment, the two candidate read instructions may be scored relative to various factors, and the highest scoring candidate may be selected.

Block 2270 comprises executing the selected read instruction, while block 2280 comprises placing the data unit portion in the read data cache for the bank, as in blocks 1960 and 1970 of flow 1900.

Flow 2200 is but one example flow for selecting a read instruction to execute. Other flows may include fewer, additional, or different elements in varying arrangements. For example, more than two candidates may be selected. As another example, the device logic may be such that candidates may be selected regardless of whether there is a pending write request, and the arbitration policy must arbitrate between the candidates and incoming write request(s). Moreover, modifications explored with respect to flow 1900 may similarly apply to flow 2200.

3.7. Intelligent Read Selection Assignment

Figure 23:
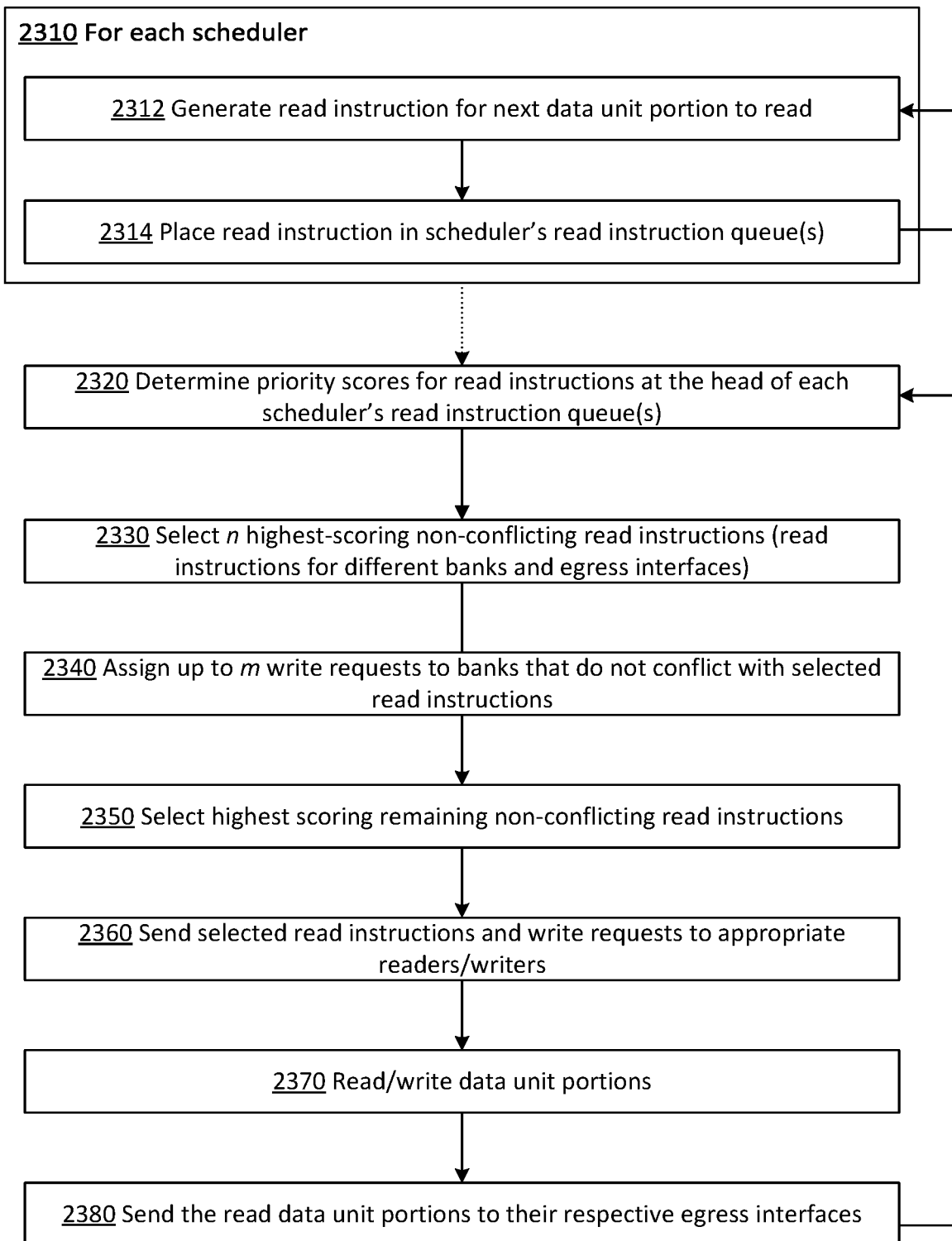
FIG. 23 illustrates a flow for intelligently scheduling read instructions for execution in a device that does not necessarily have per-bank read instruction queues.

FIG. 23 illustrates a flow 2300 for intelligently scheduling read instructions for execution in a device that does not necessarily have per-bank RIQs, according to an embodiment. Flow 2300 may be utilized to select read instructions from RIQs in systems without per-bank RIQs, such as in device 1400, though flow 2300 need not be limited to such embodiments.

In block 2310, a plurality of schedulers, such as described elsewhere herein, populate read instruction queues. Block 2310 may be performed over any number of time slots, and is both ongoing and concurrent relative to the rest of flow 2300. Block 2310 comprises blocks 2312 and 2314.

Block 2312 comprises generating a read instruction for the next data unit portion to read. The read instruction may be generated in similar manner to the read instruction generated in block 1840. For example, the scheduler may locate a next data unit to send based on various egress queues associated with the scheduler, and then iteratively generate read instructions for each data unit portion of the data unit. Of course, flow 2300 is not specific to any particular manner in which read instructions might be generated.

Block 2314 comprises placing the read instruction in a RIQ for the scheduler. The scheduler may have one or more RIQs. If there are multiple RIQs, each RIQ may pertain to some categorization of the data unit portion to be read, such as multi-destination versus single-destination or editable versus non-editable. In at least one embodiment, the scheduler's RIQs are not bank-specific, meaning that they may store read instructions that target any of the egress buffer banks in the implementing traffic manager.

Block 2320 comprises determining priority scores for at least the read instructions at the heads of the RIQs. In some embodiments, other read instructions may optionally be scored as well. The priority scores may be based on any suitable factors, including those described in other sections. In an embodiment, read instructions are prioritized based at least in part on which banks and/or egress block interfaces they target, so that read instructions that would be more optimal to execute in the upcoming time slot are scored higher. Examples of such scoring mechanisms are described, without limitation, elsewhere herein.

Block 2330 comprises selecting a certain number of the highest scoring, non-conflicting read instructions. A read instruction is non-conflicting if it does not target a bank or an egress block interface that is unavailable on account of higher-scoring read instructions. For instance, in embodiments with single-ported memories and egress block interfaces capable of inputting only one data unit portion at a time, a read instruction is non-conflicting if it does not target the same bank as any higher-scoring read instruction and it does not target the same egress block interface as any higher-scoring read instruction.

The number of selected instructions may be selected based, in part, on the number of write requests that may be received in the upcoming time slot. For instance, the number of selected read instructions may be no more than number of banks minus the number of potential write requests, so as to ensure that all write requests that may be received for the upcoming time slot can be serviced. It may, in some embodiments, be desirable to leave more than the bare minimum number of banks available to choose for write operations, so as to optimize the manner in which data units are stored (e.g. avoiding storing too many portions of the data unit in the same bank or set of banks). If there are not enough non-conflicting read instructions, then only the number of non-conflicting read instructions are selected.

Block 2340 comprises assigning any write requests that need to be executed in the upcoming time slot to available banks. An available bank is one that can still be accessed after consideration of all read instructions already selected. For instance, in single-ported embodiments, an available bank is any bank that is not already being read from. Various buffer assignment logic may then be used to select between the available banks for any given write request, including rules such as a rule not to write data units for the same data unit portion to the same bank as an immediately preceding data unit portion. The buffer assignment logic may also track and utilize a next-bank pointer for the data unit.

Block 2350 comprises selecting the highest-scoring remaining read instructions that do not conflict with the read instructions and write assignments made in blocks 2330 and 2340, if any. Block 2350 may be optional, depending on the embodiment. For instance, in some embodiments, the actual number of write requests in an upcoming time slot may be known enough in advance that all possible read instructions may already be selected in block 2330. In other embodiments, the actual number of write requests cannot be known far enough in advance, and/or it may be desirable to have more than the minimum number of banks available to choose from when assigning write requests to banks, and thus block 2350 may be performed after blocks 2340 to maximize utilization of any banks that remain unutilized.

In an embodiment, a first set of read instructions may be scheduled for an upcoming time slot some number of clock cycles in advance, per block 2330. As the upcoming time slot approaches and the number of write requests needed becomes known, the selection of additional read instructions to fill any unused banks may be made, per block 2350.

Block 2360 comprises sending the selected read instructions and write requests to the appropriate readers and writers for the banks involved in those instructions and requests. Block 2370 comprises reading and writing the data unit portions. Block 2380 comprises sending the read data unit portions to their respective egress block interfaces, as indicated by their respective read instructions. In an embodiment, they may be sent directly, without waiting in a read data cache.

Flow 2300 is but one example flow for scheduling read instructions for execution. Other flows may include fewer, additional, or different elements in varying arrangements. For example, more than two candidates may be selected. As another example, the device logic may be such that candidates may be selected regardless of whether there is a pending write request, and the arbitration policy must arbitrate between the candidates and any incoming write request(s). Moreover, modifications explored with respect to flow 1900 may similarly apply to flow 2300.

As a further example, in an embodiment, flow 2300 may include consolidating read instructions for a same data unit portion destined to different egress block interfaces. As yet another example, flow 2300 may include consolidating read instructions for smaller data units, as described in other sections.

In an embodiment, blocks 2320-2380 may be utilized in place of flows 1900 and/or 2200 in systems with per-bank RIQs, such as in device 1000. In such an embodiment, there may be no need for a read data cache.

In other embodiments, other scheduling techniques may be utilized. For instance, an IRSA Controller may test various combinations of read instructions and determine a score for each combination. The number of read instructions in the combinations may be selected so as to leave banks available for any write requests that need to be serviced. The score for a combination of read instructions may be based on, for instance, the number of egress block interfaces utilized, the number of banks utilized, the desirability of the banks left available for servicing write requests, or any other suitable factor. The highest scoring combination may be selected. To reduce the complexity of the selection technique, only a limited number of combinations may be tested. For instance, combinations of read instructions may be selected at random, or only from a set of highest scoring candidate read instructions. In an embodiment, multiple aggregate scores may be generated in parallel to determine which combination of read instructions and write requests delivers the best performance in terms of throughput, delay, jitter, and/or other factors.

In an embodiment, this combination testing technique may be utilized to generate a schedule for a first set of read instructions in advance, and additional read instructions may be selected subsequently if banks are available, per block 2350. In another embodiment, this combination-testing technique is used to determine all read instructions to execute.

3.8. Bypassing Ingress Buffering for Payload Data

Figure 28:
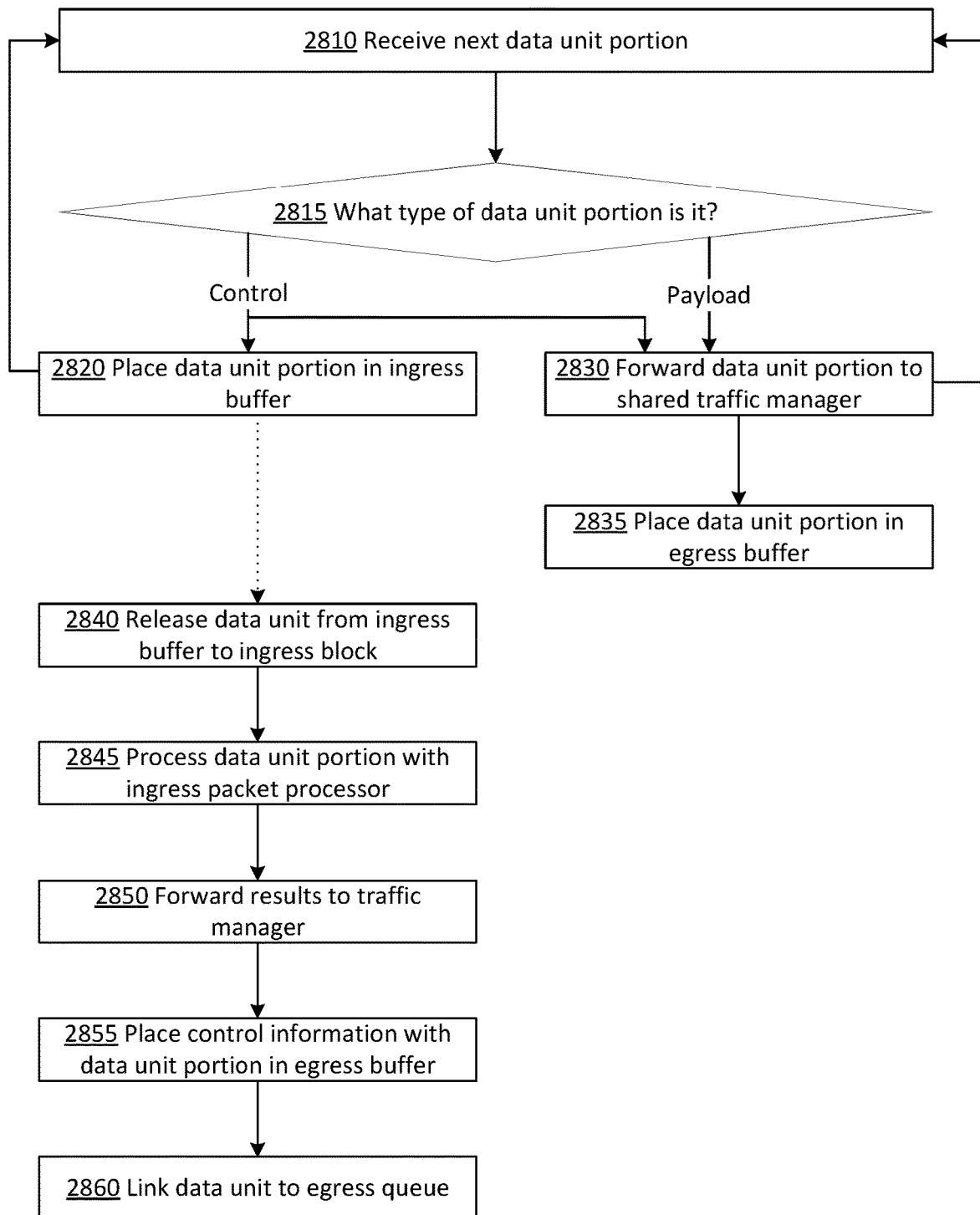
FIG. 28 illustrates a flow for bypassing ingress buffering for payload data.

FIG. 28 illustrates a flow 2800 for bypassing ingress buffering for payload data, according to an embodiment. Flow 2800 may be practiced with or without the specific details of the preceding flows. For example, flow 2800 may be one example method by which data units are received at a traffic manager in flow 1700. However, flow 1700 may be practiced without necessarily performing flow 2800, and vice versa.

Block 2810 comprises receiving a portion of a data unit, such as a cell of a packet, at an ingress arbiter, such as ingress arbiter 2720. The data unit may be received, for example, via an ingress port. The ingress arbiter may be one or any number of ingress arbiters in a device. Block 2815 comprises determining a type of the data unit portion, which may either be the control portion (e.g. the SOP cell) or a payload portion.

If the data unit portion is the control portion, then in block 2820 the control portion is placed in an ingress buffer within or coupled to the ingress arbiter. The entire control portion may be buffered, or just the non-payload data found therein (e.g. packet headers, etc.). Depending on the embodiment, the control portion, or at least any payload data found therein, may also be forwarded to the shared traffic manager in block 2830.

Meanwhile, if the data unit portion is not the control portion, the data unit portion is not buffered in the ingress buffer, and is instead forwarded in block 2830 directly to a shared traffic manager. The shared traffic manager is shared by all of the egress blocks of the device. The shared traffic manager places the data unit portion in an egress buffer to await processing by the one or more egress blocks.

Flow 2800 may loop back to block 2810 for continued reception of data unit portions. As a result, the entire payload portion of the data unit will eventually be placed in the egress buffer of the shared traffic manager.

Meanwhile, at some time subsequent to, and asynchronous with, placing the control portion in the ingress buffer in block 2820, the ingress arbiter may determine to release the control portion from the ingress buffer to an ingress block, per block 2840. The ingress arbiter may come to this determination using any suitable technique. For example, in an embodiment, the ingress arbiter may have placed the data unit in an ingress queue, and the data unit may have finally arrived at the head of that ingress queue.

Block 2845 comprises processing the data unit portion with an ingress packet processor of the ingress block. The ingress packet processor may perform the types of processing described elsewhere herein, including generating certain ingress control information for the data unit. The generated ingress control information is separate and distinct from the control data, such as packet headers, that is already found in the control data. Block 2850 comprises sending the results of this processing to the shared traffic manager.

Block 2855 comprises buffering the ingress control information in the egress buffer of the shared traffic manager. For example, the ingress control information may be embedded in the control portion of the data unit, and block 2855 may simply comprise buffering the control portion with the embedded control information. In some embodiments, however, the control portion may also have been sent as part of the payload data, and hence already be in the egress buffer. Block 2855 may therefore comprise storing the ingress control information in association with the control portion.

Block 2860 comprises linking the data unit to one or more egress queues. If the traffic manager is operating in SF mode, and the complete payload data of the data unit has not already been buffered, then block 2860 may wait for the rest of the payload data to be received.

Flow 2800 is but one example flow for bypassing ingress buffering. Other flows may include fewer, additional, or different elements in varying arrangements.

3.9. Writing Data Structures to an Optimized Logical Bank

Figure 24:
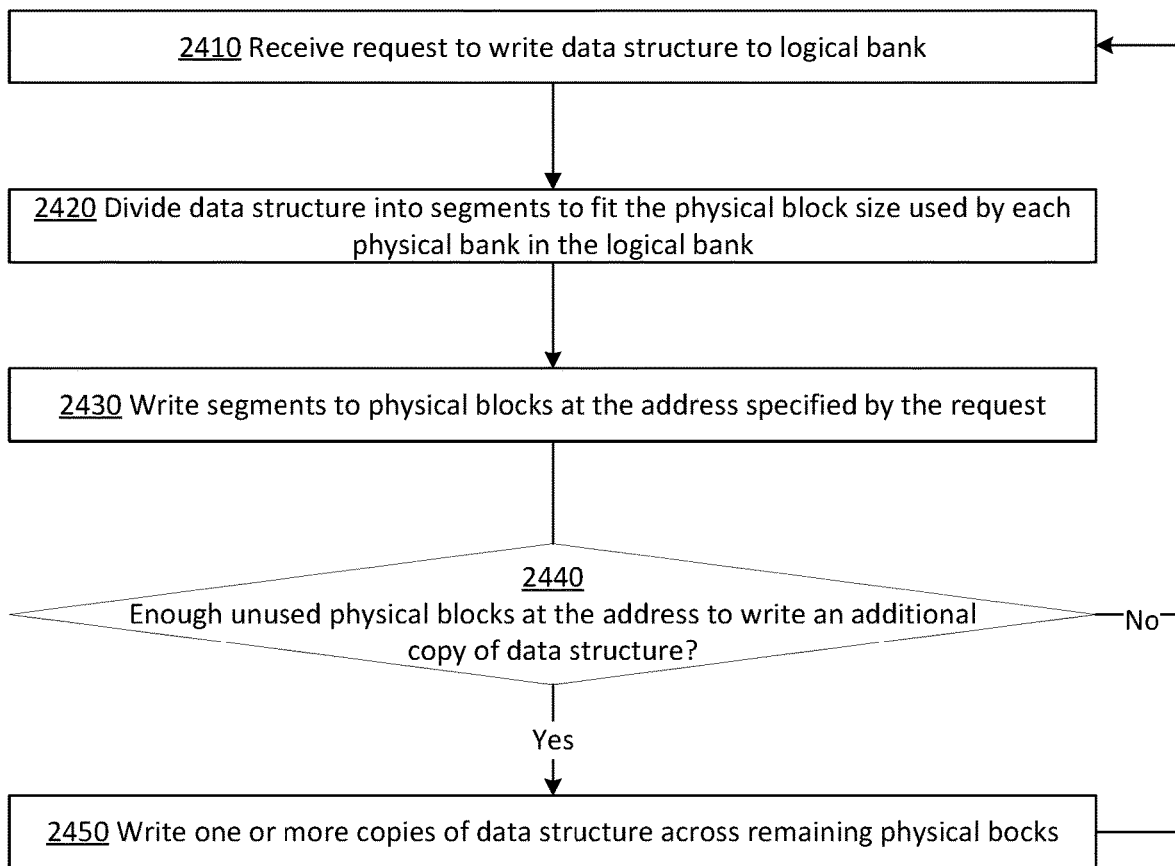
FIG. 24 illustrates a flow for writing data structures to an optimized logical bank.

FIG. 24 illustrates a flow 2400 for writing data structures to an optimized logical bank, such as bank 1600, according to an embodiment. Flow 2400 may be practiced with or without the specific details of the preceding flows. For instance, in some embodiments, flow 2400 is performed in response to any request to write to a buffer bank in a device 200, device 800, or any other device described herein. However, in other embodiments, flow 2400 may be practiced in a variety of systems other than those described herein.

Block 2410 comprises receiving a request to write a data structure to a logical bank. In an embodiment, the data structure may be a data unit or a data unit portion, such as a cell or frame. The data structure may also be data unit metadata in a link memory or any other type of data structure. The data structure is capped in size, with the maximum size being substantially equal to and in any event no greater than the size of each logical block within the logical bank.

The logical bank comprises a plurality of physical banks, each having physical blocks of the same size. Each logical block contains a physical block from each physical bank. In an embodiment, the set of physical blocks having the same relative address in each of the physical banks forms the logical block for that address.

Block 2420 comprises dividing the data structure into segments to fit the physical block size. For instance, suppose a logical block is 2048 bytes in size, comprising eight physical blocks of 256 bytes. The data structure would be divided into 256-byte segments, with the potential exception of the last segment, which may be less than 256 bytes.

Block 2430 comprises writing the segments to physical blocks at the address specified by the request. Each segment is written to a different physical block in a different physical bank, but at a same relative address within the physical bank. Thus, for instance, if the write request were for a logical block at address 0x04, the first segment of the data structure would be written to the physical block at address 0x04 of the first physical bank, the second segment of the data structure would be written to the physical block at address 0x04 of the second physical bank, and so forth.

Block 2440 comprises determining whether there are enough physical blocks remaining at the address to write an additional copy of the data structure. For instance, if the logical block size were 2048 bytes, but the actual size of the data structure were 1000 bytes, half of the physical banks would remain unoccupied at the write address. Hence, there should be enough room to write an additional copy to these unoccupied physical blocks.

If there is enough room to write additional copies, then flow 2400 proceeds to block 2450. Block 2450 comprises writing one or more copies of the data structure across the remaining physical blocks. Each copy is written in the same manner as in blocks 2420 and 2430, but to different physical blocks at the write address. The number of copies made will depend on how many copies can fit within the remaining unused physical blocks. For instance, if there are ten physical banks, and the data structure were divided into three segments, there would be seven unoccupied physical blocks at the write address. These three segments may be written twice more in the unused physical blocks, resulting in two additional copies of the data structure at the write address.

Flow 2400 is but one example flow for writing data to an optimized logical bank. Other flows may include fewer, additional, or different elements in varying arrangements.

3.10. Reading Data Structures from an Optimized Logical Bank

Figure 25:
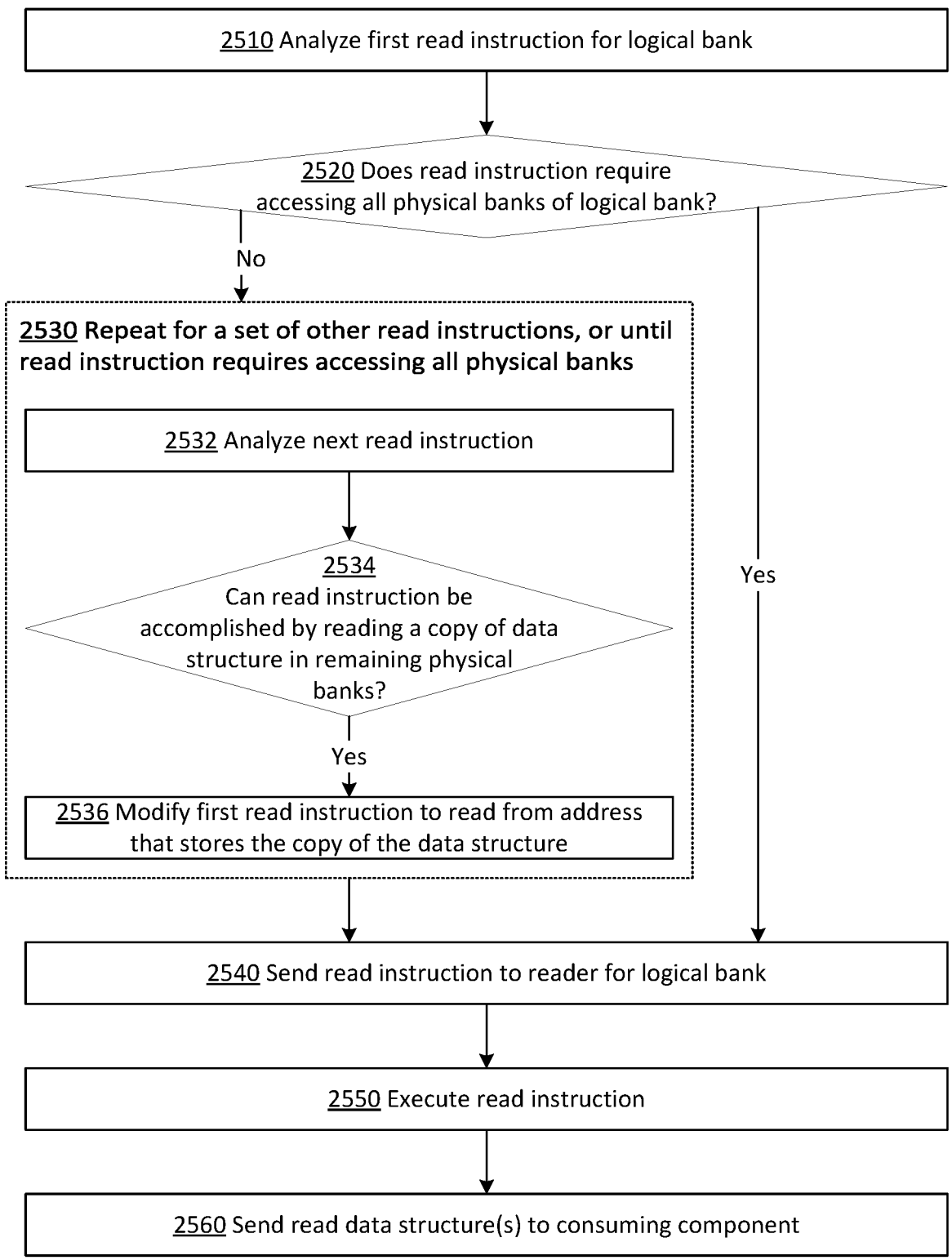
FIG. 25 illustrates a flow for reading data structures from an optimized logical bank.

FIG. 25 illustrates a flow 2500 for reading data structures from an optimized logical bank, according to an embodiment. Flow 2500 may be utilized, for instance, to read data written to a logical bank per flow 2400.

Block 2510 comprises analyzing a first read instruction for the logical bank. The read instruction may be generated, read, and/or stored in any suitable manner. For example, in an embodiment, the read instruction may be a read instruction in a RIQ such as described in other sections.

Block 2520 comprises determining whether the read instruction requires access to all physical banks within the logical bank. This determination may be made in a variety of manners. For instance, there may be metadata indicating the size of the data structure. Based on the size of the data structure, as well as knowledge of sizes of the individual physical blocks within the logical bank and knowledge of the logic utilized to write the data structure, the identities of physical blocks in which the data structure is stored may easily be determined. For instance, if the logical block size is 1024 bytes, and the physical block size is 128, but the data structure is only 700 bytes, it may be determined that the data structure may be read without utilizing the last two physical banks of the logical bank.

In yet other embodiments, there may be metadata that explicitly specifies which physical banks store segments of the data structure. Such metadata may be found in, for example, the read instruction. For instance, the read instruction may explicitly specify which physical banks should be read. Or, such metadata may be associated with the data structure in another location.

If the read instruction requires access to all physical banks within the logical bank, flow 2500 skips to block 2540. Otherwise, flow 2500 proceeds to block 2540.

Block 2530 comprises attempting to consolidate the read instruction with one or more other read instructions. Block 2530 may comprise performing sub-blocks 2532-2536 for each of a certain number of other read instructions (e.g. other read instructions in one or more schedules of instructions or queues). All available read instructions may be considered, or just a limited number thereof (e.g. just a first number of instructions, just those instructions that meet certain constraints, etc.).

Sub-block 2532 comprises analyzing a next read instruction. Sub-block 2534 comprises determining whether this next read instruction can be accomplished by reading only from the physical banks not needed to execute the original read instruction. That is, it is determined whether a complete copy of the data structure targeted by the next read instruction can be found in the physical banks that would not be needed for executing the next read instruction. The determination may be made using metadata that indicates the size of the data structure being read by the next read instruction, or metadata indicating a specific set of physical banks that store a complete copy of that data structure. For instance, if the original read instruction requires the first five of the physical banks, and the next read instruction is for a data unit that has a copy in the last two physical banks, then the instructions can be consolidated.

If the next read instruction can be accomplished by reading only from the physical banks not needed to execute the original read instruction, then block 2530 can proceed to sub-block 2536. Sub-block 2536 comprises modifying the original read instruction to indicate that these previously unnecessary physical banks should read from the address pointed to by the next read instruction instead of the original read instruction. For instance, the modified read instruction might indicate that banks 1-6 read from an address 0x04 at which the original data structure is stored, and that banks 7-8 read from an address 0x18, at which a copy of another data structure is stored.

If there are still physical banks that are not needed to read the original data structure or next data structure, block 2530 may be repeated until all physical banks are utilized, meaning that three, four, or even more data structures may potentially be read by the same read instruction.

In an embodiment, there may be additional constraints on when read instructions may be consolidated—for instance, based on the destination port, destination port group, historical usage, power impact, and so forth. Hence, optionally, block 2530 may comprise a substep of determining whether consolidating the next read instruction with the original read instruction is permitted by these constraints.

Block 2540 comprises sending the read instruction to the reader for the logical bank. Block 2550 comprises executing the read instruction by reading each physical bank from the address specified for that bank in the read instruction. If the read instruction was not modified, then all physical banks may read at the same address. Block 2560 comprises sending the data structure to a component configured to consume the data structure, such as a read data cache, packet processor, egress block, or any other component.

Since a logical bank may store duplicate copies of a data structure, it may be necessary to filter out the output of certain physical banks that contain extraneous copies or segments thereof. Alternatively, the read instruction may be modified in advance to specify that only certain physical banks containing the first copy of the data structure should be read, thus ignoring extraneous copies.

Flow 2500 is but one example flow for writing data to an optimized logical bank. Other flows may include fewer, additional, or different elements in varying arrangements.

4.0. Example Embodiments

Examples of some embodiments are represented, without limitation, in the following clauses:

According to an embodiment, a network switching apparatus comprises ports, multiple egress blocks configured to process data units before the data units are sent out the ports, and a shared traffic manager coupled to the multiple egress blocks.

According to an embodiment, a network switching apparatus comprising: ports configured to receive and send data over a network; an ingress arbiter configured to: receive data units via the ports; buffer first portions of the data units in an ingress buffer memory; send payload portions of the data units directly to a traffic manager without buffering the payload portions in the ingress buffer memory; one or more ingress blocks configured to receive the first portions of the data units as the ingress arbiter releases the first portions from the ingress buffer memory, and to process the first portions prior to forwarding the processed first portions to the traffic manager; a traffic manager configured to receive the data units, the traffic manager comprising at least: buffer management logic configured to buffer the data units in an egress buffer memory before the data units are sent to one or more egress blocks; one or more schedulers configured to determine which portions of the data units to send to the one or more egress blocks at which times; the one or more egress block configured to process the data units before the data units are sent out of the ports.

According to an embodiment, a network switching apparatus comprises: ports configured to receive and send data over a network; multiple egress blocks configured to process data units before the data units are sent out of the ports, each egress block comprising a packet processor and one or more egress block interfaces configured to input the data units, each egress block configured to send data units out a different set of the ports; a shared traffic manager coupled to the multiple egress blocks by the egress block interfaces, the shared traffic manager configured to receive the data units via one or more input interfaces, the shared traffic manager comprising at least: a buffer memory; buffer management logic configured to buffer the data units in the buffer memory before the data units are sent to the egress blocks; one or more schedulers configured to determine which portions of the data units to send to the egress blocks at which times.

In an embodiment, the network switching apparatus further comprises: an ingress arbiter configured to: receive the data units via the ports; buffer first portions of the data units in an ingress buffer memory; send payload portions of the data units directly to the one or more input interfaces of the shared traffic manager without buffering the payload portions in the ingress buffer memory; one or more ingress blocks configured to receive the first portions of the data units as the ingress arbiter releases the first portions from the ingress buffer memory, and to process the first portions prior to forwarding the processed first portions to the one or more input interfaces of the shared traffic manager.

In an embodiment, the one or more ingress blocks do not include a merger subsystem for merging the first portions with the payload portions.

In an embodiment, the network switching apparatus further comprises an interconnect via which the first portions and the payload portions are sent to the one or more input interfaces of the shared traffic manager.

In an embodiment, the shared traffic manager further comprises queue management logic configured to queue the buffered data units in one or more egress queues, the schedulers determining which portions of the data units to send to the egress blocks at which times based on one or more egress queues.

In an embodiment, the buffer memory comprises multiple single-ported memory banks.

In an embodiment, the data units are packets and the data unit portions are cells.

In an embodiment, the schedulers are configured to, when identifying data unit portions to send to the egress blocks, generate read instructions for reading the data unit portions from the single-ported memory banks, and to queue the generated read instructions in read instruction queues, the shared traffic manager further comprising selection logic configured to, when particular memory banks of the buffer memory are available for read operations, utilize the read instruction queues to determine which data unit portions to read from the particular memory banks, and further configured to send the data unit portions that were read to particular egress block interfaces targeted by the data unit portions.

In an embodiment, the network switching apparatus further comprises: an interconnect comprising one or more output interfaces coupled to the one or more input interfaces of the shared traffic manager, and further comprising a plurality of input interfaces; ingress blocks coupled to the input interfaces of the interconnect and configured to process the data units before sending the data units to the shared traffic manager via the interconnect, each ingress block comprising an ingress packet processor; and an arbiter configured to receive the data units via the ports and forward the data units to appropriate ingress blocks of the ingress blocks.

In an embodiment, the multiple egress blocks are first egress blocks, the shared traffic manager is a first shared traffic manager, and the ports are first ports, the network switching apparatus further comprising: second ports configured to receive and send data over a network; second egress blocks coupled to the second ports; a second shared traffic manager, coupled to the second egress blocks, the second shared traffic manager separate from the first shared traffic manager.

In an embodiment, the multiple egress blocks are first egress blocks, the shared traffic manager is a first shared traffic manager, and the ports are first ports, the network switching apparatus further comprising: second ports configured to receive and send data over a network; a second egress block coupled to the second ports; a second traffic manager, coupled to the second egress block, the second traffic manager separate from the first shared traffic manager, the second traffic manager not shared amongst multiple egress blocks.

In an embodiment, each egress block of the multiple egress blocks comprises: an editable interface coupled to the packet processor of the egress block, the packet processor configured to receive at least first portions of particular data units from the traffic manager via the editable interface and to generate control information based on the first portions; an uneditable interface coupled to a merger subsystem; said merger subsystem, configured to receive second portions of the particular data units from the traffic manager via the uneditable interface and to merge the control information with the second portions of the particular data units for which the control information was respectively generated.

In an embodiment, each egress block of the multiple egress blocks comprises: multiple editable interfaces coupled to the packet processor of the egress block, the packet processor configured to receive at least first portions of certain data units from the traffic manager via the editable interfaces and to generate control information based on the first portions; multiple uneditable interfaces, each coupled to a different merger subsystem of multiple merger subsystems in the egress block; said multiple merger subsystems, each configured to receive second portions of particular data units from the traffic manager via an associated one of the uneditable interfaces and to merge particular control information with the second portions of the particular data units for which the particular control information was respectively generated.

In an embodiment, data unit portions that are no longer needed are removed from the buffer memory after being read, wherein the buffer management logic is configured to drop certain data units without buffering when the buffer memory is overutilized.

According to an embodiment, a method comprises: receiving data units at a shared traffic manager; buffering the data units in a buffer memory of the shared traffic manager; scheduling data units to release from the buffer memory to multiple egress blocks coupled to the shared traffic manager, a given data unit being released to one or more of the egress blocks; processing data units at the egress blocks with egress packet processors, each egress block having a separate egress packet processor; based on the processing, forwarding the data units to egress ports, each egress block coupled to a different set of the egress ports.

In an embodiment, the method further comprises: receiving the data units via ingress ports at an ingress arbiter; buffering first portions of the data units in an ingress buffer memory of the ingress arbiter; sending payload portions of the data units directly to the shared traffic manager without buffering the payload portions in the ingress buffer memory; releasing the first portions from the ingress buffer memory to one or more ingress blocks; processing the first portions with one or more ingress packet processors in the one or more ingress blocks; forwarding the processed first portions to the shared traffic manager.

In an embodiment, the method further comprises: queueing the buffered first portions in one or more ingress queues at the arbiter; determining which first portions to send to the one or more ingress blocks at which times based on one or more ingress queues; queuing the buffered data units in one or more egress queues at the shared traffic manager; determining which portions of the data units to send to the egress blocks at which times based on one or more egress queues.

In an embodiment, the buffer memory comprises multiple single-ported memory the method further comprising: identifying data unit portions to send to the egress blocks by: generating read instructions for reading the data unit portions from the single-ported memory banks; queueing the generated read instructions in read instruction queues; when particular memory banks of the buffer memory are available for read operations, utilizing the read instruction queues to determine which data unit portions to read from the particular memory banks; sending the data unit portions that were read to particular egress block interfaces targeted by the data unit portions.

According to an embodiment, a network-switching apparatus comprises: a buffer memory comprising multiple banks, each bank supporting only a limited number of input/output operations in a given time slot; buffer management logic configured to write portions of data units to entries within the banks; schedulers configured to: identify buffered data unit portions that are to be sent to one or more of a plurality of interfaces; generate read instructions for reading the identified data unit portions from particular banks in the buffer memory; place the read instructions in read instruction queues, each of the schedulers having a different set of one or more read instruction queues; read operation selection logic configured to, for time slots when particular banks of the multiple banks are available for read operations, select particular read instructions to execute for reading particular data unit portions from the particular banks; read logic configured to execute the particular read instructions during the time slots; output logic configured to send the particular data unit portions that were read to particular interfaces identified by the particular read instructions.

In an embodiment, the apparatus is a network switching device and the data units are cells of network packets.

In an embodiment, the apparatus is an integrated circuit.

In an embodiment, the time slots are clock cycles.

In an embodiment, the banks are single-ported, wherein the particular banks are available in a time slot when the buffer management logic is not writing to the particular banks in the time slot, and no other selected read instructions are targeting the particular banks.

In an embodiment, the buffer memory, buffer management logic, schedulers, read operation selection logic, read logic, and output logic are all components of a shared traffic manager.

In an embodiment, the interfaces are egress block interfaces for sending data unit portions to different egress blocks, the shared traffic manager coupled to multiple egress blocks via the egress block interfaces, the egress blocks each comprising a packet processor for processing the data unit portions prior to sending the data unit portions from the network switching device.

In an embodiment, the apparatus further comprises queue management logic configured to enqueue and dequeue data units from egress queues, the data unit portions identified by the schedulers being portions of data units that are being dequeued from the egress queues, each scheduler associated with a different set of the egress queues.

In an embodiment, each bank of the banks is associated with a different set of the read instruction queues, each scheduler having at least one read instruction queue for each bank; wherein the read operation selection logic is configured to, for at least each bank in the buffer memory that is not being written to during a given time slot, select a read instruction to execute within the bank during the given time slot from the set of read instruction queues associated with the bank.

In an embodiment, the apparatus further comprises: one or more read data caches configured to temporarily store the particular data unit portions that the read logic outputs; wherein each interface of the particular interfaces can only accept a limited amount of data per time slot; wherein the output logic is configured to output the particular data unit portions from the one or more read data caches to the particular interfaces over a period of time in a manner that avoids sending more than the limited amount of data in a given time slot.

In an embodiment, the output logic is the egress block interface bank selection logic.

In an embodiment, the apparatus further comprises: read data cache flow control logic configured to cause the read logic to not read from a certain bank when a certain one of the read data caches associated with certain bank is filled to a threshold capacity.

In an embodiment, the read operation selection logic is an intelligent read selection assignment controller configured to generate an optimized schedule of read and write operations for a given time slot by: selecting a set of non-conflicting read instructions from the read instruction queues, wherein read instructions are non-conflicting if the read instructions do not send more data to a same interface of the plurality of interfaces than can be received in the given time slot, and if the read instructions do not access a same bank more times than the limited number of input/output operations supported in the given time slot; and assigning write requests for newly received data unit portions to a set of banks in the buffer memory that are still available during the given time slot, in view of the set of non-conflicting read instructions.

In an embodiment, the number of read instructions in the set is less than the number of banks in the buffer memory minus the number of write requests possible in the given time slot.

In an embodiment, the intelligent read selection assignment controller is further configured to generate an optimized schedule of read and write operations for a given time slot by, after assigning the write requests to the set of banks, locating one or more additional non-conflicting read instructions in the read instruction queues that can be executed in banks that are still available for one or more input/output operations.

In an embodiment, the read operation selection logic is configured to generate scores for at least a set of head read instructions at the heads of the read instruction queues, the scores being based one or more of: a read instruction age, a data unit age, a data unit portion age, a data unit portion type, a read instruction queue size, a priority level specified by a read instruction, a destination egress block interface, a destination egress port or port group, or a read rate or state of a downstream buffer; wherein the read operation selection logic is configured to select between two or more read instructions based on the scores of the respective read instructions.

In an embodiment, the interfaces include editable egress block interfaces and uneditable egress block interfaces; wherein the read instruction queues include different sets of read instruction queues for the editable egress block interfaces and uneditable egress block interfaces; wherein the read operation selection logic is configured to, for a given bank, select candidate read instructions from both of the different sets of read instructions, and then select between the candidate read instructions based on weights associated with the editable egress block interfaces and uneditable egress block interfaces.

In an embodiment, the read instruction queues include different sets of read instruction queues for multi-destination traffic and single-destination traffic; wherein the read operation selection logic is configured to, for a given bank, select candidate read instructions from both of the different sets of read instructions, and then select between the candidate read instructions based on weights associated with the multi-destination traffic and the single-destination traffic.

In an embodiment, the apparatus further comprises: read instruction optimization logic configured to consolidate read instructions that read a same data unit portion but target different interfaces, wherein the output logic is configured to, based on the consolidated read instruction, output the same data unit portion to the different interfaces.

According to an embodiment, a method comprises: buffering cells of network packets in buffer entries within banks of a buffer memory, the buffer memory comprising multiple banks, each bank supporting only a limited number of input/output operations in a given time slot; identifying cells that are to be sent to one or more of a plurality of interfaces; generating read instructions for reading the identified cells from particular banks in the buffer memory; placing the read instructions in read instruction queues; for time slots when particular banks of the multiple banks are available for read operations, selecting particular read instructions to execute for reading particular cells from the particular banks; executing the particular read instructions during the time slots; sending the particular cells that were read to particular interfaces identified by the particular read instructions.

In an embodiment, the identified cells are cells that are being dequeued from the egress queues, wherein the interfaces are interfaces to egress blocks comprising packet processors, the egress blocks coupled to egress ports configured to output cells to a communications network.

In an embodiment, each bank of the banks is associated with a different set of the read instruction queues; wherein selecting the particular read instructions comprises, for at least each bank in the buffer memory that is not being written to during a given time slot, selecting a read instruction to execute within the bank during the given time slot from the set of read instruction queues associated with the bank.

In an embodiment, the method further comprises: after reading the particular data unit portions from the particular banks, temporarily storing the particular data unit portions in one or more read data caches; wherein each interface of the particular interfaces can only accept a limited amount of data per time slot; outputting the particular data unit portions from the one or more read data caches to the particular interfaces over a period of time in a manner that avoids sending more than the limited amount of data in a given time slot.

In an embodiment, the method further comprises: not reading from a certain bank when a certain one of the read data caches associated with certain bank is filled to a threshold capacity.

In an embodiment, the method further comprises: generating an optimized schedule of read and write operations for a given time slot by: selecting a set of non-conflicting read instructions from the read instruction queues, wherein read instructions are non-conflicting if the read instructions do not send more data to a same interface of the plurality of interfaces than can be received in the given time slot, and if the read instructions do not access a same bank more times than the limited number of input/output operations supported in the given time slot; and assigning write requests for newly received data unit portions to a set of banks in the buffer memory that are still available during the given time slot, in view of the set of non-conflicting read instructions.

In an embodiment, selecting the particular read instructions comprises: generating scores for at least a set of head read instructions at the heads of the read instruction queues, the scores being based on one or more of: a read instruction age, a data unit age, a data unit portion age, a data unit portion type, a read instruction queue size, or a priority level specified by a read instruction, a destination egress block interface, a destination egress port or port group, or a read rate or state of a downstream buffer; selecting between two or more read instructions based on the scores of the respective read instructions.

In an embodiment, the method further comprises: consolidating read instructions that read a same data unit portion but target different interfaces; based on the consolidated read instruction, outputting the same data unit portion to the different interfaces.

According to an embodiment, a method comprises: buffering cells of network packets in buffer entries within banks of a buffer memory, the buffer memory comprising multiple banks, each bank supporting only a limited number of input/output operations in a given time slot; enqueuing buffered cells in one or more egress queues; dequeueing cells from the egress queues; generating read instructions for reading the dequeued cells from particular banks in the buffer memory and sending the dequeued cells, once read, to one or more of a plurality of interfaces to egress blocks, the egress blocks comprising packet processors and coupled to egress ports configured to output cells to a communications network, wherein each interface of the particular interfaces can only accept a limited amount of data per time slot; placing the read instructions in read instruction queues, wherein each bank of the banks is associated with a different set of the read instruction queues; for time slots when particular banks of the multiple banks are available for read operations, selecting particular read instructions to execute for reading particular cells from the particular banks, the selecting comprising, for at least each bank in the buffer memory that is not being written to during a given time slot, selecting a read instruction to execute within the bank during the given time slot from the set of read instruction queues associated with the bank; executing the particular read instructions during the time slots to read the particular data unit portions from the particular banks; after reading the particular data unit portions from the particular banks, temporarily storing the particular data unit portions in one or more read data caches; outputting the particular data unit portions from the one or more read data caches to the particular interfaces over a period of time in a manner that avoids sending more than the limited amount of data in a given time slot.

According to an embodiment, an apparatus comprises: a logical bank of memory, the logical bank comprising multiple physical banks, the logical bank divided into logical blocks, each logical block comprising multiple physical blocks, each of the multiple physical blocks found in a different one of the physical banks; write logic configured to, for a given data structure written to a given logical block of the logical bank, the given logical block comprising given physical blocks, if the given data structure spans no more than half of the given physical blocks, write one or more additional copies of the given data structure to the given physical blocks.

According to an embodiment, an apparatus comprises: a logical bank of memory, the logical bank comprising multiple physical banks, the logical bank divided into logical blocks, each logical block comprising multiple physical blocks, each of the multiple physical blocks found in a different one of the physical banks; read logic configured to: identify a first read instruction to read a first data structure from a first logical block; determine that the first data structure can be read using only a first subset of the physical banks; identify a second read instruction to read a second data structure from a second logical block; determine that a copy of the second data structure is found in a second subset of the physical banks that does not overlap with the first subset, and read at least the first data structure and the second data structure from the logical bank in a same read operation.

In an embodiment, the apparatus further comprises: write logic configured to, for a given data structure written to a given logical block of the logical bank, the given logical block comprising given physical blocks, if the given data structure spans no more than half of the given physical blocks, write one or more additional copies of the given data structure to the given physical blocks.

In an embodiment, the logical bank stores one data structure per logical block.

In an embodiment, read operations against the logical bank return no more than an amount of data corresponding to a size of the logical blocks, each of the logical blocks being of the same size, each read operation executed by causing each of the physical banks to read no more than a single physical block, the read operation outputting a block of data comprising each physical block that was read.

In an embodiment, the multiple physical blocks of each logical block have a same address relative to their respective banks, the logical block also having the same address, wherein the first logical block and the second logical block have different addresses.

In an embodiment, each logical block consists only of a single physical block from each of the physical banks.

In an embodiment, each of the multiple physical banks are single-ported.

In an embodiment, the read logic is further configured to read a third data structure from a third subset of the physical banks in the same read operation.

In an embodiment, the read logic is further configured to, when executing a third read instruction to read a third logical block that stores more than one copy of a third data structure, outputting only one copy of the third data structure.

In an embodiment, wherein the first logical bank includes third physical blocks from a third subset of the physical banks that do not overlap with the first subset or the second subset, the third physical blocks including at least a portion of a duplicate copy of first data structure, the read logic configured not to output the third physical blocks.

In an embodiment, the read operation outputs the first data structure and second data structure combined in a single block of data.

In an embodiment, the read operation is performed in a single clock cycle.

In an embodiment, the read logic is configured to consolidate the first read instruction and the second read instruction into a single read instruction that specifies a first address to read from the first subset of the physical banks and a second address to read from the second subset of the physical banks.

In an embodiment, the logical bank is a buffer, and each logical block is a buffer entry.

In an embodiment, the first data structure and the second data structure are each cells of network packets, the apparatus further comprising output logic that, upon reading the first the first data structure and second data structure, forwards the first data structure and second data structure together to an egress block comprising a packet processor.

In an embodiment, the apparatus is a network switch, wherein the logical bank is of a plurality of logical banks in a packet buffer within a traffic manager of the network switch.

In an embodiment, the first read instruction is associated with first data structure metadata that indicates that the first data structure spans the first subset of the physical banks within the first logical block, and the second read instruction is associated with second metadata that indicates that there is a copy of the second data structure in the second subset of the physical banks within the second logical block.

In an embodiment, the first data structure metadata is a first size of the first data structure and the second data structure metadata is a second size of the second data structure.

In an embodiment, the apparatus further comprises read consolidation eligibility logic configured to identify instructions that are eligible to be consolidated by the read logic based on destinations for the data read by the instructions.

According to an embodiment, a method comprises: storing data structures logical banks within a logical bank of memory, the logical bank comprising multiple physical banks, each logical block comprising multiple physical blocks, each of the multiple physical blocks found in a different one of the physical banks; identifying a first read instruction to read a first data structure from a first logical block; determining that the first data structure can be read using only a first subset of the physical banks; identifying a second read instruction to read a second data structure from a second logical block; determining that a copy of the second data structure is found in a second subset of the physical banks that does not overlap with the first subset, and reading at least the first data structure and the second data structure from the logical bank in a same read operation.

In an embodiment, the method further comprises: for a given data structure, when the given data structure is less than half of a maximum logical block size, writing two or more copies of the given data structure to a given logical block assigned to store the given data structure, each of the two or more copies stored in physical blocks from a different and non-overlapping set of the physical banks.

In an embodiment, the method further comprises: when executing a third read instruction to read a third logical block that stores more than one copy of a third data structure, outputting only one copy of the third data structure.

In an embodiment, the read operation outputs the first data structure and second data structure combined in a single block of data.

In an embodiment, the read logic is configured to consolidate the first read instruction and the second read instruction into a single read instruction that specifies a first address to read from the first subset of the physical banks and a second address to read from the second subset of the physical banks.

In an embodiment, the logical bank is a buffer, and each logical block is a buffer entry.

In an embodiment, the method further comprises: upon reading the first the first data structure and second data structure, forwarding the first data structure and second data structure together to an egress block comprising a packet processor; wherein the first data structure and the second data structure are each cells of network packets.

In an embodiment, the first read instruction is associated with first data structure metadata that indicates that the first data structure spans the first subset of the physical banks within the first logical block, and the second read instruction is associated with second metadata that indicates that there is a copy of the second data structure in the second subset of the physical banks within the second logical block.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 3:
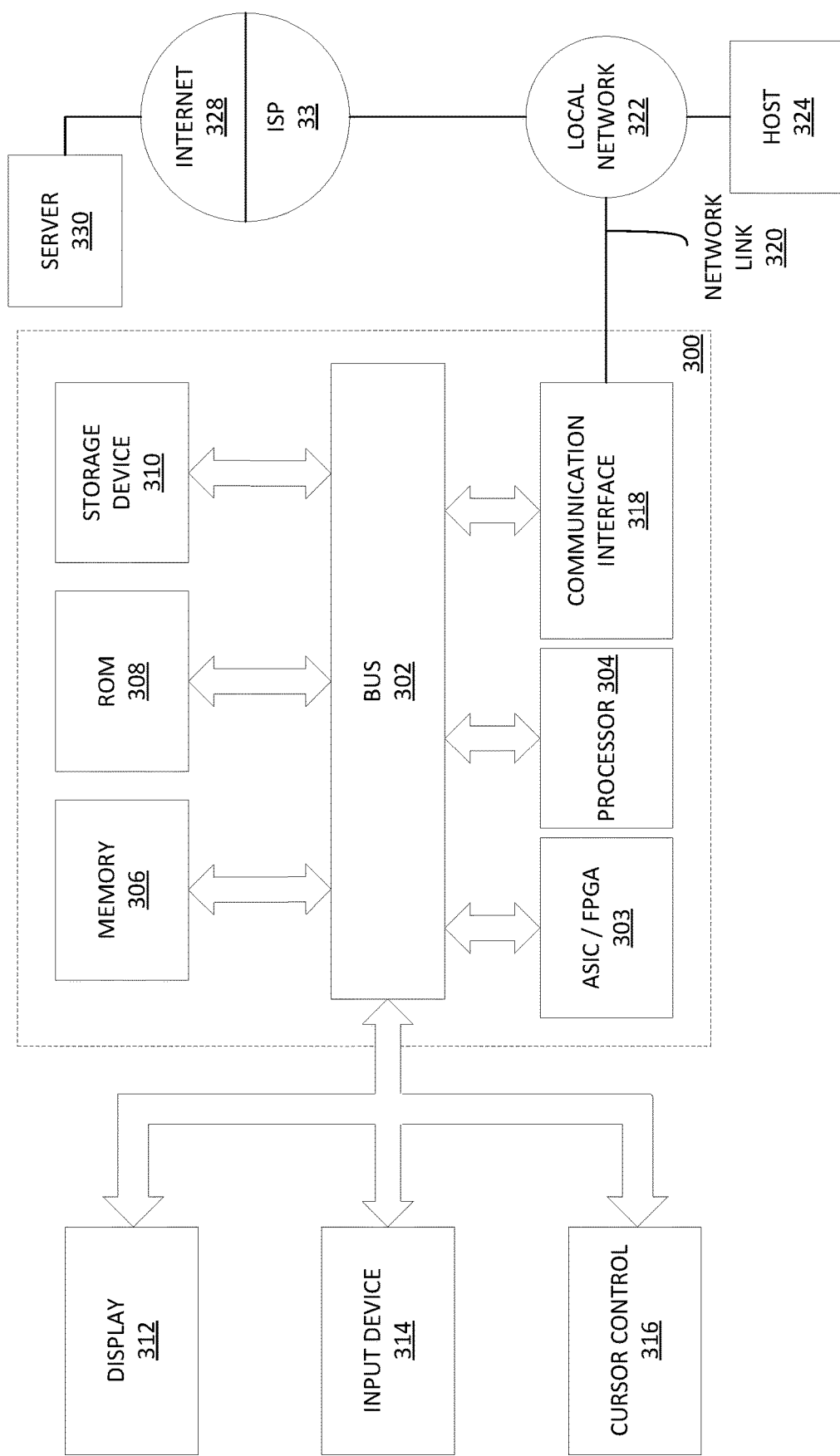
FIG. 3 is block diagram of a computer system upon which embodiments of the inventive subject matter may be implemented.

FIG. 3 is a block diagram that illustrates a computer system 300 that may be utilized in implementing the above-described techniques, according to an embodiment. Computer system 300 may be, for example, a desktop computing device, laptop computing device, tablet, smartphone, server appliance, computing mainframe, multimedia device, handheld device, networking apparatus, or any other suitable device. In an embodiment, FIG. 3 is a different view of the devices and systems described in previous sections.

Computer system 300 may include one or more ASICs, FPGAs, or other specialized circuitry 303 for implementing program logic as described herein. For example, circuitry 303 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 300 may include one or more hardware processors 304 configured to execute software-based instructions. Computer system 300 may also include one or more busses 302 or other communication mechanism for communicating information. Busses 302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 300 also includes one or more memories 306, such as a RAM, hardware registers, or other dynamic or volatile storage device for storing data units to be processed by the one or more ASICs, FPGAs, or other specialized circuitry 303. Memory 306 may also or instead be used for storing information and instructions to be executed by processor 304. Memory 306 may be directly connected or embedded within circuitry 303 or a processor 304. Or, memory 306 may be coupled to and accessed via bus 302. Memory 306 also may be used for storing temporary variables, data units describing rules or policies, or other intermediate information during execution of program logic or instructions.

Computer system 300 further includes one or more read only memories (ROM) 308 or other static storage devices coupled to bus 302 for storing static information and instructions for processor 304. One or more storage devices 310, such as a solid-state drive (SSD), magnetic disk, optical disk, or other suitable non-volatile storage device, may optionally be provided and coupled to bus 302 for storing information and instructions.

A computer system 300 may also include, in an embodiment, one or more communication interfaces 318 coupled to bus 302. A communication interface 318 provides a data communication coupling, typically two-way, to a network link 320 that is connected to a local network 322. For example, a communication interface 318 may be an integrated services digital network (ISDN) card, cable modem, satellite modem, or a modem to provide a data communication connection to a corresponding type of telephone line. As another example, the one or more communication interfaces 318 may include a local area network (LAN) card to provide a data communication connection to a compatible LAN. As yet another example, the one or more communication interfaces 318 may include a wireless network interface controller, such as a 302.11-based controller, Bluetooth controller, Long Term Evolution (LTE) modem, and/or other types of wireless interfaces. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by a Service Provider 326. Service Provider 326, which may for example be an Internet Service Provider (ISP), in turn provides data communication services through a wide area network, such as the world-wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

In an embodiment, computer system 300 can send packets and receive data through the network(s), network link 320, and communication interface 318. In some embodiments, this data may be data units that the computer system 300 has been asked to process and, if necessary, redirect to other computer systems via a suitable network link 320. In other embodiments, this data may be instructions for implementing various processes related to the described techniques. For instance, in the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution. As another example, information received via a network link 320 may be interpreted and/or processed by a software component of the computer system 300, such as a web browser, application, or server, which in turn issues instructions based thereon to a processor 304, possibly via an operating system and/or other intermediate layers of software components.

Computer system 300 may optionally be coupled via bus 302 to one or more displays 312 for presenting information to a computer user. For instance, computer system 300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 312.

One or more input devices 314 are optionally coupled to bus 302 for communicating information and command selections to processor 304. One example of an input device 314 is a keyboard, including alphanumeric and other keys. Another type of user input device 314 is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Yet other examples of suitable input devices 314 include a touch-screen panel affixed to a display 312, cameras, microphones, accelerometers, motion detectors, and/or other sensors. In an embodiment, a network-based input device 314 may be utilized. In such an embodiment, user input and/or other information or commands may be relayed via routers and/or switches on a Local Area Network (LAN) or other suitable shared network, or via a peer-to-peer network, from the input device 314 to a network link 320 on the computer system 300.

As discussed, computer system 300 may implement techniques described herein using customized hard-wired logic, one or more ASICs or FPGAs 303, firmware and/or program logic, which in combination with the computer system causes or programs computer system 300 to be a special-purpose machine. According to one embodiment, however, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 300 can receive the data on the network and demodulate the signal to decode the transmitted instructions. Appropriate circuitry can then place the data on bus 302. Bus 302 carries the data to main memory 306, from which processor 304 retrieves and executes the instructions. The instructions received by main memory 306 may optionally be stored on storage device 310 either before or after execution by processor 304.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network-switching apparatus comprising:
   a buffer memory comprising multiple banks, each bank supporting only a limited number of input/output operations in a given time slot;
   buffer management logic configured to write portions of data units to entries within the banks;
   queueing logic configured to enqueue the data units in egress queues;
   scheduling logic configured to schedule the data units for departure from the egress queues, the scheduling including, for each data unit portion of a given data unit:
      generating a read instruction for reading the data unit portion from a particular bank in the buffer memory to which the data unit portion was written; and
      placing the read instruction in a read instruction queue, the read instruction queue being one of a plurality of read instruction queues;
   read operation selection logic configured to, for time slots when particular banks of the multiple banks are available for read operations, select particular read instructions, from the plurality of read instruction queues, to execute for reading particular data unit portions from the particular banks;

read logic configured to execute the particular read instructions during the time slots;

output logic configured to send the particular data unit portions that were read to particular interfaces identified by the particular read instructions.

2. The apparatus of claim 1, wherein the apparatus is a network switching device, the data units are network packets, and the portions of the data units are cells of the network packets.

3. The apparatus of claim 1, wherein the scheduling logic includes at least a plurality of schedulers, each scheduler of the plurality associated with a different subset of the egress queues.

4. The apparatus of claim 1,
wherein the data units include at least a first data unit divided into first portions that are written to different banks of the banks;
wherein, for each read instruction queue of the read instruction queues, each read instruction enqueued in the read instruction queue is an instruction to read from a same bank of the banks;
wherein the scheduling logic includes at least a plurality of schedulers;
wherein each bank of the banks is associated with a different set of the read instruction queues, each scheduler of the schedulers having at least one read instruction queue for each bank;
wherein the read operation selection logic is configured to, for at least each bank in the buffer memory that is not being written to during a given time slot, select a read instruction to execute within the bank during the given time slot from the set of the read instruction queues associated with the bank.

5. The apparatus of claim 1, further comprising:
one or more read data caches configured to temporarily store the particular data unit portions that the read logic outputs;
wherein each interface of the particular interfaces can only accept a limited amount of data per time slot;
wherein the output logic is configured to output the particular data unit portions from the one or more read data caches to the particular interfaces over a period of time in a manner that avoids sending more than the limited amount of data in a given time slot.

6. The apparatus of claim 5, further comprising read data cache flow control logic configured to cause the read logic to not read from a certain bank when a certain one of the read data caches associated with the certain bank is filled to a threshold capacity.

7. The apparatus of claim 1, wherein the read operation selection logic is an intelligent read selection assignment controller configured to generate an optimized schedule of read and write operations for a given time slot by:
selecting a set of non-conflicting read instructions from the read instruction queues, wherein read instructions are non-conflicting if the read instructions do not send more data to a same interface than can be received in the given time slot, and if the read instructions do not access a same bank more times than the limited number of input/output operations supported in the given time slot; and
assigning write requests for newly received data unit portions to a set of banks in the buffer memory that are still available during the given time slot, in view of the set of non-conflicting read instructions.

8. The apparatus of claim 1,
wherein the read operation selection logic is configured to generate scores for at least a set of head read instructions at the heads of the read instruction queues, the scores being based one or more of: a read instruction age, a data unit age, a data unit portion age, a data unit portion type, a read instruction queue size, a priority level specified by a read instruction, a destination egress block interface, a destination egress port or port group, or a read rate or state of a downstream buffer;
wherein the read operation selection logic is configured to select between two or more read instructions at the heads of two or more different read instruction queues based on the scores of the respective read instructions.

9. The apparatus of claim 1,
wherein the particular interfaces include editable egress block interfaces and uneditable egress block interfaces;
wherein the read instruction queues include different sets of read instruction queues for the editable egress block interfaces and uneditable egress block interfaces;
wherein the read operation selection logic is configured to, for a given bank, select candidate read instructions from both of the different sets of read instructions, and then select between the candidate read instructions based on weights associated with the editable egress block interfaces and uneditable egress block interfaces.

10. The apparatus of claim 1,
wherein the read instruction queues include different sets of read instruction queues for multi-destination traffic and single-destination traffic;
wherein the read operation selection logic is configured to, for a given bank, select candidate read instructions from both of the different sets of read instruction queues, and then select between the candidate read instructions based on weights associated with the multi-destination traffic and the single-destination traffic.

11. The apparatus of claim 1, further comprising read instruction optimization logic configured to consolidate read instructions that read a same data unit portion but target different interfaces, wherein the output logic is configured to, based on the consolidated read instruction, output the same data unit portion to the different interfaces.

12. A method comprising:
buffering cells of network packets in buffer entries within banks of a buffer memory, the buffer memory comprising multiple banks, each bank supporting only a limited number of input/output operations in a given time slot;
enqueuing the network packets in egress queues;
scheduling the network packets for departure from the egress queues, the scheduling including, for each cell of a given network packet:
generating a read instruction for reading the cell from a particular bank in the buffer memory to which the cell was written; and
placing the read instruction in a read instruction queue, the read instruction queue being one of a plurality of read instruction queues;
for time slots when particular banks of the multiple banks are available for read operations, selecting particular read instructions, from the plurality of read instruction queues, to execute for reading particular cells from the particular banks;
executing the particular read instructions during the time slots;
sending the particular cells that were read to particular interfaces identified by the particular read instructions.

13. The method of claim 12, wherein the particular interfaces are interfaces to egress blocks comprising packet processors, the egress blocks coupled to egress ports configured to output cells to a communications network.

14. The method of claim 12,
wherein, for each read instruction queue of the read instruction queues, each read instruction enqueued in the read instruction queue is an instruction to read from the same bank of the banks;
wherein each bank of the banks is associated with a different set of the read instruction queues;
wherein selecting the particular read instructions comprises, for at least each bank in the buffer memory that is not being written to during a given time slot, selecting a read instruction to execute within the bank during the given time slot from the set of read instruction queues associated with the bank.

15. The method of claim 12, further comprising:
after reading the particular cells from the particular banks, temporarily storing the particular cells in one or more read data caches;
wherein each interface of the particular interfaces can only accept a limited amount of data per time slot;
outputting the particular cells from the one or more read data caches to the particular interfaces over a period of time in a manner that avoids sending more than the limited amount of data in a given time slot.

16. The method of claim 15, further comprising not reading from a certain bank when a certain one of the read data caches associated with the certain bank is filled to a threshold capacity.

17. The method of claim 12, further comprising generating an optimized schedule of read and write operations for a given time slot by:
selecting a set of non-conflicting read instructions from the read instruction queues, wherein read instructions are non-conflicting if the read instructions do not send more data to a same interface than can be received in the given time slot, and if the read instructions do not access a same bank more times than the limited number of input/output operations supported in the given time slot; and
assigning write requests for newly received cells to a set of banks in the buffer memory that are still available during the given time slot, in view of the set of non-conflicting read instructions.

18. The method of claim 12,
wherein selecting the particular read instructions comprises:
generating scores for at least a set of head read instructions at the heads of the read instruction queues, the scores being based on one or more of: a read instruction age, a packet age, a cell age, a packet type, a read instruction queue size, a priority level specified by a read instruction, a destination egress block interface, a destination egress port or port group, or a read rate or state of a downstream buffer;
selecting between two or more read instructions at the heads of two or more different read instruction queues based on the scores of the respective read instructions.

19. The method of claim 12, further comprising:
consolidating read instructions that read a same cell but target different interfaces;
based on the consolidated read instruction, outputting the same cell to the different interfaces.

20. One or more non-transitory computer readable media storing instructions that, when executed by one or more computing devices, cause performance of:
buffering cells of network packets in buffer entries within banks of a buffer memory, the buffer memory comprising multiple banks, each bank supporting only a limited number of input/output operations in a given time slot;
enqueuing the network packets in one or more egress queues;
scheduling the network packets for departure from the egress queues, the scheduling including, for each cell of a given network packet:
generating a read instructions for reading the cell from a particular bank in the buffer memory to which the cell was written;
placing the read instruction in a read instruction queue, the read instruction queue being one of a plurality of read instruction queues, wherein each bank of the banks is associated with a different set of the read instruction queues;
for time slots when particular banks of the multiple banks are available for read operations, selecting particular read instructions, from the plurality of read instruction queues, to execute for reading particular cells from the particular banks, the selecting comprising, for at least each bank in the buffer memory that is not being written to during a given time slot, selecting a read instruction to execute within the bank during the given time slot from the set of read instruction queues associated with the bank;
executing the particular read instructions during the time slots to read the particular cells from the particular banks;
after reading the particular cells from the particular banks, temporarily storing the particular cells in one or more read data caches;
outputting the particular cells from the one or more read data caches to particular interfaces over a period of time in a manner that avoids sending more than a limited amount of data to each of the particular interfaces in a given time slot.

* * * * *

UNITED STATES PATENT AND TRADEMARK OFFICE
CERTIFICATE OF CORRECTION

PATENT NO. : 10,868,769 B1
APPLICATION NO. : 16/057421
DATED : December 15, 2020
INVENTOR(S) : Matthews et al.

Page 1 of 1

It is certified that error appears in the above-identified patent and that said Letters Patent is hereby corrected as shown below:

In the Claims

Column 76
Claim 20: Line 24: Delete "instructions" and insert --instruction--

Signed and Sealed this
Nineteenth Day of January, 2021

Andrei Iancu
*Director of the United States Patent and Trademark Office*